(12) United States Patent
Nakano

(10) Patent No.: US 8,768,950 B2
(45) Date of Patent: Jul. 1, 2014

(54) TECHNIQUES FOR FACILITATING INPUTS TO INPUT DEVICE

(75) Inventor: Keigo Nakano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 308 days.

(21) Appl. No.: 12/785,802

(22) Filed: May 24, 2010

(65) Prior Publication Data

US 2011/0239112 A1 Sep. 29, 2011

(30) Foreign Application Priority Data

Mar. 24, 2010 (JP) .................................. 2010-068666

(51) Int. Cl.
*G06F 17/30* (2006.01)

(52) U.S. Cl.
USPC .......................................... 707/767; 707/917

(58) Field of Classification Search
None
See application file for complete search history.

(56) References Cited

U.S. PATENT DOCUMENTS

| | | | |
|---|---|---|---|
| 6,012,075 A | 1/2000 | Fein et al. | |
| 2003/0023420 A1 | 1/2003 | Goodman | |
| 2004/0229697 A1 | 11/2004 | Williams | |
| 2008/0126075 A1 | 5/2008 | Thorn | |
| 2008/0291059 A1* | 11/2008 | Longe | 341/22 |
| 2011/0202876 A1* | 8/2011 | Badger et al. | 715/816 |

FOREIGN PATENT DOCUMENTS

| | | |
|---|---|---|
| EP | 2 133 772 | 12/2009 |
| JP | 62-093748 | 4/1987 |
| JP | 06-314274 | 11/1994 |
| JP | 7-334499 | 12/1995 |
| JP | 2010-009445 | 1/2010 |
| WO | 2006/078912 | 7/2006 |

OTHER PUBLICATIONS

"BlackBerry Wireless Handheld User Guide", Copyright 2004, Research in Motion Limited, 144 pages.*
Shinobu Ohara, Microsoft Windows 95 de nihongo nyuuryokuno siyouwo oohabani henkou kyouka (Substantial change and enhancement of specification of Japanese input with Microsoft Windows 95), Nekkei Open System, Japan, Nikkei Business Publications, Inc., Feb. 10, 1995, No. 23, pp. 168-169 (with partial translation).
Office Action issued on Nov. 29, 2013 in corresponding Japanese Application No. 2010-068666 (with partial translation).

* cited by examiner

*Primary Examiner* — Hung Q Pham
(74) *Attorney, Agent, or Firm* — Nixon & Vanderhye PC

(57) ABSTRACT

A game apparatus, when receiving an input of an input character by a user, obtains and displays option character strings corresponding to the input character. The option character strings displayed here are option character strings that are connectable to a word preceding the input character. Displayed as the option character strings in this manner are only character strings, each of which does not form an inappropriate expression when connected to the word preceding or following the input character. When the user has selected an option character string from these option character strings, the game apparatus determines the option character string to be a fixed character string, and displays and stores the fixed character string.

18 Claims, 23 Drawing Sheets

| FRONT WORD | | | REAR WORD | | |
|---|---|---|---|---|---|
| PART OF SPEECH | CONJUGATED FORM | TRANSCRIPTION | PART OF SPEECH | CONJUGATED FORM | TRANSCRIPTION |
| NOUN | | | PARTICLE | | |
| NOUN | | | KATAKANA FULL STOP | | |
| NOUN | | | KATAKANA COMMA | | |
| NOUN | | | AUXILIARY VERB (ASSERTION) | | |
| VERB | ATTRIBUTIVE FORM | | NOUN | | |
| VERB | CONTINUATIVE FORM | | VERB | | |
| VERB | IMPERFECTIVE FORM | | AUXILIARY VERB (NEGATIVE) | | |
| VERB | CONTINUATIVE FORM | | AUXILIARY VERB (PAST) | | |
| NOUN | | | NOUN | | |
| ADJECTIVE | | | NOUN | | |

| FRONT WORD | | | REAR WORD | | |
|---|---|---|---|---|---|
| PART OF SPEECH | CONJUGATED FORM | TRANSCRIPTION | PART OF SPEECH | CONJUGATED FORM | TRANSCRIPTION |
| AUXILIARY VERB (ASSERTION) | | | AUXILIARY VERB (ASSERTION) | | |
| VERB | IMPERFECTIVE FORM | | NOUN | | |
| | | Uma (in kanji) | | | Shika (in kanji) |

F I G. 2 0

D4

| SEQUENCE NUMBER | TRANSCRIPTION | PRONUNCIATION | CHARACTER STRING LENGTH | START POSITION | END POSITION | PART OF SPEECH | CONJUGATED FORM |
|---|---|---|---|---|---|---|---|
| 1 | kyou (in two kanji characters) | kyou | 2 | 1 | 2 | NOUN | - |
| 2 | ha (in one hiragana character) | ha | 1 | 3 | 3 | PARTICLE | - |
| 5 | mitaidesu (in five hiragana characters) | mitaidesu | 5 | 8 | 12 | AUXILIARY VERB (SPECULATIVE) | TERMINAL FORM |

F I G. 2 1

D3

| SEQUENCE NUMBER | TRANSCRIPTION | PRONUNCIATION | CHARACTER STRING LENGTH | START POSITION | END POSITION | PART OF SPEECH | CONJUGATED FORM |
|---|---|---|---|---|---|---|---|
| 3 | ika (in one kanji character and one hiragana character) | ika | 2 | 4 | 5 | VERB | IMPERFECTIVE FORM |

F I G. 2 2

D1

| SEQUENCE NUMBER | TRANSCRIPTION | PRONUNCIATION | CHARACTER STRING LENGTH | START POSITION | END POSITION | PART OF SPEECH | CONJUGATED FORM |
|---|---|---|---|---|---|---|---|
| 4 | nai (in two hiragana characters) | nai | 2 | 6 | 7 | AUXILIARY VERB (NEGATIVE) | IMPERFECTIVE FORM |

F I G. 2 3

D2

| TRANSCRIPTION | PRONUNCIATION | CHARACTER STRING LENGTH | PART OF SPEECH | CONJUGATED FORM |
|---|---|---|---|---|
| nai (in two hiragana characters) | nai | 2 | AUXILIARY VERB (NEGATIVE) | IMPERFECTIVE FORM |

FIG. 32

| | PERFORMED INPUT | PROCESSING FLOW | DISPLAY CONTENTS AND BUFFER CONTENTS |
|---|---|---|---|
| (1) | "ki" | S1→S2:Yes→S3:INPUT BUFFER "ki" | |
| | | S4→S21:Yes→S22:OPTION CHARACTER STRINGS "kimochi", "kita", "kyou" | |
| | | S24:No→S25:SELECT "kimochi" | |
| | | S26→S51:WORD A = EMPTY, WORD B = "kimochi" | |
| | | S52:Yes(WORD A IS EMPTY)→S57:DETERMINATION "OK" | |
| | | S27:Yes→S24 | |
| | | THE SAME PROCESSING IS PERFORMED FOR "kita" AND "kyou". SINCE WORD A IS EMPTY, ALL OF "kimochi", "kita", AND "kyou" ARE NOT DELETED FROM OPTION BUFFER. | |
| | | S17:DISPLAY "kimochi", "kita", AND "kyou" AS OPTION CHARACTER STRINGS | ki▽ |
| (2) | "yo" (in smaller case) | S1→S2:Yes→S3:INPUT BUFFER "kyo" | |
| | | S4→S21:Yes→S22:LIST OF OPTIONS "kyou", "kyoku", "kyouka" | |
| | | S24:No→S25:SELECT "kyou" | |
| | | S26→S51:WORD A = EMPTY, WORD B = "kyou" | |
| | | S52:Yes(WORD A IS EMPTY)→S57:DETERMINATION "OK" | |
| | | S27:Yes→S24 | |
| | | THE SAME PROCESSING IS PERFORMED FOR "kyoku" AND "kyouka". SINCE WORD A IS EMPTY, ALL OF "kyou", "kyoku", AND "kyouka" ARE NOT DELETED FROM OPTION BUFFER. | |
| | | S17:DISPLAY "kyou", "kyoku", AND "kyouka" AS OPTION CHARACTER STRINGS | kyo▽ |
| (3) | TOUCH "kyou" | S1→S2:No→S5:Yes→S6→S41:INPUT BUFFER = EMPTY→S42:EDIT BUFFER = "kyou" | |
| | | S43→S51:WORD A = "kyou", WORD B = EMPTY | |
| | | S52:Yes(WORD B IS EMPTY)→S57:DETERMINATION "OK" | |
| | | S44→OPTION CHARACTER STRING = EMPTY→S45:Yes→S46:FIXED BUFFER "kyou" →S47:EDIT BUFFER = EMPTY → (RETURN) | kyou/▽ |
| | | S4→S21:No→S30:DISPLAY LIST OF WORDS CORRESPONDING TO "kyou" (here, the user input "ha" that is not included in the list, or the user inputs "ha" ever if "ha" is included in the list) | |
| (4) | "ha" | S1→S2:Yes→S3:INPUT BUFFER "ha" | |
| | | S4→S21:Yes→S22:LIST OF OPTIONS "ha", "hai", "hanmei", "hawai" | |
| | | S24~S28:PERFORM CONNECTIVITY DETERMINATION BY SETTING "ha" AS WORD A AND EACH OF THE ABOVE OPTIONS AS WORD B. ONLY "hai" IS DETERMINED TO BE NOT CONNECTABLE AND THE OTHER OPTIONS ARE DETERMINED TO BE CONNECTABLE. | |

FIG. 33

| PERFORMED INPUT | | PROCESSING FLOW | DISPLAY CONTENTS AND BUFFER CONTENTS |
|---|---|---|---|
| | | | kyou/ha/ika/naiV/mitaidesu |
| (1) | BS(INPUT FOR DELETING "nai") | S1→···→S7→S8→S81: N o (INPUT BUFFER IS EMPTY) | |
| | | S86:No(EDITED CHARACTER STRING IS NOT STORED) | |
| | | S91: i = "nai" | |
| | | S92:EDIT BUFFER = "nai" , FIXED BUFFER = "kyou ha ika mitaidesu" | |
| | | S93: j = "ika" | |
| | | S94:CONNECTIVITY CHECK FOR j "ika" AND k "mitaidesu" (DETAILS OMITTED, DETERMINED TO BE NOT CONNECTABLE) | |
| | | S95:No( "ika" AND "mitaidesu" ARE NOT CONNECTABLE) | |
| | | S96:EDIT BUFFER "ika nai" (ADD "ika" BEFORE EXISTING "nai" ), FIXED BUFFER "kyou ha mitaidesu" | |
| | | S97: j = "ha" | |
| | | S94: jCONNECTIVITY CHECK FOR j "ha" AND k "mitaidesu" | |
| | | S95:Yes( "ha" AND "mitaidesu" ARE CONNECTABLE) | |
| | | S87:EDIT BUFFER "ika" (DELETE "nai" ) | |
| | | S88:INPUT BUFFER "nai" (WORD DELETED AT S87) | |
| | | S90:PERFORM OPTION SEARCH PROCESS FOR "nai" → "nai" IS NOT DELETED YET, AND "nai" RETURNS TO UNFIXED STATE | kyou/ha/ika/naiV/mitaidesu |
| (2) | BS(INPUT FOR DELETING "nai" AGAIN) | S81:Yes(BECAUSE INPUT BUFFER IS "nai" ) | |
| | | S82:INPUT BUFFER "EMPTY" (DELETE REARMOST CHARACTER "i" , AND THEN DELETE "na" ) | |
| | | S85:PERFORM OPTION SEARCH PROCESS FOR "EMPTY" → SINCE INPUT BUFFER IS EMPTY, WORDS CORRESPONDING TO PRECEDING WORD ARE DISPLAYED AS LIST OF OPTIONS | kyou/ha/ikaV/mitaidesu |
| (3) | BS(INPUT FOR DELETING "ika") | S81:No(INPUT CHARACTER IS NOT STORED) | |
| | | S86:Yes(EDIT BUFFER = "ika" ) | |
| | | S87:EDIT BUFFER "EMPTY" (DELETE "ika" ) | |
| | | S88:INPUT BUFFER "ika" | |
| | | S90:PERFORM OPTION SEARCH PROCESS FOR "ika" | kyou/ha/ikaV/mitaidesu |
| (4) | BS(INPUT FOR DELETING "ka" AGAIN) | S81:Yes(BECAUSE INPUT BUFFER IS "ika" ) | |
| | | S82:INPUT BUFFER "i" (DELETE REARMOST CHARACTER "ka" ) | |
| | | S85:PERFORM OPTION SEARCH PROCESS FOR "i" | kyou/ha/iV/mitaidesu |
| (5) | BS(INPUT FOR DELETING "i") | S81:Yes(BECAUSE INPUT BUFFER IS "i" ) | |
| | | S82:INPUT BUFFER "EMPTY" (DELETE REARMOST CHARACTER "i" ) | |
| | | S85:PERFORM OPTION SEARCH PROCESS FOR "EMPTY" → SINCE INPUT BUFFER IS EMPTY, WORDS CORRESPONDING TO PRECEDING WORD ARE DISPLAYED AS OPTION CHARACTER STRINGS | kyou/ha/V/mitaidesu |

FIG. 34

| PERFORMED INPUT | PROCESSING FLOW | DISPLAY CONTENTS AND BUFFER CONTENTS |
|---|---|---|
| (1) "ne" | S1→S2:Yes→S3:INPUT BUFFER "ne" | |
| | S4→S21:Yes(BECAUSE INPUT BUFFER IS "ne" AS ABOVE) | |
| | S22:LIST OF OPTIONS "neko", "ne", "nemura", "nee", etc | |
| | S24:No→S25 SELECT "neko" | |
| | S26→S51:WORD A = "ha", WORD B = "neko" | |
| | S52:No→S53:ATTRIBUTE OF WORD A "PARTICLE" →S54:ATTRIBUTE OF WORD B "NOUN" | |
| | S55: "YES" SINCE COMBINATION OF "PARTICLE" AND "NOUN" IS IN WHITE LIST | |
| | S56:COMBINATION OF "ha" AND "neko" IS NOT IN BLACK LIST → DETERMINATION "OK" → RETURN | |
| | S27:Yes→S24:No→S25:SELECT "nee" | |
| | S26→S51:WORD A = "ha", WORD B = "nee" | |
| | S52:No→S53:ATTRIBUTE OF WORD A "PARTICLE" → S54:ATTRIBUTE OF WORD B "INTERJECTION" | |
| | S55: "NO" SINCE COMBINATION OF "PARTICLE" AND "INTERJECTION" IS NOT IN WHITE LIST → DETERMINATION "NG" → RETURN | |
| | S27:No→S28:DELETE "nee" | |
| | "ne" AND "nemura" ARE LEFT | |
| | S24:Yes→S17:DISPLAY "neko", "ne", "nemura", etc | kyou/ha/ne▽/ mitaidesu |
| (2) SELECT "nemura" FROM THE LIST | S1→S2:No→S5:Yes→S6→S41:INPUT BUFFER "EMPTY" | |
| | S42:EDIT BUFFER "nemura" | |
| | S43:→S51:WORD A = "nemura", WORD B = "mitaidesu" | |
| | S52:No→S53:ATTRIBUTE OF WORD A "VERB (IMPERFECTIVE FORM)", S54:ATTRIBUTE OF WORD B "AUXILIARY VERB (SPECULATIVE)" | |
| | S55: "NO" SINCE COMBINATION OF "VERB (IMPERFECTIVE FORM)" AND "AUXILIARY VERB (SPECULATIVE)" IS NOT IN WHITE LIST → DETERMINATION "NG" → RETURN | |
| | S44:NO MORE LISTED OPTIONS | |
| | S45:No(DETERMINED AS "NG")→S4→S21:No(EMPTIED AT S41)→S30, S31, S24~S28: "nai" AND OTHERS ARE DISPLAYED AS OPTIONS | kyou/ha/ nemura▽/ mitaidesu |
| (3) SELECT "nai" FROM THE LIST | S1→S2:No→S5:Yes→S6→S41:INPUT BUFFER "EMPTY" | |
| | S42:EDIT BUFFER "nemura nai" ("nai" is added to "nemura") | |
| | S43→S51:WORD A = "nai", WORD B = "mitaidesu" | |
| | S52:No→S53:ATTRIBUTE OF WORD A "AUXILIARY VERB (NEGATIVE)", S53:ATTRIBUTE OF WORD B "AUXILIARY VERB (SPECULATIVE)" | |
| | S55: "YES" SINCE COMBINATION OF "AUXILIARY VERB (NEGATIVE)" AND "AUXILIARY VERB (SPECULATIVE)" IS IN WHITE LIST | |
| | S56:COMBINATION OF "AUXILIARY VERB (NEGATIVE)" AND "AUXILIARY VERB (SPECULATIVE)" IS NOT IN BLACK LIST → DETERMINATION "OK" → RETURN | |
| | S44:NO MORE OPTION WORDS | |
| | S45:Yes(DETERMINED AS "OK")→S46:FIXED BUFFER "kyou ha nemura nai mitaidesu" ("nemura" and "nai" are added) | kyou/ha/nemura/ nai▽/mitaidesu/ |
| | S47:DELETE EDITED CHARACTER STRING | |
| | S47:EDIT BUFFER "EMPTY" | |
| | S4→S21:Yes(EMPTIED AT S51)→S30, S31, S24~S28(DISPLAY OPTIONS TO FOLLOW "nai") | |

TECHNIQUES FOR FACILITATING INPUTS TO INPUT DEVICE

CROSS REFERENCE TO RELATED APPLICATION

The disclosure of Japanese Patent Application No. 2010-068666, filed Mar. 24, 2010, is incorporated herein by reference.

TECHNICAL FIELD

Certain exemplary embodiments of the present invention relate to a computer readable storage medium having an input program stored therein, a system, and an input method. Certain exemplary embodiments of the present invention particularly relate to a computer readable storage medium having stored therein an input program for preventing a user from fixedly inputting an inappropriate word, and to a system and an input method for preventing the same.

BACKGROUND AND SUMMARY

Conventionally, there is a known apparatus that allows a user inputting a sentence thereinto to input the sentence efficiently with reduced input operations. When the user inputs a word or the like into the apparatus, the apparatus obtains and displays, as input options (hereinafter, referred to as "connection option character strings"), words or the like that can immediately follow the inputted word or the like. For example, Japanese Laid-Open Patent Publication No. 7-334499 (hereinafter, referred to as Patent Document 1) discloses a character string input apparatus that is capable of, when a user inputs characters "jinkou" (in Japanese hiragana characters), displaying options "jinkou" (in Japanese kanji characters meaning "population") and "jinkou" (in Japanese kanji characters meaning "artificial") into which the inputted characters "jinkou" can be converted (hereinafter, referred to as "conversion options"), and at the same time, displaying "mitsudo" (in Japanese kanji characters meaning "density") and "zouka" (in Japanese kanji characters meaning "increase") as connection option character strings corresponding to "jinkou" (in Japanese kanji characters meaning "population"), and displaying "zouki" (in Japanese kanji characters meaning "organ") and "chinou" (in Japanese kanji characters meaning "intelligence") as connection option character strings corresponding to "jinkou" (in Japanese kanji characters meaning "artificial"). The character string input apparatus allows the user to select one of the conversion options and one of the connection option character strings. In this manner, the user can input character strings corresponding to the inputted characters.

To be specific, if "jinkou" ("population") and "jinkou" ("artificial") are displayed and the user selects one of them, for example, "jinkou" ("population"), then "mitsudo" and "zouka" are displayed as connection option character strings corresponding to "jinkou" ("population"). By selecting one of them, for example, "zouka", the user can fixedly input, into the character string input apparatus, "jinkou zouka" corresponding to the inputted "jinkou".

Patent Document 1 discloses a plurality of different methods for extracting connection option character strings. For example, one of the methods uses a table in which whether or not two words (a conversion option and a connection option character string) are connectable to each other is written.

As described above, in the conventional technique, it is determined whether or not a conversion option for an input character is connectable to any connection option character strings. Accordingly, the character string input apparatus displays only connection option character strings connectable to the conversion option for the input character. The character string input apparatus can receive an input for fixing only such a connection option character string.

However, the conventional technique merely determines whether or not the conversion option for the input character is connectable to any connection option character strings. Therefore, there is a case where a character string that forms an inappropriate expression when connected to a word that is displayed at a position preceding or following the input character, is fixedly inputted. For example, assume a case where the user inputs "shika" (in hiragana) so as to immediately follow "uma" (in kanji) in the display, and also assume in this case that the conventional technique displays, for example, "shika" (in kanji) as a conversion option for the inputted "shika" (in hiragana) and "no ko" as a connection option character string corresponding to the conversion option "shika" (in kanj). Here, if the user selects and fixedly inputs "shika no ko" that corresponds to the input characters "shika", then "shika no ko" is connected to the immediately preceding "uma". Accordingly, a combination of "uma", "shika", and "no ko", which means "stupid kid" in Japanese, is fixedly inputted. In this manner, an inappropriate expression is inputted.

Therefore, a feature of certain exemplary embodiments of the present invention is to provide a computer readable storage medium having stored therein an input program capable of effectively preventing a character string, the character string forming an inappropriate expression when connected to a word either preceding or following an input character, from being fixedly inputted, and to provide a system and an input method capable of doing the same.

In order to achieve the above-mentioned feature, in a first aspect of certain exemplary embodiments of the present invention, a program stored in a computer readable storage medium causes a computer of an information processing apparatus that includes storage means for storing an option character string database that defines a combination of at least one character and at least one option character string corresponding to the at least one character, to function as character input reception means, first output means, option character string obtaining means, first preceding/following identification means, fixed character string determination means, and second output means. The character input reception means receives an input of a character by a user. The first output means outputs, as an unfixed character, the character received by the character input reception means. The option character string obtaining means obtains, from the option character string database, at least one option character string as a respective at least one first option character string that corresponds to the unfixed character. The first preceding/following identification means identifies at least one of a character string preceding the unfixed character and a character string following the unfixed character. The fixed character string determination means determines, among the at least one first option character string, a first option character string to be a fixed character string, the first option character string satisfying a predetermined condition for a character string to be connectable to the at least one of the character strings, which has been identified by the first preceding/following identification means. The second output means outputs the fixed character string.

According to the above configuration, among the at least one first option character string obtained by the option character string obtaining means, a first option character string connectable to at least one of the character string preceding the unfixed character and the character string following the unfixed character is determined to be a fixed character string. As a result, a first option character string, whose meaning becomes inappropriate when interpreted in combination with the character string preceding the input character and/or the character string following the input character, can be effectively prevented from being determined to be a fixed character string.

In a second aspect of certain exemplary embodiments of the present invention, the program stored in the computer readable storage medium further causes the computer to function as selection input reception means. In the second aspect, the selection input reception means receives an operation which the user performs for selecting a second option character string. The fixed character string determination means obtains, from the at least one first option character string obtained by the option character string obtaining means, at least one first option character string satisfying the predetermined condition, as a respective at least one second option character string. When the selection input reception means has received the operation of selecting a second option character string from the at least one obtained second option character string, the fixed character string determination means determines the second option character string to be a fixed character string.

According to the above configuration, among the at least one first option character string obtained by the option character string obtaining means, at least one first option character string connectable to at least one of the character string preceding the unfixed character and the character string following the unfixed character is obtained as a respective at least one second option character string. Among the at least one second option character string, a second option character string selected by the user is determined to be a fixed character string. In this manner, only a first option character string (or strings) connectable to at least one of the character string preceding the unfixed character and the character string following the unfixed character is determined to be a second option character string (or strings) selectable by the user. Therefore, a first option character string, whose meaning becomes inappropriate when interpreted in combination with the character string preceding the input character and/or the character string following the input character, can be effectively prevented from being determined to be a fixed character string.

In a third aspect of certain exemplary embodiments of the present invention, the program stored in the computer readable storage medium further causes the computer to function as selection input reception means. In the third aspect, the selection input reception means receives an operation which the user performs for selecting a first option character string. When the selection input reception means has received the operation of selecting a first option character string from the at least one first option character string obtained by the option character string obtaining means, the fixed character string determination means determines whether or not the selected first option character string satisfies the predetermined condition. Only when the selected first option character string satisfies the predetermined condition, the fixed character string determination means determines the selected first option character string to be a fixed character string.

According to the above configuration, the first option character string selected by the user is, only when connectable to at least one of the character string preceding the unfixed character and the character string following the unfixed character, determined to be a fixed character string. Therefore, a first option character string, whose meaning becomes inappropriate when interpreted in combination with the character string preceding the input character and/or the character string following the input character, is not determined to be a fixed character string. Thus, such a first option character string can be effectively prevented from being inputted as a fixed character string.

According to the program stored in the computer readable storage medium, in a fourth aspect of certain exemplary embodiments of the present invention based on the second aspect, the fixed character string determination means determines, when the selection input reception means has received the operation of selecting a second option character string from the at least one obtained second option character string, whether or not the selected second option character string satisfies the predetermined condition. Only when the selected second option character string satisfies the predetermined condition, the fixed character string determination means determines the selected second option character string to be a fixed character string.

According to the above configuration, only a first option character string (or strings) connectable to at least one of the character string preceding the unfixed character and the character string following the unfixed character is determined to be a second option character string (or strings) selectable by the user. In addition, only a second option character string connectable to at least one of the character string preceding the unfixed character and the character string following the unfixed character is determined to be a fixed character string. Therefore, a first option character string, whose meaning becomes inappropriate when interpreted in combination with the character string preceding the input character and/or the input character string following the input character, can be more effectively prevented from being inputted as a fixed character string.

According to the program stored in the computer readable storage medium, in a fifth aspect of certain exemplary embodiments of the present invention, the first preceding/following identification means identifies both the character string preceding the unfixed character and the character string following the unfixed character. The fixed character string determination means obtains, from the at least one first option character string obtained by the option character string obtaining means, the at least one first option character string satisfying the predetermined condition, as the respective at least one second option character string, the predetermined condition being a condition to be connectable to the character string that precedes the unfixed character and that has been identified by the first preceding/following identification means. Also, the fixed character string determination means determines whether or not the selected second option character string satisfies the predetermined condition that is a condition to be connectable to the character string that follows the unfixed character and that has been identified by the first preceding/following identification means. Only when the selected second option character string satisfies the predetermined condition, the fixed character string determination means determines the selected second option character string to be a fixed character string.

According to the above configuration, among the at least one first option character string obtained by the option character string obtaining means, only a first option character string (or strings) connectable to the character string preceding the input character is obtained as a second option character string (or strings). This configuration allows a greater variety of first option character strings to be obtained as second option character strings selectable by the user, as compared to the configuration in which a first option character string (or strings) connectable to both the character string preceding the input character and the character string following the input character is obtained as a second option character string (or strings). Only when a second option character string selected by the user is connectable to the character string whose sequence number is larger by 1 than that of the input character, the selected second option character string is determined to be a fixed character string. Accordingly, only a second option character string connectable to both the character string preceding the input character and the character string following the input character can be determined to be a fixed character string while a great variety of options are provided to the user by obtaining a great variety of second option character strings.

In a sixth aspect of certain exemplary embodiments of the present invention, the program stored in the computer readable storage medium further causes the computer to function as second output means. The second output means outputs the at least one second option character string obtained by the fixed character string determination means. This configuration makes it possible to notify the user of the at least one selectable second option character string.

In a seventh aspect of certain exemplary embodiments of the present invention, the program stored in the computer readable storage medium further causes the computer to function as deletion instruction reception means, second preceding/following identification means, connection determination means, and state change means. The deletion instruction reception means receives, from the user, an instruction to delete the fixed character string. The second preceding/following identification means identifies a character string preceding the fixed character string to be deleted and a character string following the fixed character string to be deleted. The connection determination means determines whether or not the character string preceding the fixed character string to be deleted and the character string following the fixed character string to be deleted, both of which have been identified by the second preceding/following identification means, are connectable to each other. When the connection determination means determines that the character strings preceding and following the fixed character string to be deleted are connectable to each other, the state change means changes the fixed character string to be deleted into an unfixed character.

According to the above configuration, whether or not the character string preceding the fixed character string to be deleted and the character string following the fixed character string to be deleted are identified, and it is determined whether or not these character strings are connectable to each other. When it is determined that these character strings are connectable to each other, the fixed character string to be deleted is changed into an unfixed character. Accordingly, by employing a configuration in which, for example, a deletion of a fixed character string is impossible but only a deletion of an unfixed character is possible, the fixed character string to be deleted can be deleted only when the character string preceding the fixed character string to be deleted and the character string following the fixed character string to be deleted are connectable to each other. Consequently, the following situation can be effectively prevented: a character string preceding a fixed character string to be deleted and a character string following the fixed character string to be deleted are, even though not connectable to each other, connected due to a deletion of the fixed character string to be deleted.

According to the program stored in the computer readable storage medium, in an eighth aspect of certain exemplary embodiments of the present invention, the option character string obtaining means obtains, from the option character string database, at least one first option character string corresponding to the unfixed character that has been changed by the state change means. According to the above configuration, among the at least one first option character string corresponding to the unfixed character that has been changed, a first option character string can be fixedly inputted.

According to the program stored in the computer readable storage medium, in a ninth aspect of certain exemplary embodiments of the present invention, when it is determined that the character string preceding the fixed character string to be deleted and the character string following the fixed character string to be deleted are not connectable to each other, the connection determination means determines, as a connectable character string, a character string located at a rearmost position among character strings that precede the fixed character string to be deleted and that are connectable to the character string following the fixed character string to be deleted. The state change means changes all character strings present between the connectable character string and the character string following the fixed character string to be deleted, into unfixed characters.

According to the above configuration, all the fixed character strings of which the sequence number is smaller than that of the fixed character string to be deleted and which are not connectable to the character string immediately following the fixed character string to be deleted, i.e., all the character strings present between the character string immediately following the fixed character string to be deleted and the character string (connectable character string) connectable to the character string immediately following the fixed character string to be deleted, are changed into an unfixed state. In this manner, the following situation can be effectively prevented: two character strings that are not connectable to each other are, due to a deletion of the fixed character string to be deleted, successively arranged as fixed character strings.

According to the program stored in the computer readable storage medium, in a tenth aspect of certain exemplary embodiments of the present invention, when the fixed character string determination means has determined one of the at least one first option character string to be a fixed character string, the option character string obtaining means obtains, from the option character string database, at least one option character string as a respective at least one third option character string that corresponds to the fixed character string. According to this configuration, when a fixed character string is determined, at least one option character string corresponding to the fixed character string is obtained without requiring the user to input a character. This reduces the character inputting operations performed by the user.

According to the program stored in the computer readable storage medium in an eleventh aspect, the fixed character string determination means determines, among the at least one third option character string, a third option character string to be a fixed character string, the third option character string satisfying the predetermined condition for a character string to be connectable to the at least one of the character strings, which has been identified by the first preceding/following identification means. According to this configuration, a third option character string, whose meaning becomes inappropriate when interpreted in combination with a fixed character string, can be effectively prevented from being fixedly inputted.

The program stored in the computer readable storage medium, in a twelfth aspect of certain exemplary embodiments of the present invention further causes the computer to function as transmission instruction input reception means and transmission means. The transmission instruction input reception means receives an instruction to transmit the character inputted by the user to another information processing apparatus. When the transmission instruction input reception means has received the instruction, the transmission means transmits, to said another information processing apparatus, transmission data that contains text that only includes the fixed character string. According to this configuration, text transmitted to said another information processing apparatus only includes a fixed character string, i.e., a fixedly inputted character string. Consequently, a character in an unfixed state, which may constitute an inappropriate expression, can be effectively prevented from being transmitted to said another information processing apparatus.

According to the program stored in the computer readable storage medium, in a thirteenth aspect of certain exemplary embodiments of the present invention, the character input reception means causes the storage means to store the received character as an unfixed character. The first output means outputs the unfixed character stored in the storage means. Further, in the thirteenth aspect, the program further causes the computer to function as first deletion means. When the transmission instruction input reception means has received the instruction, the first deletion means deletes the unfixed character from the storage means prior to transmitting the transmission data. According to this configuration, a character in an unfixed state, which may constitute an inappropriate expression, can be more effectively prevented from being transmitted to said another information processing apparatus.

According to the program stored in the computer readable storage medium, in a fourteenth aspect of certain exemplary embodiments of the present invention, the first output means displays a marker in a predetermined display area of display means of the information processing apparatus, and, at a time of outputting the unfixed character, displays the unfixed character at a position relative to a display position of the marker in the predetermined display area. The character input reception means receives an input of an instruction to change the display position of the marker. Further, in the fourteenth aspect, the program further causes the computer to function as second deletion means. When the character input reception means has received the input of the instruction to change the display position of the marker, the second deletion means deletes the unfixed character from the predetermined display area. Here, when an instruction to change the display position of the marker is provided, it is highly likely that the user wishes to input a character string which is different from a character string inputted before the instruction to change the display position of the marker has been provided. Therefore, when an instruction to change the display position of the marker is provided, an unfixed character stored before the instruction to change the display position of the marker has been provided is determined to be a character of no use and deleted from the display area.

According to the program stored in the computer readable storage medium, in a fifteenth aspect of certain exemplary embodiments of the present invention, the fixed character string determination means performs a fixed character string determination process for determining the fixed character string, only when the selection input reception means has received the operation for selecting a second option character string. According to this configuration, a character inputted by the user cannot be directly determined to be a fixed character string. Only a second option character string can be determined to be a fixed character string. Therefore, a character string that is an inappropriate expression is not fixedly inputted unless the at least one obtained second option character string includes the character string that is an inappropriate expression.

In a sixteenth aspect of certain exemplary embodiments of the present invention, a system includes storage means, character input reception means, first output means, option character string obtaining means, first preceding/following identification means, fixed character string determination means, and second output means. The storage means stores an option character string database that defines a combination of at least one character and at least one option character string corresponding to the at least one character. The character input reception means receives an input of a character by a user. The first output means outputs, as an unfixed character, the character received by the character input reception means. The option character string obtaining means obtains, from the option character string database, at least one option character string as a respective at least one first option character string that corresponds to the unfixed character. The first preceding/following identification means identifies at least one of a character string preceding the unfixed character and a character string following the unfixed character. The fixed character string determination means determines, among the at least one first option character string, a first option character string to be a fixed character string, the first option character string satisfying a predetermined condition for a character string to be connectable to the at least one of the character strings, which has been identified by the first preceding/following identification means. The second output means outputs the fixed character string.

Note that, the "system" of certain exemplary embodiments of the present invention may be structured as a single apparatus, or structured with a plurality of apparatuses. For example, the system may include only one input apparatus, and the input apparatus may include the storage means, the character input reception means, the first output means, the option character string obtaining means, the first preceding/following identification means, the fixed character string determination means, and the second output means. Alternatively, the system may include a server and an input apparatus. The server may include some of the storage means, the character input reception means, the first output means, the option character string obtaining means, the first preceding/following identification means, the fixed character string determination means, and the second output means, and the input apparatus may include the others.

In a seventeenth aspect of certain exemplary embodiments of the present invention, an input method includes a storing step, a character input reception step, a first output step, an option character string obtaining step, a first preceding/following identifying step, a fixed character string determining step, and a second output step. The storing step is a step of storing an option character string database that defines a combination of at least one character and at least one option character string corresponding to the at least one character. The character input reception step is a step of receiving an input of a character by a user. The first output step is a step of outputting, as an unfixed character, the character received at the character input reception step. The option character string obtaining step is a step of obtaining, from the option character string database, at least one option character string as a respective at least one first option character string that corresponds to the unfixed character. The first preceding/following identifying step is a step of identifying at least one of a character string preceding the unfixed character and a character string following the unfixed character. The fixed character string determining step is a step of determining, among the at least one first option character string, a first option character string to be a fixed character string, the first option character string satisfying a predetermined condition for a character string to be connectable to the at least one of the character strings, which has been identified at the first preceding/following identifying step. The second output step is a step of outputting the fixed character string.

The above-described system and method of the sixteenth and seventeenth aspects each provide the same functions and effects as those provided by the computer readable storage medium of the first aspect.

According to the computer readable storage medium, system, or method of the above first to seventeenth aspects, among the at least one first option character string that is extracted from the option character string database and that corresponds to the input character, only a first option character string that is connectable to at least one of the character string preceding the unfixed character and the character string following the unfixed character is fixedly inputted. Therefore, an option character string, whose meaning becomes inappropriate when interpreted in combination with the character string preceding the input character and/or the character string following the input character, can be effectively prevented from being fixedly inputted.

These and other objects, features, aspects and advantages of certain exemplary embodiments the present invention will become more apparent from the following detailed description when taken in conjunction with the accompanying drawings.

BRIEF DESCRIPTION OF THE DRAWINGS

FIG. 18 shows an example of a white list table;

FIG. 19 shows an example of a black list table;

FIG. 20 shows an example of a data structure of fixed character string data;

FIG. 21 shows an example of a data structure of edited character string data;

FIG. 22 shows an example of a data structure of input character data;

FIG. 23 shows an example of a data structure of option character string data;

FIG. 32 shows an example of the character input process that is performed when a user fixedly inputs "kyou ha";

FIG. 33 shows an example of the character input process that is performed when instructions to delete "ika nai" are inputted by the user; and FIG. 34 shows an example of the character input process that is performed when the user has inputted "nemura nai".

DESCRIPTION OF THE PREFERRED EMBODIMENTS

Hereinafter, a game apparatus according to certain exemplary embodiments of the present invention (equivalent to an information processing apparatus of certain exemplary embodiments of the present invention) will be described with reference to the drawings. The game apparatus has a character input function capable of receiving, from a user, an input of a character desired by the user, and has a communication function capable of transmitting, to another game apparatus, text data that indicates the inputted character. The game apparatus communicates with another game apparatus, thereby allowing the user of the game apparatus to perform chatting with the user of this other game apparatus. The configuration of the game apparatus will be described below with reference to FIGS. 1 and 2.

Figure 1:
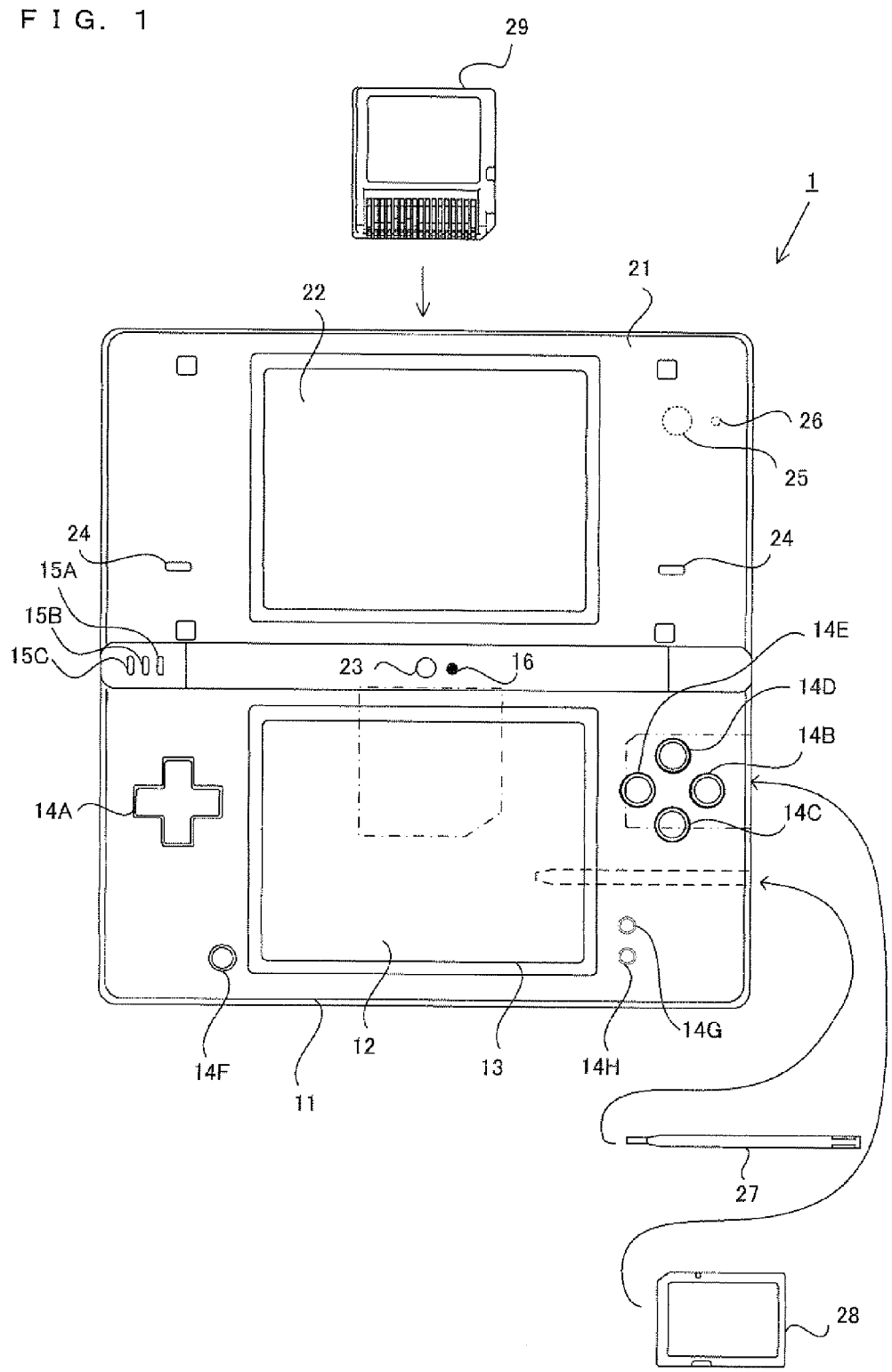
FIG. 1 is an external view of a game apparatus according to an embodiment of the present invention.

FIG. 1 is an external view of the game apparatus according to the embodiment.

FIG. 1 shows a game apparatus 1 which is a foldable handheld game apparatus and which is in an opened state. The game apparatus 1 is formed in a size that allows the user to hold it with their one or both hands even when the game apparatus 1 is in the opened state.

The game apparatus 1 includes a lower housing 11 and an upper housing 21. The lower housing 11 and the upper housing 21 are connected to each other in a manner that allows them to be opened and closed (i.e., foldable). In the example of FIG. 1, the lower housing 11 and the upper housing 21 are each formed in a plate-like shape of a horizontally long rectangle, and are rotatably connected at their longer sides. Normally, the user uses the game apparatus 1 in the opened state. When not using the game apparatus 1, the user keeps the game apparatus 1 in the closed state. In the example of FIG. 1, the state of the game apparatus 1 is not limited to the opened or closed state. For example, with friction force occurring at the connection between the lower housing 11 and the upper housing 21, the game apparatus 1 can be maintained to be in an intermediate state between the opened state and the closed state, at any angle formed by the lower housing 11 and the upper housing 21. In other words, the upper housing 21 can be caused to remain stationary at any angle with respect to the lower housing 11.

In the lower housing 11, a lower LCD (Liquid Crystal Display) 12 is provided. The lower LCD 12 has a horizontally long shape, and is arranged such that the orientation of the longer sides thereof coincides with the orientation of the longer sides of the lower housing 11. Although the LCD is used as a display device to be incorporated in the game apparatus 1 in the present embodiment, any other display device, such as a display device using an EL (Electro Luminescence), may be used, for example. In the game apparatus 1, a display device having any resolution may be used. Although details will be described below, the lower LCD 12 is used for displaying, in real time, an image captured by an inner camera 23 or an outer camera 25. The lower LCD 12 is also used for displaying words which the user is inputting to construct a sentence and which have not been transmitted to the game apparatus 1 on the receiving end. The display of words that are being inputted by the user in the middle of constructing a sentence will be described in detail below with reference to FIGS. 4 and 5.

Operation buttons 14A to 14K and a touch panel 13 are provided in the lower housing 11 as input devices. As shown in FIG. 1, a direction input button 14A, an operation button 146, an operation button 14C, an operation button 14D, an operation button 14E, a power button 14F, a start button 14G, and a select button 14H among the operation buttons 14A to 14K are provided on an inner main surface of the lower housing 11, which inner main surface is, when the upper housing 21 and the lower housing 11 are closed, accommodated within the game apparatus 1. The direction input button 14A is used for a selection operation, for example. The operation buttons 14B to 14E are used for a determination operation, a cancellation operation, and the like. The power button 14F is used to power ON/OFF the game apparatus 1. In the example of FIG. 1, the direction input button 14A and the power button 14F are provided on the inner main surface of the lower housing 11, so as to be located to the right or left (to the left, in FIG. 1) of the lower LCD 12 that is provided near the center of the inner main surface. The operation buttons 14B to 14E, the start button 14G, and the select button 14H are provided on the inner main surface of the lower housing 11, so as to be located to the other side (to the right, in FIG. 1) of the lower LCD 12. The direction input button 14A, the operation buttons 14B to 14E, the start button 14G, and the select button 14H are used for performing various operations with the game apparatus 1.

Note that the operation buttons 14I to 14K are not shown in FIG. 1. For example, the operation button 14I that is an L-button is provided on a left end portion of an upper side surface of the lower housing 11, and the operation button 14J that is an R-button is provided on a right end portion of the upper side surface of the lower housing 11. The L-button 14I and the R-button 14J are used for, e.g., performing an operation of instructing the game apparatus 1 to capture an image (i.e., a shutter operation). Further, the operation button 14K that is a sound volume button is provided on a left side surface of the lower housing 11. The sound volume button 14K is used to adjust the sound volume of loudspeakers included in the game apparatus 1.

The game apparatus 1 further includes the touch panel 13 as a different input device from the operations buttons 14A to 14K. The touch panel 13 is mounted so as to cover the screen of the lower LCD 12. In the present embodiment, a resistive film type touch panel is used as the touch panel 13, for example. However, the touch panel 13 is not limited to the resistive film type touch panel, but any press-type touch panel may be used. Further, the touch panel 13 used in the present embodiment has the same resolution (detection accuracy) as that of, for example, the lower LCD 12. However, the resolution of the touch panel 13 and that of the lower LCD 12 may not necessarily be the same. In a right side surface of the lower housing 11, an insertion opening (indicated by a dashed line in FIG. 1) is provided. The insertion opening is capable of accommodating a stylus pen 27 which is used for operating the touch panel 13. Although an input on the touch panel 13 is usually performed using the stylus pen 27, the touch panel 13 can be operated not only with the stylus pen 27 but with a finger of the user.

In the right side surface of the lower housing 11, an insertion opening (indicated by a two-dot chain line in FIG. 1) for accommodating a memory card 28 is further provided. Inside the insertion opening, a connector (not shown) is provided for electrically connecting the game apparatus 1 and the memory card 28. The memory card 28 is, for example, an SD (Secure Digital) memory card, and detachably attached to the connector. The memory card 28 is used, for example, for storing (saving) an image captured by the game apparatus 1, and loading an image generated by another apparatus into the game apparatus 1.

Further, in the upper side surface of the lower housing 11, an insertion opening (indicated by a dashed-dotted line in FIG. 1) is provided for accommodating a cartridge 29. Inside the insertion opening, a connector (not shown) is provided for electrically connecting the game apparatus 1 and the cartridge 29. The cartridge 29 is a storage medium in which a game program or the like is stored, and the cartridge 29 is detachably inserted into the insertion opening provided in the lower housing 11.

Three LEDs 15A to 15C are mounted at the left side portion of the connection between the lower housing 11 and the upper housing 21. Here, the game apparatus 1 is capable of performing wireless communication with other apparatuses. The first LED 15A is lit up while the power of the game apparatus 1 is ON. The second LED 155 is lit up while the game apparatus 1 is being charged. The third LED 150 is lit up while the wireless communication is being established. Thus, the three LEDs 15A to 15C allow the user to be informed of a state of ON/OFF of the power of the game apparatus 1, a state of charging of the game apparatus 1, and a state of communication establishment of the game apparatus 1.

Meanwhile, in the upper housing 21, an upper LCD 22 is provided. The upper LCD 22 has a horizontally long shape, and is arranged such that the orientation of the longer sides thereof coincides with the orientation of the longer sides of the upper housing 21. Similarly to the lower LCD 12, a display device of any type different from that of the upper LCD 22, or a display device having any resolution different from that of the upper LCD 22, may be used in place of the upper LCD 22. A touch panel may be provided so as to cover the upper LCD 22. On the upper LCD 22, for example, an operation explanation screen for teaching the user roles of the operation buttons 14A to 14K and the touch panel 13 is displayed.

In the upper housing 21, two cameras (the inner camera 23 and the outer camera 25) are provided. As shown in FIG. 1, the inner camera 23 is mounted at an inner main surface of the upper housing 21, in the vicinity of the aforementioned connection. On the other hand, the outer camera 25 is mounted on a surface reverse to the inner main surface on which the inner camera 23 is mounted, that is, on the outer main surface of the upper housing 21 (which is a surface to be located at the outside of the game apparatus 1 when the game apparatus 1 is in the closed state and which is the back surface of the upper housing 21 shown in FIG. 1). In FIG. 1, the outer camera 25 is indicated by a dashed line. With the above arrangement, the inner camera 23 is capable of capturing an image of a view in a direction in which the inner main surface of the upper housing 21 faces, and the outer camera 25 is capable of capturing an image of a view in a direction opposite to the image capturing direction of the inner camera 23, that is, a view in a direction in which the outer main surface of the upper housing 21 faces. In this manner, in the present embodiment, the two cameras, that is, the inner camera 23 and the outer camera 25, are provided such that the image capturing directions thereof are opposite to each other. For example, the user can capture, by using the inner camera 23, an image of a view that is seen from the game apparatus 1 in the direction of the user's side. Also, the user can capture, by using the outer camera 25, an image of a view that is seen from the game apparatus 1 in the direction opposite to the user.

In the inner main surface of the upper housing 21, near the aforementioned connection, a microphone (a microphone 41 shown in FIG. 2) is accommodated as a sound input device. Also, in the inner main surface of the upper housing 21, near the connection, a microphone hole 16 is formed so as to allow the microphone 41 to detect a sound outside the game apparatus 1. The accommodating position of the microphone 41 and the position of the microphone hole 16 may not necessarily be located near the connection. For example, the microphone 41 may be accommodated in the lower housing 11, and the microphone hole 16 may be provided in the lower housing 11 so as to correspond to the accommodating position of the microphone 41.

On the outer main surface of the upper housing 21, a fourth LED 26 (indicated by a dashed line in FIG. 1) is mounted. The fourth LED 26 is lit up at the time when image capturing is performed with the outer camera 25 (i.e., when the shutter button is pressed). The fourth LED 26 is also lit up while a moving image is being captured by the outer camera 25. The fourth LED 26 allows a subject of image capturing and people in the surroundings to be notified of the image capturing having been performed (or being performed) by the game apparatus 1.

In the inner main surface of the upper housing 21, sound holes 24 are formed to the right and left of the upper LCD 22, respectively, the upper LCD 22 being provided near the center of the inner main surface. Loudspeakers are accommodated in the upper housing 21 at the back of the sound holes 24, respectively. The sound holes 24 are holes for releasing sounds generated by the loudspeakers to the outside of the game apparatus 1.

As described above, the inner camera 23 and the outer camera 25 which are provided for capturing images, and the upper LCD 22 which is display means for displaying an operation explanation screen at the time of, for example, image capturing, are provided in the upper housing 21. Whereas, the input devices (the touch panel 13 and the buttons 14A to 14K) with which to perform operation inputs on the game apparatus 1, and the lower LCD 12 which is display means for displaying a game screen and a chat screen, are provided in the lower housing 11. Accordingly, the input devices can be used in such as manner as follows: when using the game apparatus 1, the user can hold the lower housing 11 and perform inputs via the input devices while looking at captured images (images captured by the cameras) displayed on the lower LCD 12.

Figure 2:
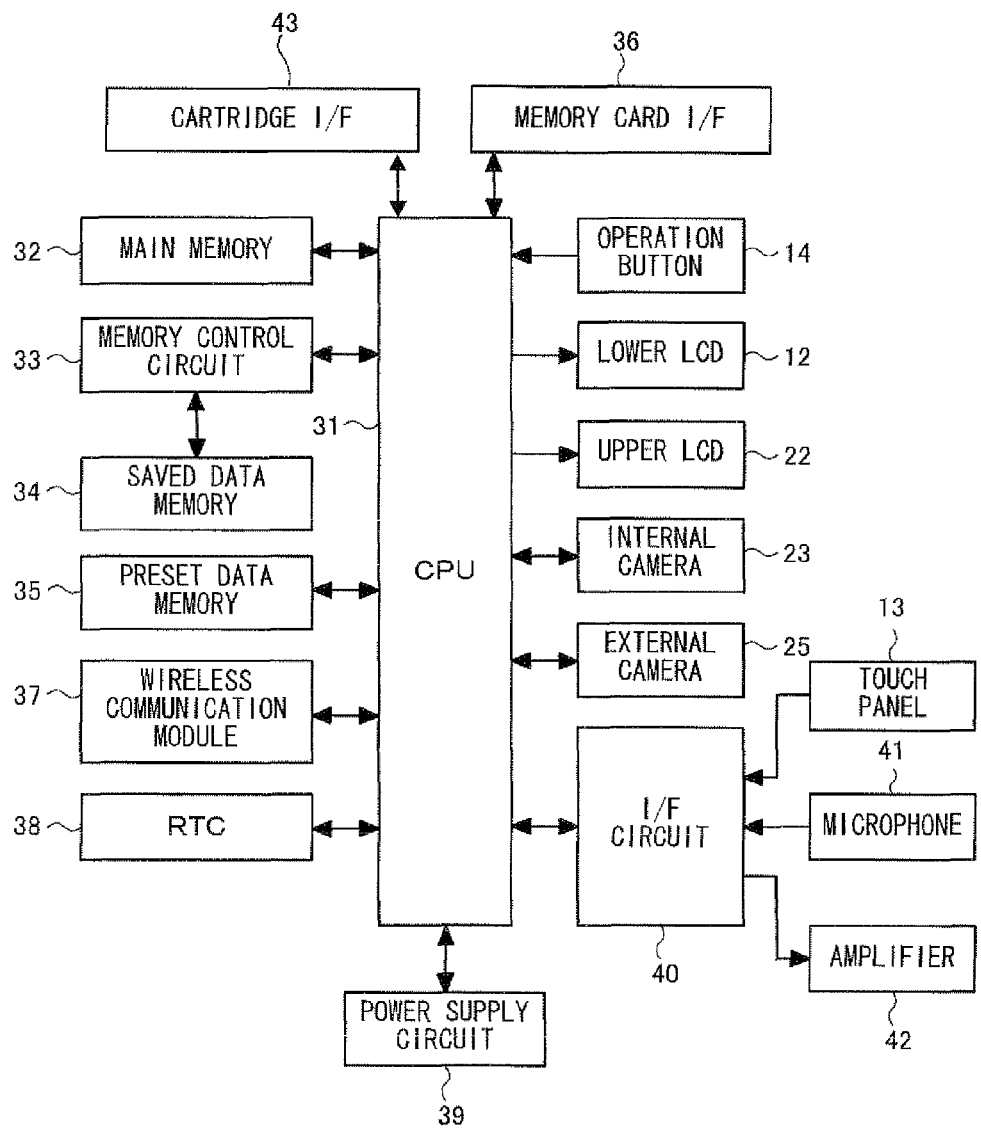
FIG. 2 is a block diagram showing an example of an internal configuration of the game apparatus.

Next, an internal configuration of the game apparatus 1 will be described with reference to FIG. 2. FIG. 2 is a block diagram showing an example of the internal configuration of the game apparatus 1.

As shown in FIG. 2, the game apparatus 1 includes electronic components such as a CPU (Central Processing Unit) 31, a main memory 32, a memory control circuit 33, a saved data memory 34, a preset data memory 35, a memory card interface (memory card I/F) 36, a cartridge I/F 43, a wireless communication module 37, a real time clock (RTC) 38, a power supply circuit 39, an interface circuit (I/F circuit) 40, and the like. These electronic components are mounted on an electronic circuit substrate and accommodated in the lower housing 11 (or in the upper housing 21).

The CPU 31 is information processing means for executing predetermined programs (including an input program of certain exemplary embodiments of the present invention). In the present embodiment, the predetermined programs are stored in a memory (e.g., the saved data memory 34) within the game apparatus 1 or in the memory card 28 and/or the cartridge 29. The CPU 31 executes such a predetermined program, thereby executing a character input process that is described below with reference to FIGS. 24 and 25. Note that programs to be executed by the CPU 31 may be stored in advance in a memory within the game apparatus 1, or may be obtained from the memory card 28 and/or the cartridge 29, or may be obtained from another apparatus through communication with this other apparatus. For example, a program may be obtained by means of download via the Internet from a predetermined server, or may be obtained by downloading a predetermined program stored in a stationary game apparatus through communication with the stationary game apparatus.

The main memory 32, the memory control circuit 33, and the preset data memory 35 are connected to the CPU 31. The saved data memory 34 is connected to the memory control circuit 33. The main memory 32 is storage means used as a work area and a buffer area for the CPU 31. In other words, the main memory 32 stores various data used in the aforementioned character input process or in a communication process, and also stores a program obtained from the outside (e.g., from the memory card 28, the cartridge 29, another apparatus, or the like). In the present embodiment, a PSRAM (Pseudo-SRAM) is used as the main memory 32, for example. The saved data memory 34 is storage means for storing a program to be executed by the CPU 31, data of images captured by the inner camera 23 and the outer camera 25, and the like. The saved data memory 34 is structured as a nonvolatile storage medium. In the present embodiment, the saved data memory 34 is structured as a NAND flash memory, for example. The memory control circuit 33 is a circuit that controls, in accordance with instructions from the CPU 31, reading and writing of data from and into the saved data memory 34. The preset data memory 35 is storage means for storing data (preset data), such as various parameters preset in the game apparatus 1. A flash memory connected to the CPU 31 via an SPI (Serial Peripheral Interface) bus can be used as the preset data memory 35.

The memory card I/F 36 is connected to the CPU 31. The memory card I/F 36 reads and writes data from and into the memory card 28 attached to the connector, in accordance with instructions from the CPU 31. In the present embodiment, data of images captured by the outer camera 25 is written into the memory card 28, and image data stored in the memory card 28 is read from the memory card 28 to be stored in the saved data memory 34.

The cartridge I/F 43 is connected to the CPU 31. The cartridge I/F 43 reads and writes data from and into the cartridge 29 attached to the connector, in accordance with instructions from the CPU 31. In the present embodiment, an application program executable by the game apparatus 1 is read from the cartridge 29 to be executed by the CPU 31, and data relating to the application program (e.g. saved data of a game) is written into the cartridge 29.

The wireless communication module 37 has a function to connect to a wireless LAN, for example, by a method conformed to the standard of IEEE802.11b/g. The wireless communication module 37 has a function to perform wireless communication of which the data transmission distance is in a range of, for example, 10 m, with a game apparatus of the same type as the game apparatus 1, by using a predetermined communication method. The wireless communication module 37 is connected to the CPU 31. The CPU 31 is capable of transmitting/receiving data to/from another apparatus (e.g., a stationary game apparatus, a game apparatus of the same type as the game apparatus 1, a personal computer, or the like) via the Internet (or without using the Internet), by means of the wireless communication module 37. For example, the CPU 31 transmits/receives text data to/from another apparatus, thereby allowing the user of the game apparatus 1 to perform chatting with the user of this other apparatus.

The CPU 31 is capable of transmitting/receiving data to/from another game apparatus that is of the same type as the game apparatus 1, by using the wireless communication module 37. For example, the CPU 31 can transmit/receive data to/from another game apparatus when the location of the game apparatus 1 and the location of this other game apparatus are within a range that allows communication to be performed therebetween (e.g., when the distance between these two apparatuses is equal to or shorter than 10 m). For example, the CPU 31 transmits/receives text data to/from the other game apparatus, thereby allowing the user of the game apparatus 1 to perform chatting with the user of the other game apparatus.

The RTC 38 and the power supply circuit 39 are connected to the CPU 31. The RTC 38 counts time, and outputs the time to the CPU 31. For example, the CPU 31 is capable of calculating a current time (date) and the like based on the time counted by the RTC 38. The power supply circuit 39 controls power supplied from a power source (typically, a battery accommodated in the lower housing 11) of the game apparatus 1 to supply the power to each component of the game apparatus 1.

The game apparatus 1 includes the microphone 41 and an amplifier 42. The microphone 41 and the amplifier 42 are connected to the I/F circuit 40. The microphone 41 detects a voice uttered by the user in the direction of the game apparatus 1, and outputs sound signals indicative of the voice to the I/F circuit 40. The amplifier 42 amplifies sound signals from the I/F circuit 40, and causes the loudspeakers (not shown) to output the amplified signals. The I/F circuit 40 is connected to the CPU 31.

The touch panel 13 is connected to the I/F circuit 40. The I/F circuit 40 includes a sound control circuit for controlling the microphone 41 and the amplifier 42 (the loudspeakers), and includes a touch panel control circuit for controlling the touch panel 13. The sound control circuit performs A/D conversion or D/A conversion of a sound signal, and converts a sound signal into sound data in a predetermined format. The touch panel control circuit generates touch position data in a predetermined format based on a signal from the touch panel 13, and outputs the touch position data to the CPU 31. For example, the touch position data indicates coordinates of a position on an input surface of the touch panel 13, at which position an input has been performed. Note that the touch panel control circuit reads a signal from the touch panel 13 and generates touch position data every predetermined time period. By obtaining the touch position data via the I/F circuit 40, the CPU 31 can recognize a position on the touch panel 13, at which position an input has been performed.

Operation buttons 14 include the above-described operation buttons 14A to 14K, and are connected to the CPU 31. The operation buttons 14 output, to the CPU 31, operation data indicating input states of the operation buttons 14A to 14K (i.e., indicating whether or not the operation buttons 14A to 14K are being pressed). The CPU 31 obtains the operation data from the operation buttons 14, and thereby executes processing in accordance with inputs that have been performed via the operation buttons 14.

The inner camera 23 and the outer camera 25 are connected to the CPU 31. Each of the inner camera 23 and the outer camera 25 captures an image in accordance with an instruction from the CPU 31, and outputs data of the captured image to the CPU 31. In the present embodiment, the CPU 31 instructs one of the inner caera 23 and the outer camera 25 to capture an image, and the camera which has received the instruction captures an image and sends image data to the CPU 31.

The lower LCD 12 and the upper LCD 22 are connected to the CPU 31. Each of the lower LCD 12 and the upper LCD 22 displays an image thereon in accordance with an instruction from the CPU 31.

Figure 3:
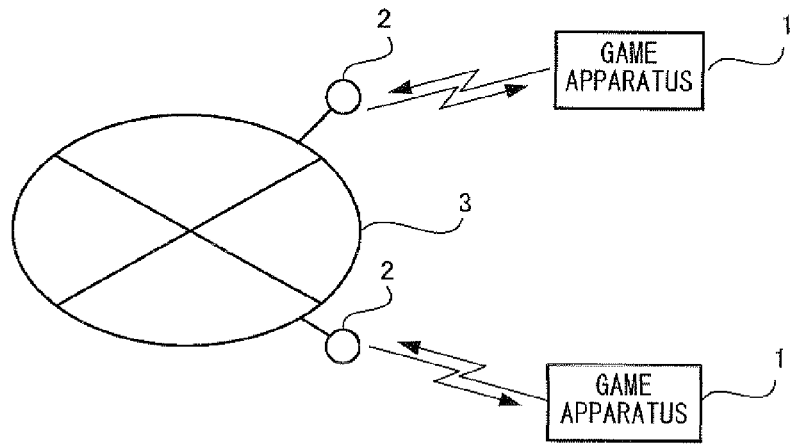
FIG. 3 shows the game apparatus communicating with another game apparatus.

Hereinafter, communication performed by the game apparatus 1 with another game apparatus 1 will be described with reference to FIG. 3. FIG. 3 illustrates communication performed between the game apparatus 1 and this other game apparatus 1. These two game apparatuses 1 each perform wireless communication with a nearest access point 2 (e.g., an access point located within 10 m therefrom). The game apparatuses 1 communicate with each other via the access points 2 and a wide area network 3 (the Internet, WAN, or the like) to which the access points 2 are connected. In the present embodiment, the game apparatus 1 transmits/receives text data to/from the other game apparatus 1. The text data indicates characters inputted by the users of the game apparatuses 1. Accordingly, through the transmission/reception of the text data, the users of the two game apparatuses 1 can perform chatting therebetween.

In FIG. 3, the number of game apparatuses 1 communicating with each other is two. However, the present invention is not limited thereto. Three or more game apparatuses 1 may communicate with each other to perform chatting. The game apparatuses 1 may directly communicate with each other for chatting without involving the access points 2 and the wide area network 3. Further, the game apparatus 1 may perform communication with a stationary game apparatus or a general-purpose computer.

Described below with reference to FIGS. 4 to 16C is the manner of inputting a character string to be contained in data that is transmitted by the game apparatus 1 to the other game apparatus 1. Features of the present embodiment relate to the below-described manner of inputting a character string.

FIGS. 4 to 8, and 12 show examples of chat screens displayed on the game apparatus 1 according to the present embodiment. FIGS. 9 to 11 and 13 to 16C show examples of chat windows displayed on the game apparatus 1 according to the present embodiment.

(First Feature of the Present Embodiment)

Hereinafter, a first feature of the present embodiment will be described with reference to FIGS. 4 and 5.

Figure 4:
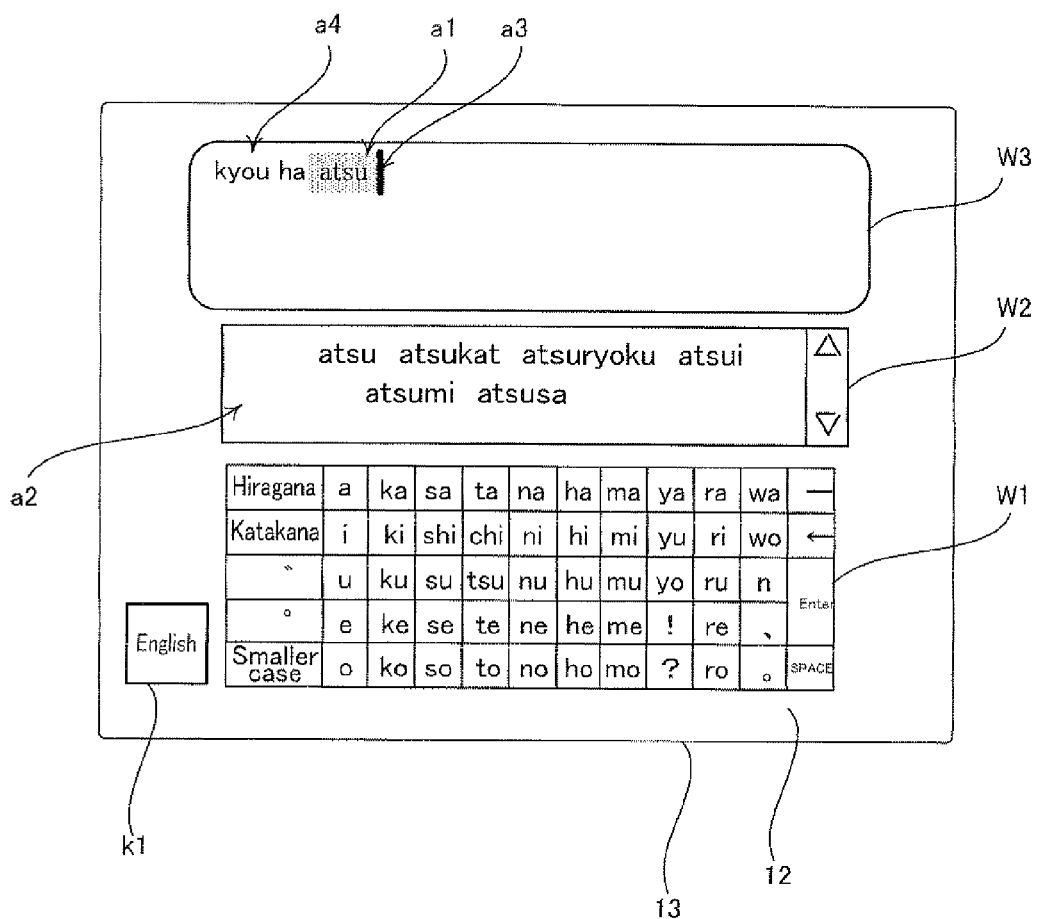
FIG. 4 shows an example of a character input screen displayed on a lower LCD.

In the present embodiment, a chat screen as shown in FIG. 4 is displayed, which allows the user to input characters. The chat screen is an interface screen for receiving an input of a character by the user. The chat screen is displayed on the lower LCD 12, and includes a key window W1, an option character string window W2, and a chat window W3. Note that, characters inputted in examples described in the embodiment below are Japanese characters unless otherwise specified. The Japanese language uses a plurality of different types of characters (hiragana, katakana, and kanji), and is written with a combination of these different types of characters. However, in the embodiment below, the Japanese language is expressed only in Roman characters, and basically, actual differences in Japanese character type therein are not indicated. If there is a necessity to indicate such differences in Japanese character type, the differences are indicated within parentheses that are provided following a character or a character string expressed in Roman characters.

The key window W1 is a window for displaying keys by which characters (e.g., Japanese syllabary characters) can be inputted. When the user touches, with the stylus pen 27, the touch panel 13 on the position of one of the keys displayed in the key window W1, a character indicated by said one of the keys is inputted, accordingly. A character inputted in this manner is hereinafter referred to as an "input character a1".

The option character string window W2 is a window for displaying option character strings a2 that correspond to an input character a1. Option character strings a2 are each a character string (which may be a single character) which is registered in an option character string database in association with a corresponding input character a1. The option character string database will be described in detail below with reference to FIG. 17. When an input character a1 is inputted by the user, option character strings a2 corresponding to the input character a1 are obtained from the option character string database and displayed in the option character string window W2.

Note that a "character string" herein is a character (or a set of characters) which is a component of a sentence constructed with characters and which is regarded as a single unit having a certain function. For example, a character string is a word, clause, punctuation mark, morpheme, stem, or the like. In the present embodiment, character strings are mainly words. Therefore, in the description below, a character string may be alternatively referred to as a word. Although character strings are mainly words in the present embodiment, the character strings may include a clause, a punctuation mark, a morpheme, a stem, and the like. In some cases, a single character constitutes a character string. Further, in the present embodiment, referred to as a "character" (or characters) is one or more characters that are not regarded as a single unit having a certain function unlike a character string.

The chat window W3 is a window for displaying a sentence inputted by the user. The chat window W3 displays, together with an input character a1, a cursor a3 that indicates a text insertion point. An input character a1 having been inputted by the user is still an unfixed character. When an input character a1 is an unfixed character, the data of the input character a1 cannot be transmitted to the other game apparatus 1 on the receiving end. If the cursor a3 is moved when the input character a1 is in this unfixed state, the input character a1 is deleted from the display in the chat window W3.

The chat window W3 also displays a character string a4 that is a fixedly inputted character string (hereinafter, referred to as a "fixed character string a4"). A fixed character string a4 is displayed when the user has selected one of the option character strings a2 displayed in the option character string window W2. The fixed character string a4 displayed in this manner is the same character string as the selected option character string a2.

The first feature of the present embodiment includes the following: only an option character string a2 selected by the user becomes a fixed character string a4; and only the data of the fixed character string a4 is transmitted from the game apparatus 1 to the other game apparatus 1 (i.e., transmission of a character string in the state of unfixed character is impossible). For instance, in the example of FIG. 4, when the game apparatus 1 has received an instruction to transmit text data to the other game apparatus 1, only "kyou" and "ha" that are fixed character strings a4 are transmitted, and "atsu" in the state of unfixed character is not transmitted. Accordingly, by selecting character strings to be displayed as option character strings a2, such that the selected character strings do not include an inappropriate expression, an input of an inappropriate word as a fixed character string a4 and a transmission of such an inappropriate word to the other game apparatus 1 can be effectively prevented. In other words, even if the user inputs a word (input characters a1) that is an inappropriate expression, the input characters a1 do not become a fixed character string a4 unless the input characters a1 are registered in the option character string database. In this manner, an inappropriate word can be effectively prevented from being fixedly inputted, and thereby a transmission of the inappropriate word to the other game apparatus 1 can be effectively prevented. Here, considered as inappropriate words include those offensive to the recipient, such as slandering or defamatory words, and also include those indicating personal information such as residential addresses and names.

Note that, preferably, an input character a1 and a fixed character string a4 are displayed in a manner that allows the user to identify them. In FIG. 4, the background of input characters a1 is colored grey. As an alternative, for example, the display may be provided in the following manner: the background of an input character a1 is colored blue; the input character a1 is displayed in black; the background of a fixed character string a4 is displayed in the same color as that of the other background parts except the background of the input character a1; and the fixed character string a4 is displayed in black. However, the manner of displaying an input character a1 and a fixed character string a4 is not limited to the above. An input character a1 and a fixed character string a4 may not necessarily be displayed in such an identifiable manner.

Note that, in the present embodiment, an English input switch key k1 is displayed in the chat screen shown in FIG. 4. By touching the touch panel 13 on the position of the English input switch key k1, a chat screen that allows English input is displayed as shown in FIG. 5. Similarly to the chat screen for Japanese input as shown in FIG. 4, the chat screen for English input includes the windows W1 to W3. Displays in the windows W2 and W3 are the same as those of the chat screen in FIG. 4 for Japanese input except that the displays therein are not in Japanese but in English. Although in FIG. 5 the display in the key window W1 is provided differently such that a to z alphabet keys are displayed in place of the Japanese syllabary character keys, the use of the key window W1 is the same as that of the chat screen in FIG. 4 for Japanese input. In the chat screen for English input, a Japanese input switch key k2 is displayed in place of the English input switch key k1. By touching the touch panel 13 on the position of the Japanese input switch key k2, the display is switched such that the chat screen for Japanese input is displayed as shown in FIG. 4. In the present embodiment, the game apparatus 1 allows both English input and Japanese input. However, the game apparatus 1 may allow only one of them. Moreover, the game apparatus 1 may allow input of three or more languages.

(Second Feature of the Present Embodiment)

Figure 6:
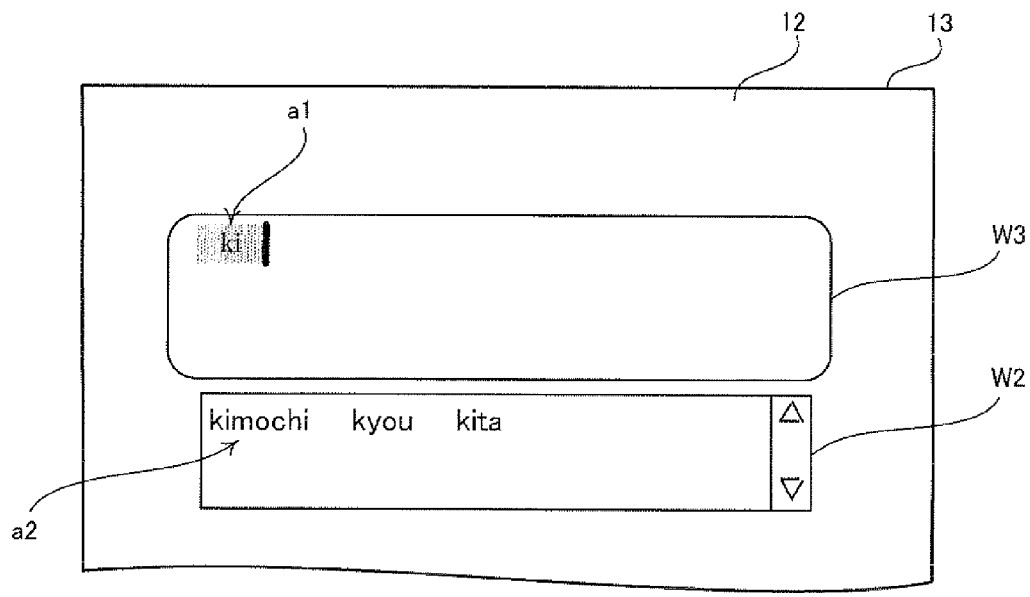
FIG. 6 shows an example of the character input screen displayed on the lower LCD.
Figure 7:
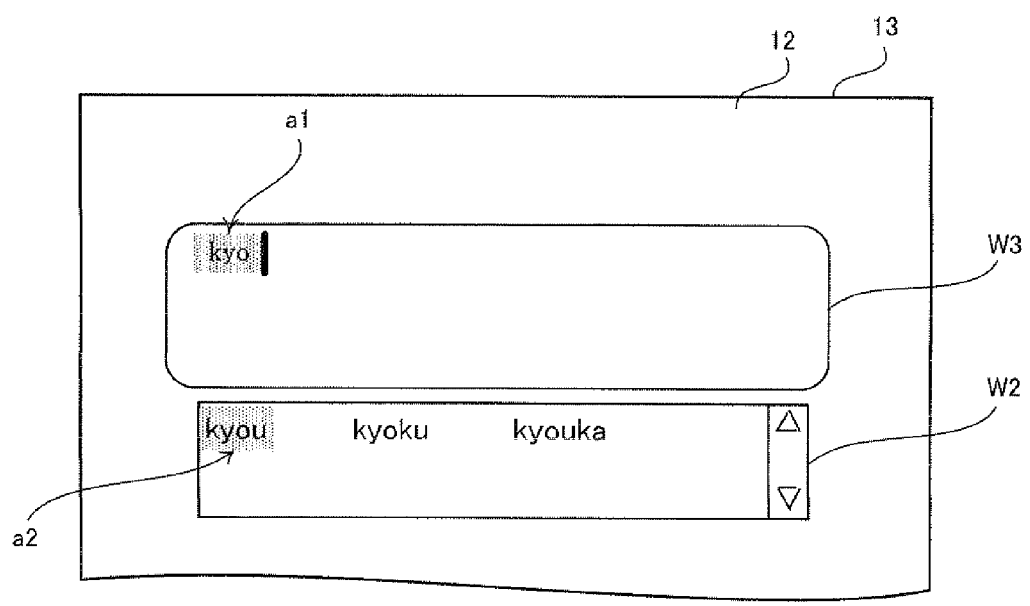
FIG. 7 shows an example of the character input screen displayed on the lower LCD.

Hereinafter, a second feature of the present embodiment will be described with reference to FIGS. 6 and 7. FIG. 6 shows "ki" (a single Japanese character) being displayed as an input character a1. In this case, option character strings a2, each of which includes "ki" as the initial portion thereof, are extracted from the option character string database and displayed in the option character string window W2 (In the case of Japanese input, when "ki" is inputted as an input character a1, option character strings a2 each including "ky" as the initial portion thereof are also extracted and displayed together with option character strings a2 each including "ki" as the initial portion thereof). In this example, three words "kimochi", "kyou", and "kite" are displayed as option character strings a2. In FIG. 7, since the user has inputted "yo" (in Japanese smaller case) after "ki", the input characters a1 become "kyo". Then, option character strings a2 each including "kyo" as the initial portion thereof are extracted from the option character string database and displayed in the option character string window W2. In this example, three words "kyou", "kyoku", and "kyouka" are displayed as option character strings a2.

The second feature of the present embodiment is that among the option character strings a2 extracted from the option character string database, option character strings a2 to be displayed are only those eligible to become fixed character strings a4 (i.e., only those satisfying predetermined conditions). To be specific, only words that satisfy the predetermined conditions, that is, only words connectable to an immediately preceding word (i.e., connectable to a word immediately preceding the input character a1), are displayed. In the examples of FIGS. 6 and 7, since there is no word present immediately before "ki" and "kyo" that are input characters a1, it is determined in each example that the immediately preceding word is "empty". In the present embodiment, the term "empty" refers to a state where information has not been inputted (i.e., a state where there is no word set as the immediately preceding word). However, as an alternative, information that indicates absence of the immediately preceding word may be set as the immediately preceding word. It is determined whether or not option character strings a2 obtained from the option character string database are connectable to "empty". Then, only option character strings a2 connectable thereto are displayed. Note that the predetermined conditions are set such that all the option character strings a2 are connectable to "empty".

For instance, in the example of FIG. 7, when the option character strings a2 "kyou", "kyoku", and "kyouka" corresponding to "kyo" are obtained from the option character string database, it is determined whether or not "kyou", "kyoku", and "kyouka" are connectable to "empty". Here, the predetermined conditions are set such that all the option character strings a2 are connectable to "empty". Accordingly, "kyou", "kyoku", and "kyouka" are determined to have satisfied the predetermined conditions, and all of these words are displayed as option character strings a2.

As described above, according to the second feature of the present embodiment, only words satisfying the predetermined conditions are displayed as option character strings a2. Therefore, an inappropriate expression can be more effectively prevented from being fixedly inputted, as compared to the conventional technique in which a list of inappropriate words is stored in the apparatus in advance and only the words listed in the list are blacked out when displayed. To be specific, in the technique in which a list of inappropriate words is prepared in advance, if there is an inappropriate word that is not in the list, the inappropriate word can be inputted. Whereas, according to the second feature of the present embodiment, only words satisfying the predetermined conditions become option character strings a2 to be displayed. Therefore, as compared to the conventional technique, an inappropriate expression can be more effectively prevented from being fixedly inputted.

Furthermore, whether or not to display an option character string a2 is determined based on whether or not the potion character string a2 is connectable to the word immediately preceding the input character a1. Accordingly, even if the user inputs "shika" as input characters a1 immediately after "uma", "shika" is not displayed as an option character string a2 if "shika" is not set to be connectable to "uma". Consequently, the user cannot input a combination of "uma" and "shika", which is an inappropriate expression in Japanese. Thus, the user cannot input an inappropriate expression by separately selecting, from the option character strings a2, two words that are to be displayed successively. Consequently, an input of an inappropriate expression can be more effectively prevented. Note that, in the present embodiment, being a word that is, from a moral standpoint, connectable to the word immediately preceding the input character a1 is set as one of the predetermined conditions. In addition, being a word whose part of speech is connectable to the part of speech of the word immediately preceding the input character a1 is also set as another one of the predetermined conditions. Accordingly, a grammatically wrong expression can also be effectively prevented from being fixedly inputted.

(Third Feature of the Present Embodiment)

Figure 8:
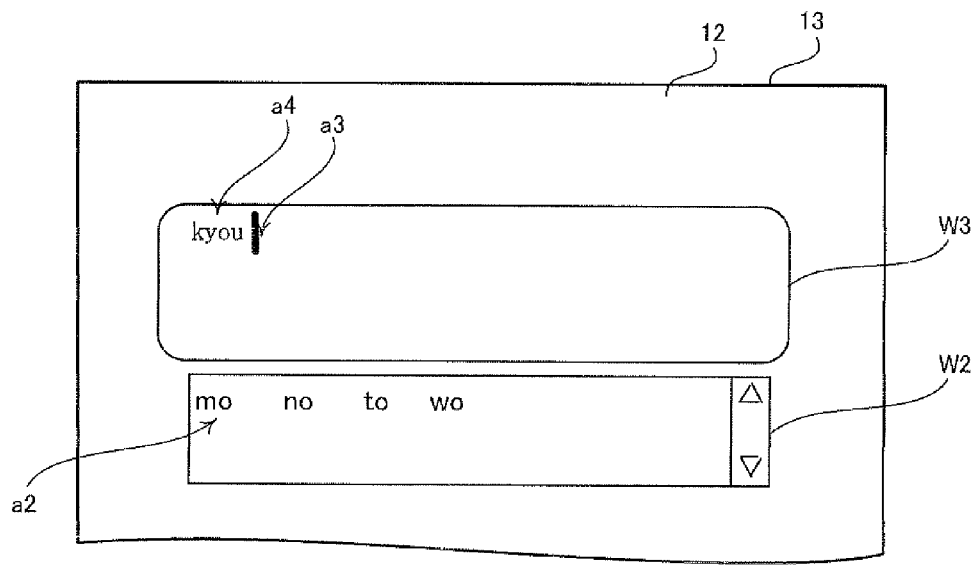
FIG. 8 shows an example of the character input screen displayed on the lower LCD.

Next, a third feature of the present embodiment will be described with reference to FIGS. 7 to 11. When "kyou" is selected from among the option character strings a2 displayed in the option character string window W2 shown in FIG. 7, a chat screen as shown in FIG. 8 is displayed. Note that the user can select one of the option character strings a2 by touching the touch panel 13 on the position of a desired option character string a2. The selected option character string a2 is, for example, colored for a predetermined time period in a recognizable manner. Thereafter, as shown in FIG. 8, all the option character strings a2 ("kyou", "kyoku", and "kyouka") in the option character string window W2 are deleted. At the same time, the selected option character string a2 "kyou" is displayed as a fixed character string a4 in the chat window W3. Here, the selected option character string a2 "kyou" is displayed in place of the input characters a1 "kyo".

The third feature of the present embodiment is that when the user selects an option character string a2, it is determined whether or not the option character string a2 is connectable to the word immediately following the input character a1, and only when the option character string a2 is determined to be connectable thereto, the option character string a2 becomes a fixed character string a4. In the examples of FIGS. 7 and 8, there is no word displayed immediately after "kyo". In this case, immediately after "kyo" is determined to be "empty". Then, it is determined whether or not the selected option character string a2 "kyou" is connectable to "empty". When "kyou" is determined to be connectable to "empty", "kyou" is displayed as a fixed character string a4 in the chat window W3. Note that predetermined conditions for an option character string a2 to be connectable to the word immediately following the input character a1 are set such that all the option character strings a2 are connectable to "empty" FIG. 8 shows that "kyou" is displayed as a fixed character string a4.

Figure 9:
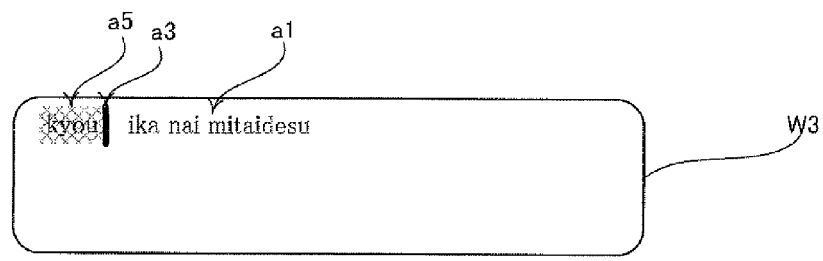
FIG. 9 shows an example of a character input window displayed on the lower LCD.

When the selected option character string a2 is determined to be not connectable to the word immediately following the input character a1, the option character string a2 is displayed in the chat window W3 as an edited character string a5 in an unfixed state (see FIG. 9). In the example of FIG. 9, the word immediately following the input characters a1 "kyo" is "ika". Since the word "kyou" does not satisfy conditions to become connectable to "ika", the word "kyou" is displayed in the chat window W3 in a manner identifiable as an edited character string a5.

Figure 10:
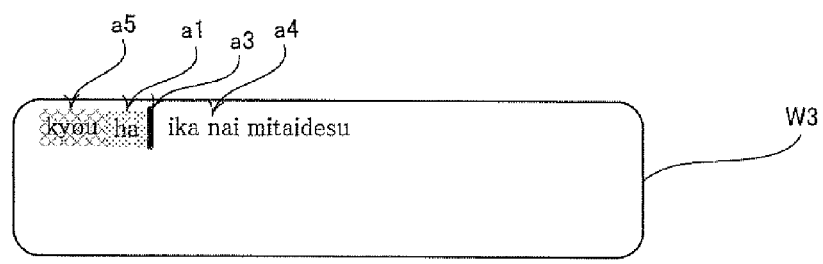
FIG. 10 shows an example of the character input window displayed on the lower LCD.

If the edited character string a5 has been displayed, the edited character string a5 may be changed into a fixed character string a4, by newly selecting an option character string a2 that follows the edited character string a5. To be specific, as shown in FIG. 10, the user inputs a new input character a1 (in this example, "ha" (a single Japanese character)) so as to follow the edited character string a5 "kyou". In this case, new option character strings a2 (e.g., "ha", "hanmei", "hawai") are displayed. Here, when the user selects one of the new option character strings a2 (e.g., "ha"), the newly selected option character string a2 becomes a fixed character string a4 if the newly selected option character string a2 (e.g., "ha") is connectable to the immediately following word "ika". In addition, if the edited character string a5 "kyou", which immediately precedes the newly selected option character string a2 (e.g., "ha"), is connectable to the newly selected option character string a2, then the edited character string a5 is changed into a fixed character string a4 in the display (see FIG. 11).

As described above, the third feature of the present embodiment is that only when the word immediately following the input character a1 is connectable to the option character string a2 selected by the user, the selected option character string a2 becomes a fixed character string a4. Therefore, in the case where the user inputs "uma" as input characters a1 immediately preceding a word "shika", even if "uma" is displayed as an option character string a2, "uma" cannot become a fixed character string a4 unless "uma" is set to be connectable to "shika". Consequently, the combination of "uma" and "shika", which is an inappropriate expression in Japanese, cannot be inputted. Thus, the user cannot input an inappropriate expression by separately selecting, from the option character strings a2, two words that are to be displayed successively. Consequently, an input of an inappropriate expression can be more effectively prevented. Note that, in the present embodiment, being a word that is, from a moral standpoint, connectable to the word immediately following the input character a1 is set as one of the predetermined conditions. In addition, being a word whose part of speech is connectable to the part of speech of the word immediately following the input character a1 is also set as another one of the predetermined conditions. Accordingly, a grammatically wrong expression can also be effectively prevented from being fixedly inputted.

Described below is the reason that the above-described display manner is employed instead of a display manner in which, at the selection of option character strings a2 to be displayed, option character strings a2 connectable to both the word preceding the input character a1 and the word following the input character a1 are displayed. Note that the "above-described display manner" refers to the one in which: it is determined, at the selection of option character strings a2 to be displayed, whether or not there are option character strings a2 that are connectable to the word immediately preceding the input character a1, and if there are, it is then determined whether or not an option character string a2 selected therefrom by the user is connectable to the word immediately following the input character a1, thereby determining whether or not the selected option character string a2 can become a fixed character string a4.

To be specific, the above-described manner allows a word to be more readily inserted between two fixed character strings a4 as compared to the display manner in which, at the selection of option character strings a2 to be displayed, option character strings a2 connectable to both the word preceding the input character a1 and the word following the input character a1 are displayed. For example, assume a case where a fixed character string a4 (referred to as "A") and another fixed character string a4 (referred to as "B") are displayed successively and a word is to be inserted between "A" and "B". In this case, when only option character strings a2 that are connectable to both the character string "A" preceding an input character a1 and the character string "B" following the input character a1 are to be displayed, the variety of words displayed as option character strings a2 is limited. This results in less chance of a word desired by the user being displayed. For example, in the English input, in the case of additionally inserting two or more words (e.g., "am" and "a") between "I" and "girl", option character strings a2 to be displayed are selected by first focusing only on input characters "am" that are additionally inserted first. Here, being connectable not only to "I" which is a character string preceding "am" but also to "girl" which is a character string following "am" is a condition for an option character string a2 to be displayed. Therefore, "am" is not displayed as an option character string. On the other hand, in the present embodiment, an option character string is determined to be displayed as long as the option character string is connectable to the character string "I" which precedes the input characters "am". Accordingly, an option character string "am" is displayed. When the option character string "am" is selected by the user, an option character string "a" corresponding to "am" is displayed. When "a" is selected by the user, "am" is fixedly inputted since "am" is connectable to the following character string "a". In addition, since "a" is connectable to the following character string "girl", "a" is fixedly inputted. In this manner, a sentence "I am a girl", which is not an inappropriate expression, can be fixedly inputted.

As described above, in the present embodiment, words that are connectable to the character string "A" preceding the input character a1 are displayed as option character strings a2. This allows a greater variety of words to be displayed as option character strings a2. When an option character string a2 which the user has selected therefrom (e.g., "C") is not connectable to the character string "B" following the input character a1, the selected option character string a2 does not become a fixed character string a4 (but becomes an edited character string a5). Here, by inputting an input character a1 that follows "C" and selecting an option character string a2 (e.g., "D") corresponding to the input character a1, both the character strings "C" and "D" may be changed into fixed character strings a4. To be specific, if "D" is connectable to "B", "D" becomes a fixed character string a4. Then, if "C" is connectable to "D", "C" becomes a fixed character string a4. Thus, in the present embodiment, while an inappropriate expression is prevented from being fixedly inputted, various option character strings a2 can be displayed and thereby the number of option character strings a2 selectable by the user is increased.

(Fourth Feature of the Present Embodiment)

Hereinafter, a fourth feature of the present embodiment will be described with reference to FIGS. 8 and 12. As shown in FIG. 8, in the present embodiment, when a fixed character string a4 has been displayed, option character strings a2 corresponding to the fixed character string a4 are obtained from the option character string database and displayed. In this manner, the option character strings a2 can be displayed without requiring the user to input an input character a1. Similarly to the above-described second feature of the present embodiment, the option character strings a2 displayed here are words that satisfy conditions to become connectable to the immediately preceding fixed character string a4.

Figure 12:
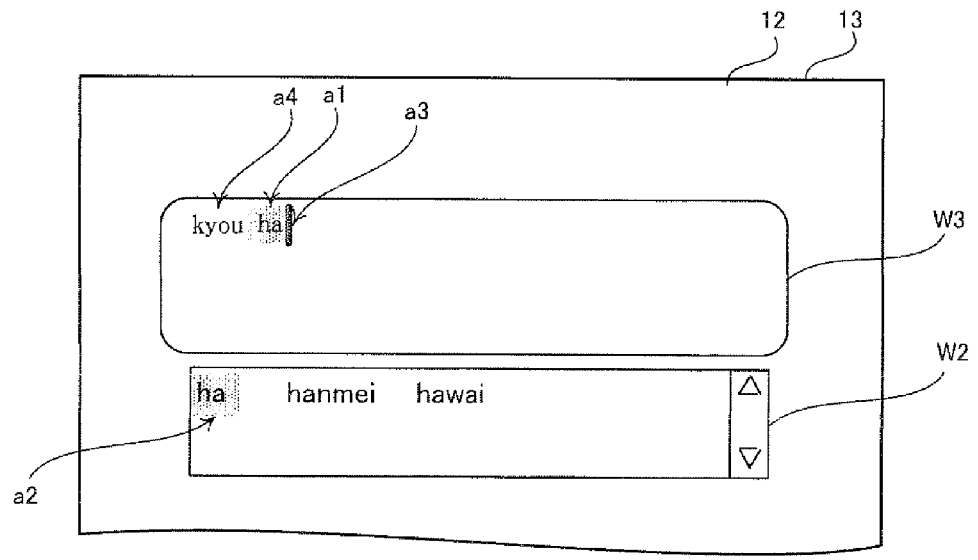
FIG. 12 shows an example of the character input screen displayed on the lower LCD.

Note that, as shown in FIG. 12, if an input character a1 is inputted when option character strings a2 corresponding to a fixed character string a4 are being displayed, then the option character strings a2 displayed in the option character string window W2 are switched to those corresponding to the input character a1.

(Fifth Feature of the Present Embodiment)

Hereinafter, a fifth feature of the present embodiment will be described with reference to FIGS. 5, 11, and 13 to 16C.

Figure 11:
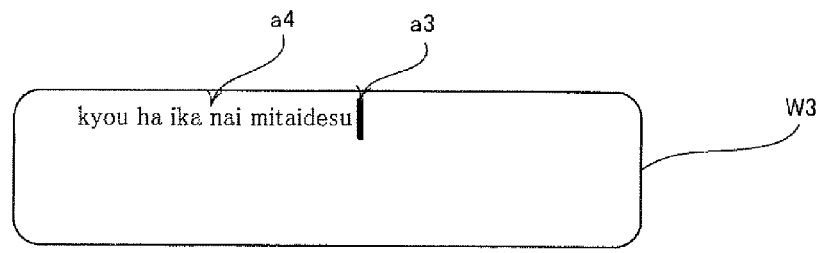
FIG. 11 shows an example of the character input window displayed on the lower LCD.
Figure 13:
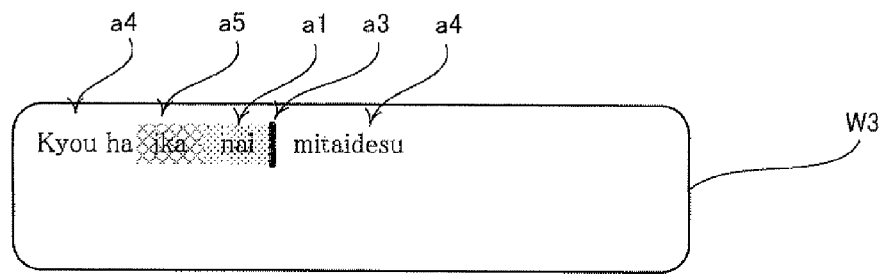
FIG. 13 shows an example of the character input window displayed on the lower LCD.

The fifth feature of the present embodiment is that in the case where the game apparatus 1 deletes a fixed character string a4 being displayed, the game apparatus 1 determines whether or not words preceding and following the fixed character string a4 to be deleted are connectable to each other. A specific example is described below. As shown in FIG. 11, a sentence "kyou ha ika nai mitaidesu" structured with fixed character strings a4 is displayed in the chat window W3. Here, when the cursor a3 is moved so as to be located immediately behind "ika nai" and the touch panel 13 is pressed on the position of a Backspace key (displayed in the key window W1), "nai" becomes a word to be deleted. To be specific, the display of the chat window W3 is changed as shown in FIG. 13, such that "nai" is changed into input characters a1 in an unfixed state.

Here, it is determined whether or not the word "ika" and the word "mitaidesu" preceding and following the word "nai" to be deleted are connectable to each other. When these words are connectable to each other, only "nai" is changed into input characters a1. On the other hand, when these words are not connectable to each other, "ika" is changed into an edited character string a5 in an unfixed state as shown in FIG. 13. In this case, a word which is, among the words preceding the word "nai" to be deleted, the nearest word to "nai" and which is connectable to the word "mitaidesu" immediately following "nai", is determined i.e., a connectable character string is determined). In the example of FIG. 13, the word "ha" immediately preceding "ika" and the word "mitaidesu" following "ika" are determined to be connectable to each other, and "ha" is determined to be a connectable character string. In this case, as shown in FIG. 13, "ika nai" present between the connectable character string "ha" and the word "mitaidesu" enters an unfixed state. To be specific, "ika" is changed into an edited character string a5 in the display, and "nai" is changed into input characters a1 in the display.

Figure 14:
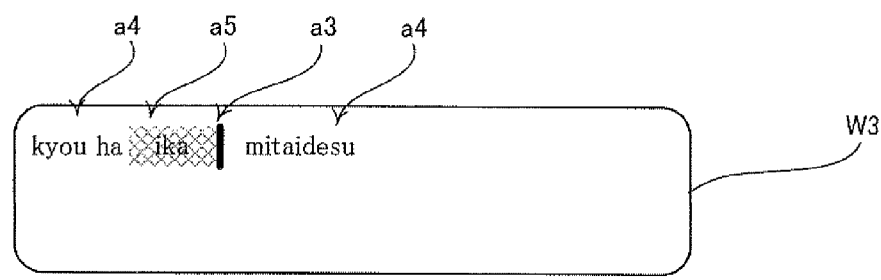
FIG. 14 shows an example of the character input window displayed on the lower LCD.
Figure 15:
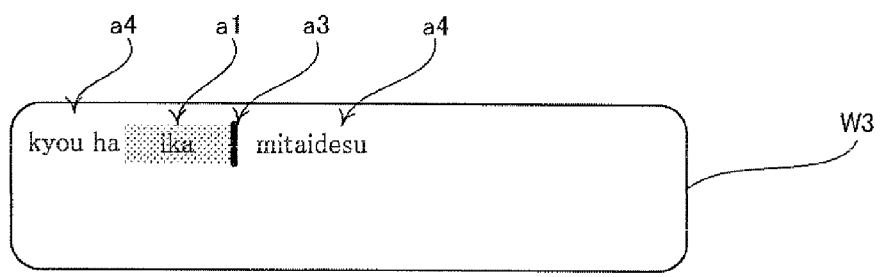
FIG. 15 shows an example of the character input window displayed on the lower LCD.

Note that, deletion of a word cannot be performed unless the word is in the state of input characters a1. When the word "nai" is in this state, "nai" can be deleted from the chat window W3 as shown in FIG. 14 by pressing the touch panel 13 on the position of the Backspace key (displayed in the key window W1). When the touch panel 13 is further pressed on the position of the Backspace key (displayed in the key window W1), the edited character string a5 "ika" is changed into input characters a1 in the display as shown in FIG. 15. Since input characters a1 are displayed in hiragana characters, the edited character string a5 "ika" (displayed in kanji and hiragana characters) is changed so as to be displayed as input characters a1 only in hiragana characters. Thereafter, each time the touch panel 13 is pressed on the position of the Backspace key (displayed in the key window W1), the characters "ika" are deleted one by one from the rearmost character thereof.

Figure 5:
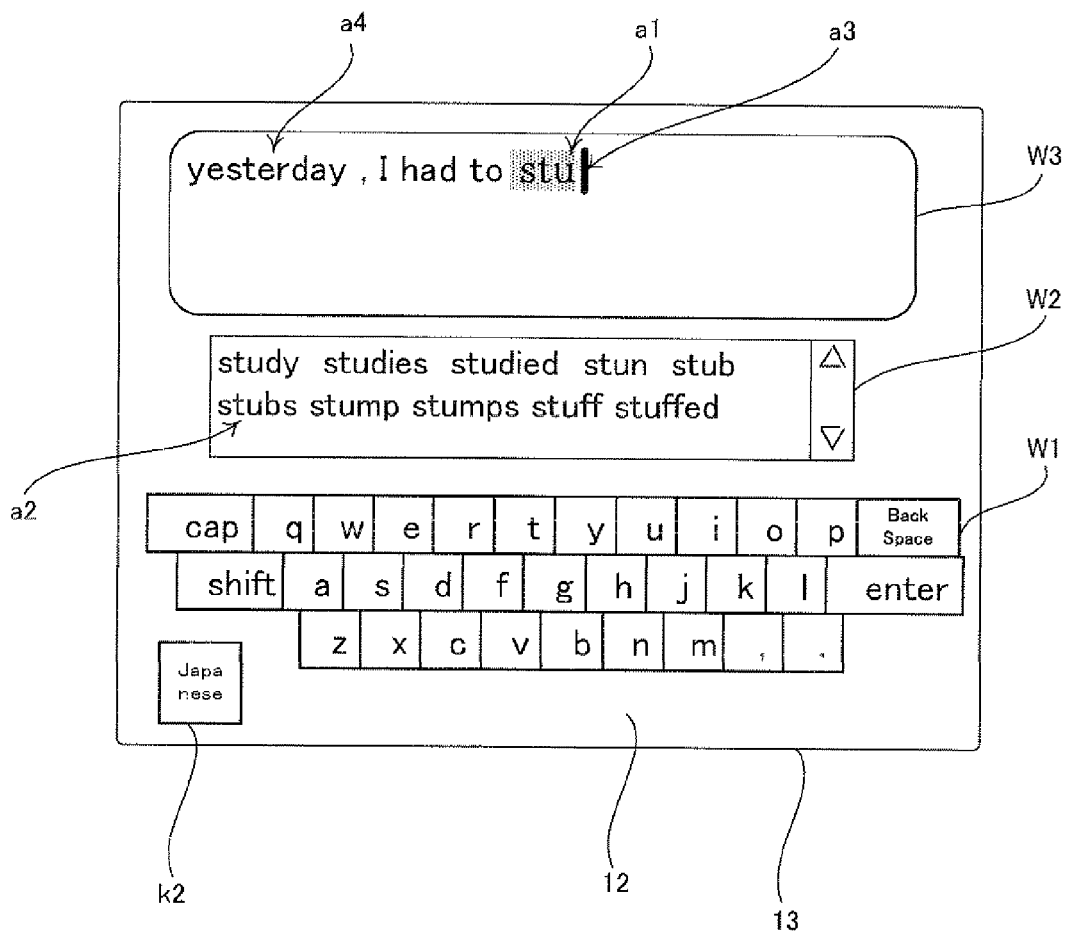
FIG. 5 shows an example of the character input screen displayed on the lower LCD.
Figure 16A:
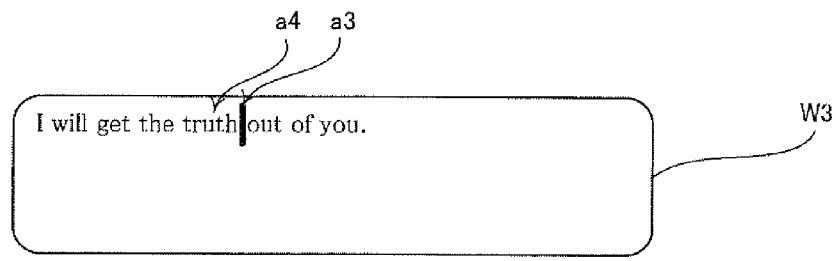
FIG. 16A shows an example of the character input window displayed on the lower LCD.
Figure 16B:
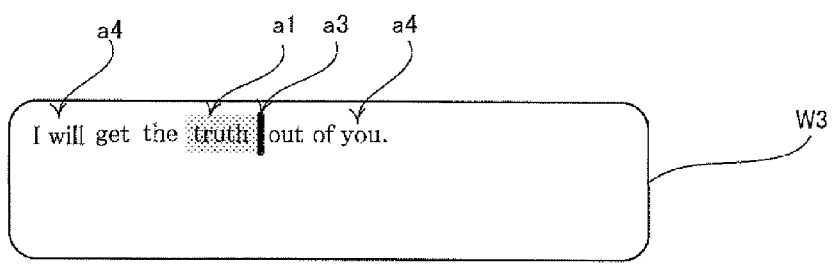
FIG. 16B shows an example of the character input window displayed on the lower LCD.
Figure 16C:
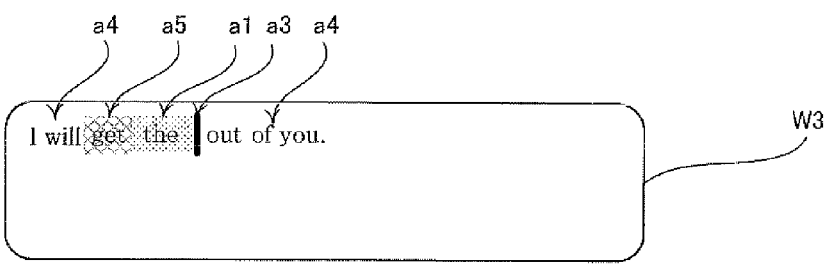
FIG. 16C shows an example of the character input window displayed on the lower LCD.

Hereinafter, the fifth feature of the present embodiment will be described by taking an exemplary case where a chat screen for English input as shown in FIG. 5 is displayed. As shown in FIG. 16A, the chat window W3 displays a sentence "I will get the truth out of you". If "truth" is a word to be deleted, it is determined whether or not the word "the" and the word "out" preceding and following the word "truth" are connectable to each other. In English, for example, the word "out" is usable as a noun, adjective, verb, or adverb. Therefore, the connectivity of the word "out" with another word cannot be determined (checked) based on the part of speech of these words. Accordingly, the connectivity check is basically performed based only on the transcription of these words. However, the present invention is not limited thereto. Here, "the" and "out" are determined to be connectable to each other. Accordingly, as shown in FIG. 16B, the word "truth" is changed into input characters a1 in the display. Subsequently, the user gives instructions to delete these characters. In response, these characters are deleted one by one in the order of "h", "t", "u", "r", and "t". In this manner, the word "truth" is entirely deleted. Thereafter, when "the" is deleted, that is, when "the" is a word to be deleted, it is determined whether or not the word "get" and the word "out" preceding and following the word "the" are connectable to each other. Since "get out" may express a strong imperative connotation and inputting such an expression is inappropriate, connecting "get" and "out" may be set to be impossible. In such a case, "get" and "out" are determined to be not connectable to each other, and it is determined whether or not "will", which immediately precedes "get", and "out" are connectable to each other. If "will" and "out" are set to be connectable to each other, "get" is changed into an edited character string a5 as shown in FIG. 16C. Note that since "the" is a word to be deleted, "the" is changed into input characters a1 in the display.

FIGS. 16A and 16C show examples for preventing morally inappropriate expressions from being inputted. Additionally, for example, in order to prevent personal information such as residential addresses from being inputted, connecting "New" and "York" may be set to be impossible so that "York" cannot be displayed so as to follow "New".

As described above, according to the fifth feature of the present embodiment, it is determined whether or not a word immediately preceding a word to be deleted and a word immediately following the word to be deleted are connectable to each other. If these words immediately preceding and following the word to be deleted are not connectable to each other, then connectivity between a word further preceding the word to be deleted and the word immediately following the word to be deleted is checked. The word subjected to the connectivity check with the word immediately following the word to be deleted is switched to a further preceding word until the words are determined to be connectable to each other. When the words are determined to be connectable to each other, a word (or words) present between these connectable words enters an unfixed state (i.e., the word becomes an edited character string a5 or input characters a1). That is, the words that are not connectable to the word immediately following the word to be deleted are changed into an unfixed state. Consequently, the following situation can be effectively prevented: two words that are not connectable to each other are fixedly inputted when these two words are successively arranged due to a deletion of a word present therebetween.

In the present embodiment, even if a word immediately preceding a word to be deleted and a word immediately following the word to be deleted are not connectable to each other, the word to be deleted is changed into in an unfixed state. Alternatively, when these immediately preceding and following words are not connectable to each other, the word to be deleted may not be changed into an unfixed state. In such a case, if these words immediately preceding and immediately following the word to be deleted are not connectable to each other, the word to be deleted cannot be deleted. Consequently, the following situation can be more effectively prevented: two words that are not connectable to each other are fixedly inputted when these two words are successively arranged due to a deletion of a word present therebetween.

The chat screens and windows W1 to W3 shown in FIGS. 4 to 16C are merely examples. The layout of these windows W1 to W3 is not limited to the examples shown in the diagrams. Moreover, it is not essential to display input characters a1, fixed character strings a4, and option character strings a2 within the windows. They may be displayed on the background (i.e., outside the windows). Furthermore, the key window W1 may not necessarily be displayed. In this case, the user inputs input characters a1 by operating, for example, the operation buttons 14A to 14K of the game apparatus 1 or by operating an external input device or the like (e.g., a keyboard).

Figure 17:
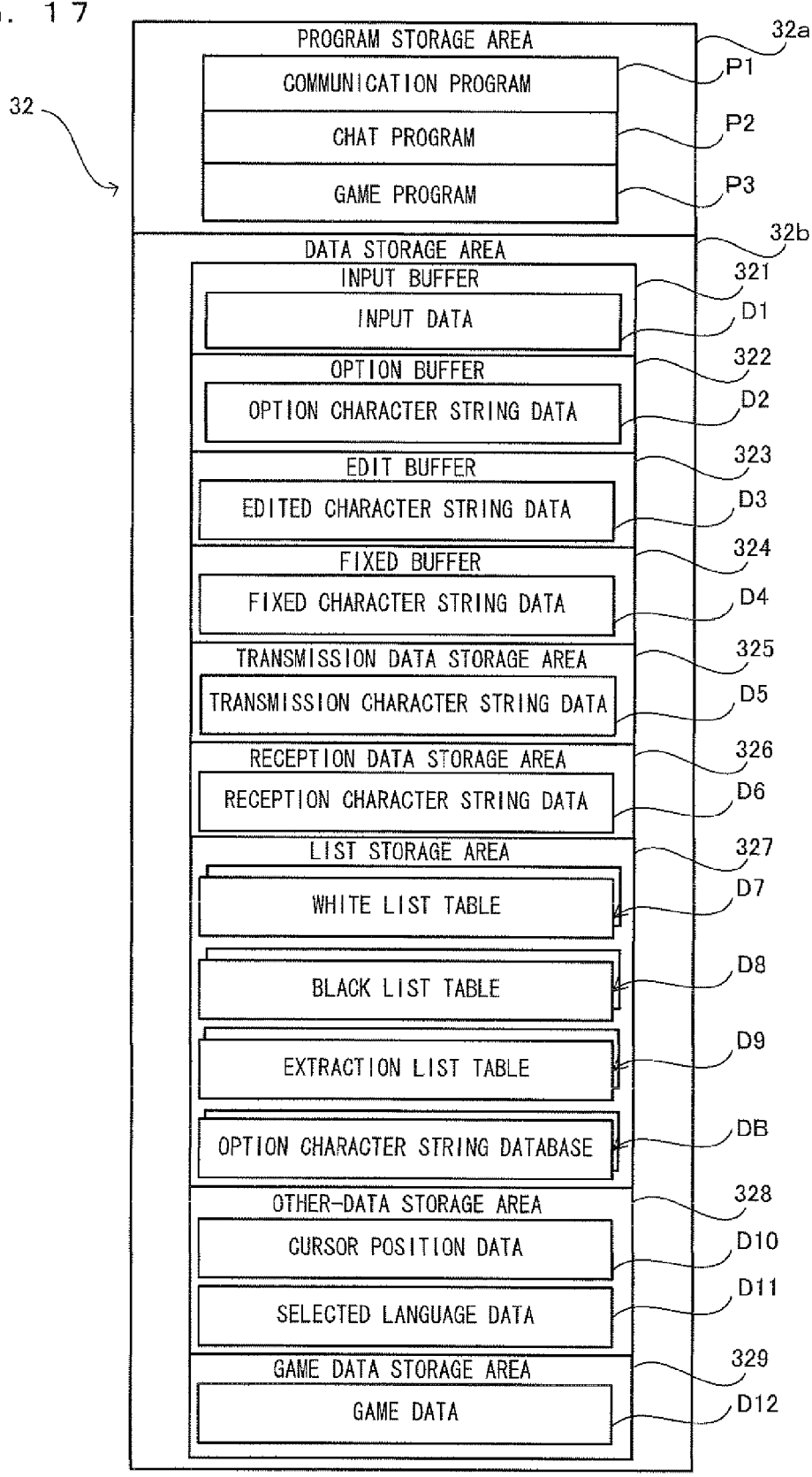
FIG. 17 shows an example of programs and various data stored in the game apparatus.

Next, programs and data stored in the game apparatus 1 are described with reference to FIGS. 2 and 17 to 19. FIG. 17 shows programs and data stored in the main memory 32 shown in FIG. 2. The main memory 32 has a program storage area 3a for storing programs to be executed by the game apparatus 1 and a data storage area 3b for storing various data in accordance with execution of these programs.

The program storage area 3a stores a communication program 21, a chat program P2, a game program P3, and the like. The communication program 21 is a program for causing the game apparatus 1 to communicate with the other game apparatus 1. The chat program P2 is a program for allowing the user of the game apparatus 1 to perform chatting with the user of the other game apparatus 1. To be specific, the chat program P2 includes: program that causes the game apparatus 1 to perform a character input process for allowing the user of the game apparatus 1 to input characters into the game apparatus 1 (a character input program); a program that causes the game apparatus 1 to perform a transmission process for transmitting the inputted characters (a message) to the other game apparatus 1; and a program that causes the game apparatus 1 to perform a display process for displaying characters (a message) received from the other game apparatus 1. Note that the character input process will be described in detail below with reference to FIGS. 24 to 31.

The game program P3 is a program that defines entire game processing performed by the game apparatus 1. The game apparatus 1 executes the game program P3, thereby providing a game to the user of the game apparatus 1. In the present embodiment, the game program P3 and the chat program P2 are separate programs. However, the game program P3 may include the chat program P2 These programs may be configured, for example, to allow the user of the game apparatus 1 to perform chatting with the user of the other game apparatus 1 only when a specific event occurs during the execution of the game.

The above programs P1 and P2 are read from among programs stored in the saved data memory 34, so as to be stored in the program storage area 3a as necessary. The programs stored in the saved data memory 34 are stored therein as factory setting. Alternatively, the programs are downloaded from a server (not shown), or read from the memory card 28 or the cartridge 29, so as to be stored in the saved data memory 34 in advance. The game program P3 is read from the memory card 28 or the cartridge 29 so as to be stored in the program storage area 3a as necessary in accordance with, for example, a progress in the game. However, the present invention is not limited to the above. For example, similarly to the game program P3, the programs P1 and P2 may be read from the memory card 28 or the cartridge 29 so as to be stored in the program storage area 3a as necessary. Alternatively, the programs P1 to P3 may be collectively downloaded from a server (not shown), or may each be downloaded as necessary in accordance with a progress in the game, so as to be stored in the program storage area 3a.

The data storage area 3b has an input buffer 321, an option buffer 322, an edit buffer 323, and a fixed buffer 324. The input buffer 321 stores data D1 that indicates an input character a1 inputted by the user (hereinafter, referred to as "input character data D1"). The input character data D1 will be described in detail below with reference to FIG. 22. The option buffer 322 stores data D2 that indicates option character strings a2 corresponding to the input character a1 (hereinafter, referred to as "option character string data D2"). The edit buffer 323 stores data D3 that indicates, as an edited character string a5, an option character string a2 selected by the user (hereinafter, referred to as "edited character string data D3". The edited character string data D3 is deleted when the edited character string a5 is determined to be eligible to become a fixed character string a4. In other words, the edited character string data 33 is, unless determined to be eligible, kept stored in the edit buffer 323. The edited character string data D3 will be described in detail below with reference to FIG. 21.

The fixed buffer 324 stores data D4 that indicates, as a fixed character string a4, an edited character string a5 that has been determined to be eligible to become a fixed character string a4 (hereinafter, referred to as "fixed character string data D4"). The fixed character string data D4 will be described in detail below with reference to FIG. 20.

Further, the data storage area 3i b has a transmission data storage area 325 and a reception data storage area 326. The transmission data storage area 325 stores text data D5 that has been transmitted to the other game apparatus 1 (hereinafter, referred to as "transmission character string data D5"). The transmission character string data D5 is text data that is generated by the CPU 31 (see FIG. 2) when the user gives an instruction to transmit a message to the other game apparatus 1. Here, the text data is generated such that the text data only contains the fixed character string data D4. By not containing the input character data D1 and the edited character string data 33 in the transmission character string data D5 but only containing the fixed character string data D4 in the transmission character string data D5, only text data that does not contain an inappropriate expression is transmitted to the other game apparatus 1. Note that the transmission character string data D5 may be displayed on the upper LCD 22. The reception data storage area 326 stores, as reception character string data D6, the transmission character string data D5 received from the other game apparatus 1. The reception character string data D6 is displayed on the upper LCD 22.

The data storage area 3i b has a list storage area 327. The list storage area 327 stores an option character string database DB, a white list table D7, a black list table D8, and an extraction list table D9.

The option character string database DB defines combinations of input characters a1 and corresponding option character strings a2. A technique for obtaining option character strings a2 corresponding to an input character a1 from the option character string database DB is a widely known technique. For example, in the option character string database DB, the "transcription", "pronunciation", "character string length", "part of speech", and the "conjugated form" of each option character string a2 are registered. For example, for an option character string a2 "kyou", the transcription "kyou" (in two kanji characters), the pronunciation "kyou" (in three hiragana characters), the character string length "two characters", the part of speech "noun", and the conjugated form "absent" are registered.

Described below is a manner in which the game apparatus 1 extracts option character strings a2 corresponding to an input character a1 from the option character string database DB. As described above, in the option character string database DB, the pronunciation of each option character string a2 is registered. From the option character string database DB, option character strings a2, the pronunciation of which includes the input character a1 as the initial portion thereof, are extracted. For example, option character strings a2 corresponding to an input character a1 "ki" each include "ki" as the initial portion of the pronunciation thereof (in the case of Japanese input, option character strings a2 that include "ky" as the initial portion of the pronunciation thereof also correspond to the input character a1 "ki"). Such corresponding option character strings a2 are "kyou", "kinou" (in kanji characters meaning "function"), "kinou" (in kanji characters meaning "yesterday"), and the like. As another example, option character strings a2 corresponding to input characters a1 "kyo" each include "kyo" as the initial portion of the pronunciation thereof. Such corresponding option character strings a2 are "kyou", "kyoku", "kyouka", and the like.

In the present embodiment, option character strings a2, the pronunciation of which includes an input character (or input characters) a1 as the initial portion thereof, are extracted. However, as an alternative, option character strings a2, the pronunciation of which exactly coincides with an input character (or input characters) a1 may be extracted. In such a case, when input characters a1 "kawa" are inputted, words whose pronunciation includes "kawa" as the initial portion thereof, such as "kawaii" and "kawara", are not extracted. Instead, only words whose entire pronunciation is "kawa", such as "kawa" (in a kanji character meaning "river") and "kawa" (in a kanji character meaning "leather"), are extracted.

The white list table D7 defines predetermined conditions which an option character string a2 has to satisfy to be eligible to become a fixed character string a4. The white list table D7 is described in detail below.

FIG. 18 shows an example of the white list table D7. The white list table D7 defines combinations of "part of speech", "conjugated form", and "transcription", which allow words to be connectable. Note that blank cells in the list may each take any conjugated form or transcription. In other words, no matter what conjugated forms or transcriptions fill the blank cells, the resultant combinations in the white list are valid as long as the conditions specified in the different cells other than the blank cells are satisfied. The white list table D7 is used to select option character strings a2 to be displayed. To be specific, among option character strings a2 having been extracted from the option character string database DB, only character strings that satisfy the conditions defined in the white list table D7 are further extracted. For example, assume a case where input characters a1 "shika" are inputted so as to immediately follow a fixed character string a4 "uma", and then option character strings a2 "shika" (in hiragana characters meaning "only"), "shikaru", and "shika" (in a kanji character meaning "deer") have been extracted from the option character string database DB. In this case, the white list table D7 defines a combination of a "noun" (as the former word) and a "particle" (as the latter word) and a combination of a "noun" (as the former word) and a "noun" (as the latter word), and does not define a combination of a "noun" (as the former word) and a "verb" (as the latter word). Therefore, only a "particle" or a "noun" is connectable to "uma" which is a noun, and a "verb" is not connectable thereto. Accordingly, "shika" (in hiragana characters meaning "only") which is a "particle" and "shika" (in a kanji character meaning "deer") which is a "noun" are extracted, and "shikaru" which is a verb is not extracted.

The white list table D7 is also used for determining whether or not an option character string a2 selected by the user can be changed into a fixed character string a4. For example, assume a case where input characters a1 "uma" are inputted so as to immediately precede a fixed character string a4 "shika", and then option character strings a2 "umai", "umaku", and "uma" are extracted from the option character string database DB and displayed. Here, the white list table D7 defines a combination of an "adjective" (as the former word) and a "noun" (as the latter word), a combination of a "noun" (as the former word) and a "noun" (as the latter word), and a combination of a "verb" (in attributive form) (as the former word) and a "noun" (as the latter word), and does not define a combination of an "adverb" (as the former word) and a "noun" (as the latter word). Accordingly, only an "adjective", a "noun", or a "verb in attributive form" is connectable to "shika" which is a noun, in a manner to immediately precede the noun "shika". Among "umai", "umaku", and "uma" extracted from the option character string database, only "umai" which is an adjective or "uma" which is a noun is connectable to the noun "shika" in a manner to immediately precede "shika". Therefore, only when the user selects "umai" or "uma", the selected word is determined to be connectable to "shika" in a manner to immediately precede "shika". If the user selects "umaku", the word "umaku" is not determined to be connectable to "shika".

Return to FIG. 17. The black list table D8 defines conditions that specify option character strings a2 that are not eligible to become a fixed character string a4. The black list table D8 is described in detail below.

FIG. 19 shows an example of the black list table D8. The black list table 98 defines combinations of "part of speech", "conjugated form", and "transcription", which do not allow words (former and latter words) to be connected to each other. Similarly to the white list table D7, the black list table D8 is used for selecting option character strings a2 to be displayed. For example, assume a case where input characters a1 "shika" are inputted so as to immediately follow a fixed character string a4 "uma" (in a kanji character), and then option character strings a2 "shika" (in hiragana characters) and "shika" (in a kanji character) having satisfied the above-described conditions in the white list table D7 are extracted. Here, the black list table D8 defines a combination of a transcription "uma" (in a kanji character) and a transcription "shika" (in a kanji character). Therefore, it is determined that "shika" (in a kanji character) cannot be displayed as an option character string a2. In this example, "shika" (in hiragana characters) is the only option character string a2 to be displayed.

Similarly to the white list table D7, the black list table D8 is also used for determining whether or not an option character string a2 selected by the user can be changed into a fixed character string a4. According to the definitions in the white list table D7, a word connectable to the noun "shika" (in a kanji character) in a manner to immediately precede "shika" is "umai" which is an "adjective" or "uma" which is a "noun". Accordingly, only when the user selects one of these "umai" and "uma", it is determined that the selected word is connectable to "shika" in a manner to immediately precede "shika". However, the black list table D8 defines the combination of a transcription "uma" (in a kanji character) and a transcription "shika" (in a kanji character). Therefore, when the user selects the option character string a2 "uma" (in a kanji character), "uma" is changed not into a fixed character string a4 but into an edited character string a5.

Return to FIG. 17. The extraction list table D9 defines conditions to satisfy to become an option character string a2 that corresponds to a fixed character string a4 (a fixed character string a4 immediately preceding the cursor a3) For example, in the extraction list table D9, the part of speech of the fixed character string a4 immediately preceding the cursor a3 and the part of speech of corresponding option character strings a2 are registered in association with each other. For example, if the part of speech of the fixed character string a4 immediately preceding the cursor a3 is "noun", then the part of speech of corresponding option character strings a2 is "particle". Accordingly, if the part of speech of the fixed character string a4 immediately preceding the cursor 3 is "noun", then the option character string database DB is searched for option character strings whose part of speech is "particle" that corresponds to "noun". Then, a predetermined number of option character strings a2 whose part of speech is "particle" are extracted at random and displayed. Here, if the total number of option character strings a2 whose part of speech is "particle" is not large, the option character strings a2 may not necessarily be extracted at random, and all the option character strings a2 whose part of speech is "particle" may be displayed.

As mentioned above, the game apparatus 1 allows an input of a plurality of different languages. Accordingly, the number of white list tables D7, the number of black list tables D8, the number of extraction list tables D9, and the number of option character string databases DB, which are stored in the game apparatus 1, each correspond to the number of languages in which an input is performed. The game apparatus 1 performs a word input process using the list tables and the database that correspond to a language indicated by selected language data D11 that is described below.

The data storage area 3i b has an other-data storage area 328 and a game data storage area 329. The other-data storage area 328 stores cursor position data D10 indicating a position of the cursor a3 and the selected language data D11 indicating an input language selected by the user. The cursor position data D10 indicates where the cursor a3 is to be displayed. For example, the cursor position data D10 indicates a sequence number, in a sequence of characters arranged from the top of a sentence, of a character immediately behind which the cursor a3 is to be displayed. The selected language data D11, which indicates a language selected by the user, indicates Japanese by default. When the English input switch key k1 shown in FIG. 4 is touched, the selected language data D11 indicating English is stored. When the Japanese input switch key k2 shown in FIG. 5 is touched, the selected language data D11 indicating Japanese is stored. The chat screen displays an image specified by the selected language data D11. That is, when the selected language data D11 indicating Japanese is stored, the chat screen for Japanese input as shown in FIG. 4 is displayed, and when the selected language data D11 indicating English is stored, the chat screen for English input as shown in FIG. 5 is displayed. The game data storage area 329 stores game data D12 when the game program P3 is executed. Game data D12 is, for example, image data, sound data, and the like.

Hereinafter, with reference to FIGS. 20 to 23, the input character data D1, the option character string data D2, the edited character string data D3, and the fixed character string data D4 shown in FIG. 17 will be described. When a sentence to be displayed in the chat window W3 (see FIG. 4) is created based on the input character data D1, the edited character string data D3, and the fixed character string data D4 shown in FIGS. 20 to 22, a sentence "kyou ha ika nai mitaidesu" is created. Since a word indicated by the fixed character string data D4 is displayed as a fixed character string a4, "kyou", "ha" and "mitaidesu" are displayed as fixed character strings a4. Moreover, since a word indicated by the edited character string data D3 is displayed as an edited character string a5, "ika" is displayed as an edited character string a5. Furthermore, since a character indicated by the input character data D1 is displayed as an input character a1, "nai" is displayed as input characters a1.

FIG. 20 shows an example of a data structure of the fixed character string data D4. FIG. 21 shows an example of a data structure of the edited character string data D3. FIG. 22 shows an example of a data structure of the input character data D1.

The data D1, D3, and D4 indicate the following information about each set of characters (input characters a1) and each character string (edited character string a5 or fixed character string a4): "sequence number", "transcription", "pronunciation", "character string length", "start position", "end position", "part of speech", and "conjugated form". The edited character string data D3 and the fixed character string data D4 may each indicate information about a plurality of edited character strings a5 or a plurality of fixed character strings a4. When the present embodiment gives a description "an edited character string a5 is deleted from the edit buffer 323", this means that information about the edited character string a5 to be deleted is deleted from the edited character string data D3. Also, when a description "an edited character string a5 is stored in the edit buffer 323" is given, this means that information about the edited character string a5 to be stored is added to the edited character string data D3. The same is true for a case where a description that a fixed character string a4 is stored in (or deleted from) the fixed buffer 324, is given. Note that, in the case of the input character data D1, information about a set of input characters a1 is stored in a table as a single record, regardless of the length of the input characters a1.

The "sequence number" indicated by the data D1, D3, or D4 refers to a sequence number in a sentence displayed in the chat window W3. For example, the word "kyou" whose "sequence number" is 1 is displayed at the top of the sentence, and the word "ha" whose "sequence number" is 2 is displayed in the second position in the sentence, i.e., a position following "kyou". Subsequently, "ika", "nai", and "mitaidesu" that are numbered 3 to 5 are displayed in said order.

The "transcription" indicates a normal display form (at the time of displaying a fixed character string a4 or an edited character string a5) of a character string that is displayed in the chat window W3. The "pronunciation" indicates how the transcription of the character string is pronounced. In the case where an input character a1 is displayed, not the "transcription" but the "pronunciation" thereof is displayed. The "character string length" indicates the number of characters forming the transcription. For example, the fixed character string data D4 indicates "2" as a character string length of the transcription "kyou" (in two kanji characters). The "start position" indicates a start position of the display of a word. The "end position" indicates an end position of the display of a word. For example, in the case of the transcription "kyou" (in two kanji characters), the "sequence number" is 1 and the "character string length" is 2. Accordingly, the "start position" is 1 and the "end position" is 2. In the case of the transcription "ha" (in a hiragana character), since "ha" immediately follows the above "kyou", the "start position" is 3. Further, since the "character string length" of "ha" is 1, the "end position" thereof is also 3. The "part of speech" is the part of speech of the word indicated by the "transcription". The "conjugated form" is a "conjugated form" of the word indicated by the "transcription". Here, the information "start position" and "end position" may not necessarily be indicated since such information can be obtained through calculation by referring to the "sequence number" and the "character string length".

The option character string data D2 has substantially the same data structure as that of the above-described data D1, D2, and D3. However, unlike the data D1, D2, and D3, the option character string data D2 does not indicate the "start position", "end position", and "sequence number". The reason for the option character string data D2 not having to indicate the "sequence number" is that the "sequence number" of an option character string a2 indicated by the option character string data D2 is the same as that of a corresponding input character a1. Therefore, by referring to the "sequence number" of the corresponding input character a1, the "sequence number" of the option character string a2 can be obtained. The option character string data D2 is generated when an input character a1 has been inputted, so as to indicate information (transcription, pronunciation, character string length, part of speech, and conjugated form) obtained from the option character string database DB (see FIG. 17). Although FIG. 23 shows the option character string data D2 indicating only one option character string a2, if a plurality of option character strings a2 are obtained, then the option character string data D2 is generated so as to indicate information about the plurality of option character strings a2. Note that, in the present embodiment, when a description "an option character string a2 is deleted from the option buffer 322" is given, this means that the information about the option character string a2 to be deleted is deleted from the option character string data D2.

Figure 24:
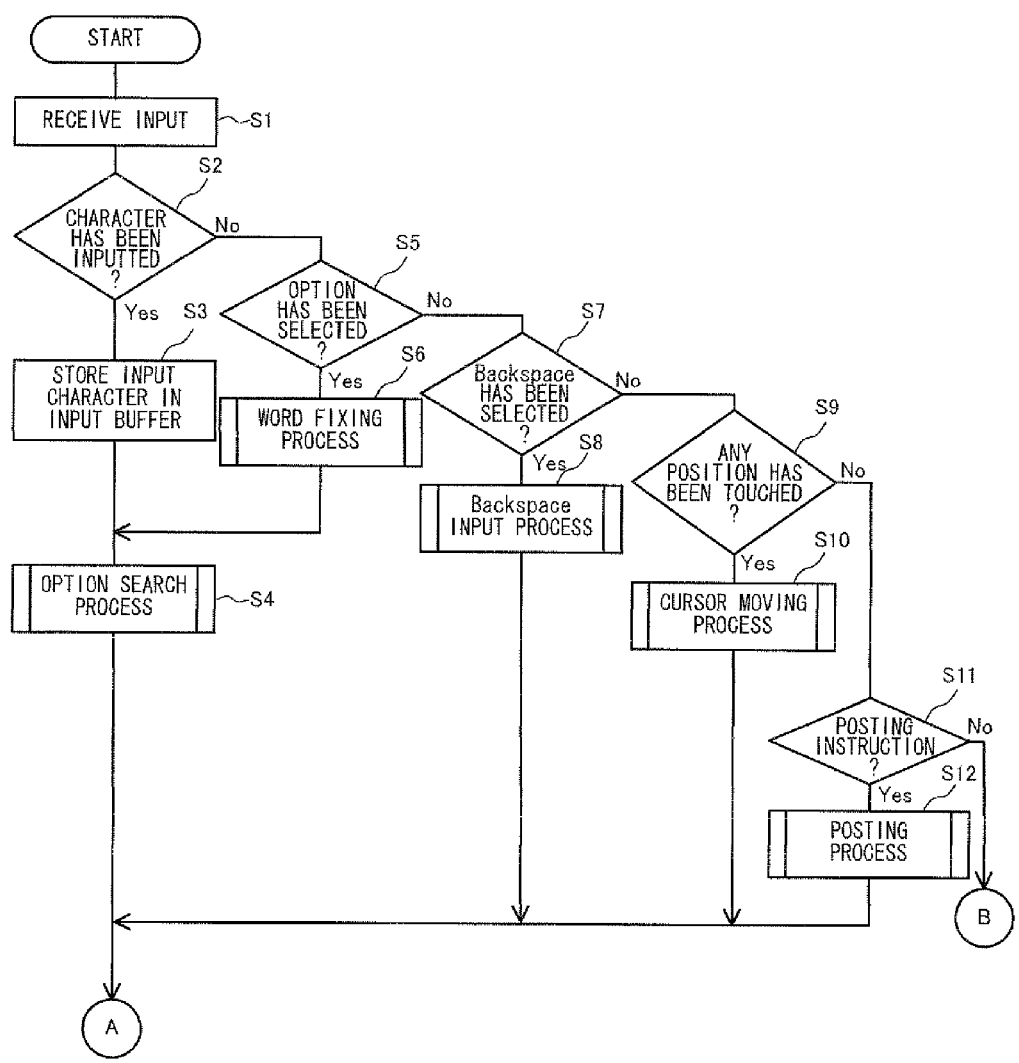
FIG. 24 is a flowchart (the first part) showing an example of a character input process performed by the game apparatus.
Figure 25:
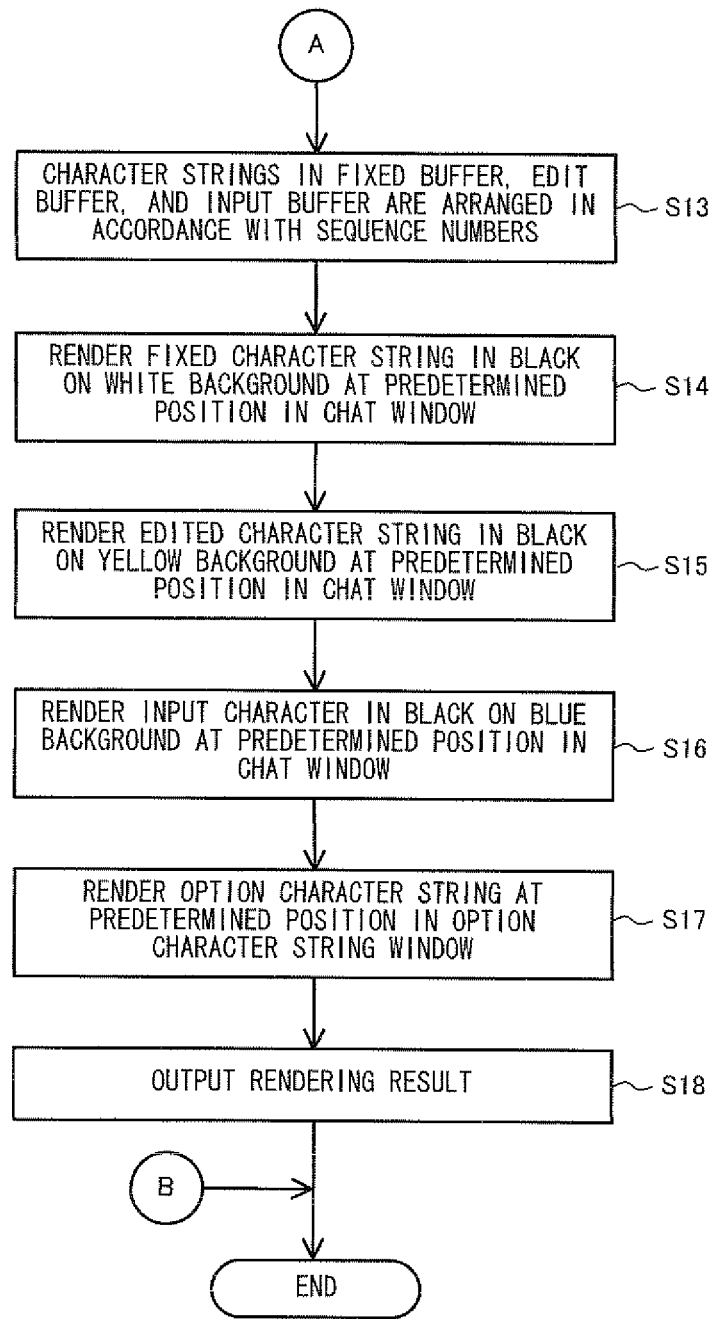
FIG. 25 is the flowchart (the second part) showing the example of the character input process performed by the game apparatus.

Hereinafter, the character input process according to the present embodiment will be described with reference to FIGS. 24 and 25. FIG. 24 shows a flowchart (the first part) showing an example of the character input process performed by the game apparatus 1. FIG. 25 is the flowchart (the second part) showing the example of the character input process performed by the game apparatus 1. The CPU 31 shown in FIG. 2 performs the character input process when receiving any operation input from the user. First, the CPU 31 determines the type of the received operation input (S1). Next, the CPU 31 determines whether or not the determined operation input type is an input of an input character a1 (S2). When determining that the type of the operation input is an input of an input character a1 (YES at S2), the CPU 31 stores the input character a1 in the input buffer 321 (S3) and performs a process of obtaining option character strings a2 corresponding to the input character a1 (option search process) (S4). In the option search process, as described above, the CPU 31 determines whether or not each option character string a2 obtained from the option character string database DB satisfies any of the conditions defined in the white list table D7 and whether or not each option character string a2 satisfies none of the conditions defined in the black list table D8. The CPU 31 stores, in the option buffer 322, only an option character string a2 that satisfies any of the conditions in the white list table and none of the conditions in the black list table). The option search process will be described in detail below with reference to FIG. 26. Thereafter, the processing by the CPU 31 proceeds to the following step S13.

On the other hand, when determining that the determined operation input type is not an input of an input character a1 (NO at S2), the CPU 31 determines whether or not the determined operation input type is a selection of an option character string a2 (S5). To be specific, the CPU 31 determines whether or not the user has selected any of option character strings a2 displayed in the option character string window W2. When determining that the determined operation input type is a selection of an option character string a2 (YES at S5), the CPU 31 performs a process of changing the option character string a2 selected by the user into a fixed character string a4 (a word fixing process) (S6). In the word fixing process, as described above, the CPU 31 determines whether or not the option character string a2 selected by the user has eligibility to become a fixed character string a4. Only when the selected option character string a2 has the eligibility, the option character string a2 is stored in the fixed buffer 324 as a fixed character string a4. When the selected option character string a2 does not have the eligibility, the option character string a2 is changed into an edited character string a5. Here, the option buffer 322 is emptied. The word fixing process will be described in detail below with reference to FIG. 27.

Thereafter, the CPU 31 performs the option search process (S4). In the option search process, the CPU 31 obtains option character strings a2 that are to follow the fixed character string a4 having been stored at step S6 in the fixed buffer, and stores the obtained option character strings a2 in the option buffer 322 (S4). In the option search process, as described above, the CPU 31 obtains, from the option character string database DB, option character strings a2 each satisfying any of the conditions defined in the extraction list table D9. Then, the CPU 31 determines whether or not each obtained option character string a2 satisfies any of the conditions defined in the white list table D7 and whether or not each obtained option character string a2 satisfies none of the conditions defined in the black list table D8. The CPU 31 stores, in the option buffer 322, only an option character string a2 that satisfies any of the conditions in the white list table and none of the conditions in the black list table). Then, the processing by the CPU 31 proceeds to the following step S13.

When determining that the determined operation input type is not a selection of an option character string a2 (NO at S5), the CPU 31 determines whether or not the determined operation input type is a deletion of a character (i.e., touching the Backspace key) (S7). When determining that the determined operation input type is a deletion of a character (YES at S7), the CPU 31 performs a process of causing a fixed character string a4 that is to be deleted to enter an unfixed state, i.e., a process of changing the fixed character string a4 into an input character (or input characters) a1 (a Backspace input process) (S8). In the Backspace input process, the CPU 31 deletes, from the fixed buffer 324, the fixed character string a4 to be deleted, and stores the deleted fixed character string a4 in the input buffer 321 as an input character (or input characters) a1. Then, the CPU 31 determines whether or not a word immediately following the deleted fixed character string a4 (hereinafter, referred to as a word "k") and a word immediately preceding the deleted fixed character string a4 (hereinafter, referred to as a word "j") are connectable to each other. If it is determined that these words are not connectable to each other, then the connectivity between the word (k) and a word immediately preceding the word (j) is checked. That is, the word subjected to the connectivity check with the word (k) is switched to a further preceding word until the word is determined to be connectable to the word (k). When the word subjected to the connectivity check is determined to be connectable to the word (k), all the words present between the word and the word (k) are changed into edited character strings a5. The Backspace input process will be described below with reference to FIG. 31. Then, the processing by the CPU 31 proceeds to step S13.

When it is determined at the above-described step S7 that the determined operation input type is not a deletion of a character (NO at S7), the CPU 31 determines whether or not the determined operation input type is a change in the position of the cursor a3 (S9). Here, for example, when the touch panel 13 is touched on a position within the chat window W3, it is determined that an input for changing the position of the cursor a3 has been performed. When determining that the determined operation input type is a change in the position of the cursor a3 (YES at S9), the CPU 31 performs a process of moving a display position of the cursor a3 (a cursor moving process) (S10). In this process, the CPU 31 calculates a position that corresponds to a position touched by the user, and updates the cursor position data D10 (see FIG. 17) so as to indicate the calculated position. The CPU 31, when changing the cursor position, deletes words in an unfixed state (edited character strings a5) from the edit buffer 323 and deletes characters in an unfixed state (input characters a1) from the input buffer 321. Note that the cursor moving process will be described in detail below with reference to FIG. 29. Then, the processing by the CPU 31 proceeds to the following step S13.

On the other hand, when determining that the determined operation input type is not a change in the position of the cursor a3 (NO at S9), the CPU 31 determines whether or not the determined operation input type is a message transmission instruction (S11). When determining that the determined operation input type is a message transmission instruction (YES at S11), the CPU 31 performs a process of transmitting, to the other game apparatus 1, text data that indicates a sentence formed with fixedly inputted words (a posting process) (S12). In the posting process, as described above, the CPU 31 transmits only fixed character strings a4 stored in the fixed buffer 324 to the other game apparatus 1, and deletes characters stored in the input buffer 321 and words stored in the edit buffer 323. Note that the posting process will be described in detail below with reference to FIG. 30. Then, the processing by the CPU 31 proceeds to the following step S13.

When determining that the determined operation input type is not a message transmission instruction (NO at S11), the CPU 31 ends the character input process.

Next, the process at step S13 will be described. Referring to FIG. 25, the CPU 31 generates character data to be displayed, by arranging an input character a1, an edited character string a5, and a fixed character string a4 in accordance with sequence numbers indicated by the input character data D1, the edited character string data D3, and the fixed character string data D4 (S13). The manner of generating character data is as described above with reference to FIGS. 20 to 22. Thereafter, among the generated character data, the CPU 31 writes the fixed character string a4 into a VRAM area that is prepared in advance in the main memory 32 (i.e., rendering) (S14). In this process, the CPU 31 calculates a position in the VRAM area, the position corresponding to a display position of the fixed character string a4, and writes the fixed character string a4 at the calculated position. Here, in the present embodiment, the fixed character string a4 is written so as to be displayed in black on a white background.

Next, among the generated character data, the CPU 31 writes the edited character string a5 into the VRAM area of the main memory 32 (i.e., rendering) (S15). In this process, the CPU 31 calculates a position in the VRAM area, the position corresponding to a display position of the edited character string a5, and writes the edited character string a5 at the calculated position. Here, in the present embodiment, the edited character string a5 is written so as to be displayed in black on a yellow background. Subsequently, among the generated character data, the CPU 31 writes the input character a1 into the VRAM area of the main memory 32 (i.e., rendering) (S16). In this process, the CPU 31 calculates a position in the VRAM area, the position corresponding to a display position of the input character a1, and writes the input character a1 at the calculated position. Here, in the present embodiment, the input character a1 is written so as to be displayed in black on a blue background.

Next, the CPU 31 writes option character strings a2 into the VRAM area of the main memory 32 (i.e., rendering) (S17). In this process, the CPU 31 calculates positions in the VRAM area, the positions corresponding to display positions of the option character strings a2, and writes the option character strings a2 at the calculated positions (within the option character string window W2).

The CPU 31 causes the lower LCD 12 to display (output) the characters that have been written into the VRAM area at steps S14 to S17 (S18). Then, the CPU 31 ends the processing.

Figure 26:
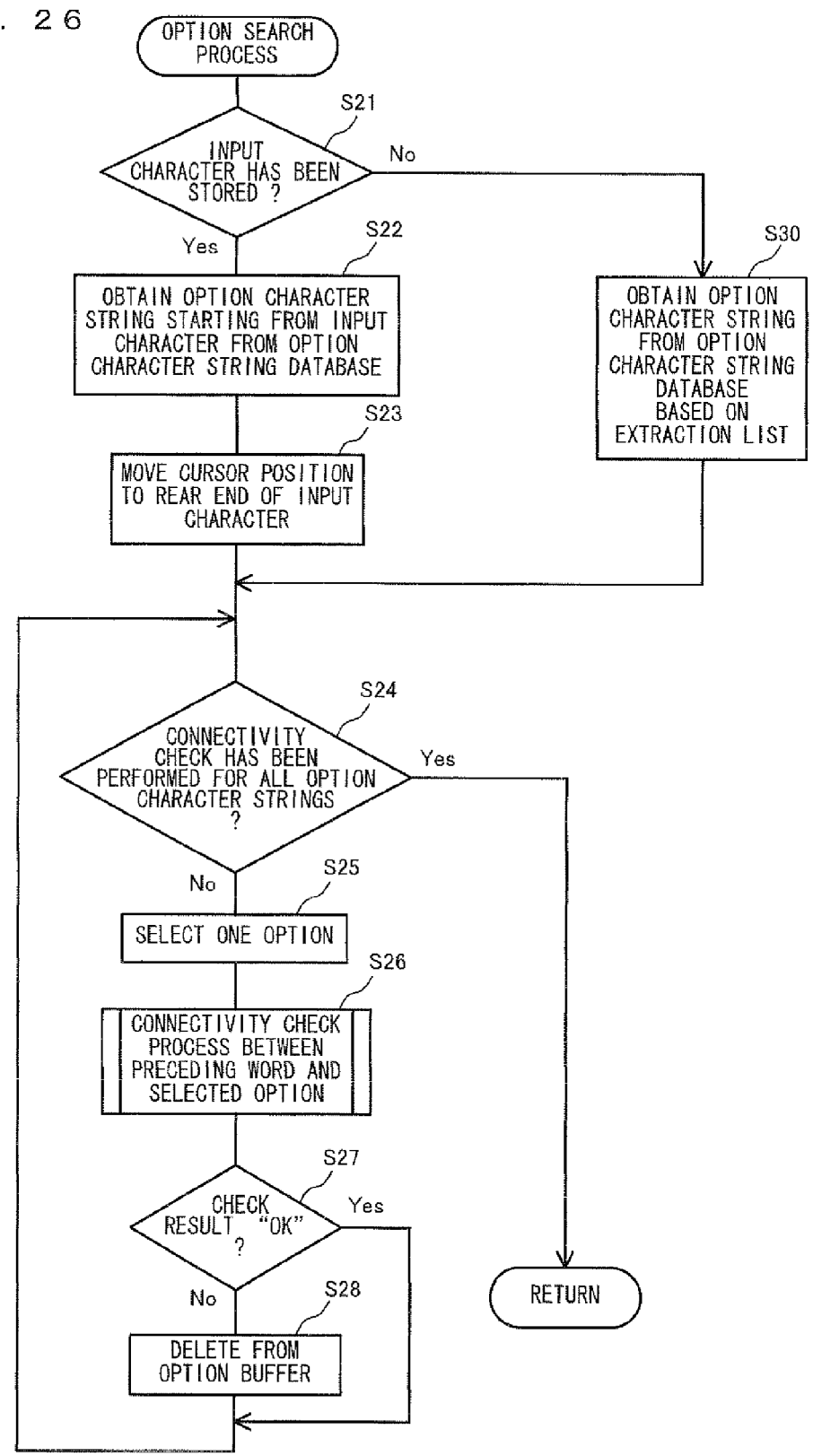
FIG. 26 is a flowchart showing an example of an option search process performed at step S4 of FIG. 24.

Hereinafter, the option search process performed at step S4 of FIG. 24 is described with reference to FIG. 26. FIG. 26 is a flowchart showing an example of the option search process performed at step S4 of FIG. 24.

The CPU 31 determines whether or not an input character a1 is stored in the input buffer 321 (S21). When determining that an input character a1 is stored in the input buffer 321 (YES at S21), the CPU 31 obtains words, each of which starts from the input character a1, from the option character string database DB as option character strings a2, and generates and stores option character string data D2 (see FIG. 23) in the option buffer 322 (S22). Here, as described above with reference to FIG. 23, the CPU 31 searches the "pronunciation" section of the option character string database DB by using the input character a1 as a search key, and thereby obtains information "transcription", "pronunciation", "character string length", "part of speech", and "conjugated form" of option character strings a2 each including the input character a1 as the initial portion of the pronunciation thereof. Then, option character string data D2 containing the obtained information is generated.

Thereafter, the CPU 31 moves the position of the cursor a3 to the rear end of the input character a1 (S23). To be specific, the CPU 31 changes the cursor position data D10 (see FIG. 17) so as to indicate a position at the rear end of the input character a1.

Subsequently, the CPU 31 performs steps 324 to 528 to perform a process of determining whether or not the option character strings a2 obtained at step S22 are each connectable to a character string that immediately precedes the input character a1. This determination is hereinafter referred to as a "connectivity check".

First, the CPU 31 determines whether or not the connectivity check has been performed for all the option character strings a2 obtained at step S22 (324). When determining that the connectivity check for all the option character strings a2 obtained at S22 has not been completed (NO at S24), the CPU 31 selects one of the option character strings a2 obtained at S22 (S25), and performs a connectivity check process for checking the connectivity between the selected option character string a2 and a word immediately preceding the input character a1 (S26). Although the connectivity check process is described in detail below with reference to FIG. 28, in the connectivity check process performed at step S26, the connectivity check is performed by setting the word immediately preceding the input character a1 as a "front word" and setting the selected option character string a2 as a "rear word".

Subsequently, when determining, as a result of the connectivity check at step S26, that the word immediately preceding the input character a1 and the selected option character string a2 are not connectable to each other (NO at S27), the CPU 31 deletes the selected option character string a2 from the option buffer 322 (S28). Whereas, when determining that the word immediately preceding the input character a1 and the selected option character string a2 are connectable to each other (YES at S27), the CPU 31 does not delete the selected option character string a2. In this manner, the option character strings a2 are narrowed down to only those connectable to the word immediately preceding the input character a1. Thereafter, the CPU 31 returns the processing to step S24, and determines whether or not the connectivity check has been performed for all the option character strings a2.

The CPU 31 repeats the processes at steps S24 to S28 until determining that the connectivity check has been performed for all the option character strings a2. When determining that the connectivity check has been performed for all the option character strings a2 (YES at S24), the CPU 31 ends this subroutine processing and returns the processing to the main routine shown in FIGS. 24 and 25 (i.e., performs the process at step S13).

On the other hand, when determining as a result of the determination at the above step S21 that no input character a1 is stored in the input buffer 321 (NO at S21), the CPU 31 obtains, from the option character string database DB based on the conditions defined in the extraction list table D9, option character strings a2 corresponding to the fixed character string a4 that immediately precedes the cursor a3 (S30). An example of the process performed at step S30 is described below. For example, the extraction list table D9 defines, as described above, the part of speech of the fixed character string a4 and the part of speech, of an option character string a2, which corresponds to the part of speech of the fixed character string a4. The CPU 31 obtains attributes of the fixed character string a4 immediately preceding the cursor a3 (the part of speech and the conjugated form), and obtains attributes corresponding to these attributes based on the extraction list table D9. Accordingly, for example, assume a case where the extraction list table D9 defines that the part of speech "particle" of an option character string a2 corresponds to the part of speech "noun" of the fixed character string a4. In this case, if the fixed character string a4 is "noun", then option character strings a2 whose part of speech is "particle" are obtained from the option character string database DB at random.

Thereafter, the CPU 31 performs the above-described processes at steps S24 to S28 in order to perform the connectivity check for all the option character strings a2 obtained at step S30. As described above, even when an input character a1 is not inputted, option character strings a2 corresponding to the fixed character string a4 are obtained. This eliminates the necessity for the user to input an input character a1. Moreover, since the connectivity check is performed for the option character strings a2 obtained at step S30, an inappropriate expression can be effectively prevented from being fixedly inputted.

Figure 27:
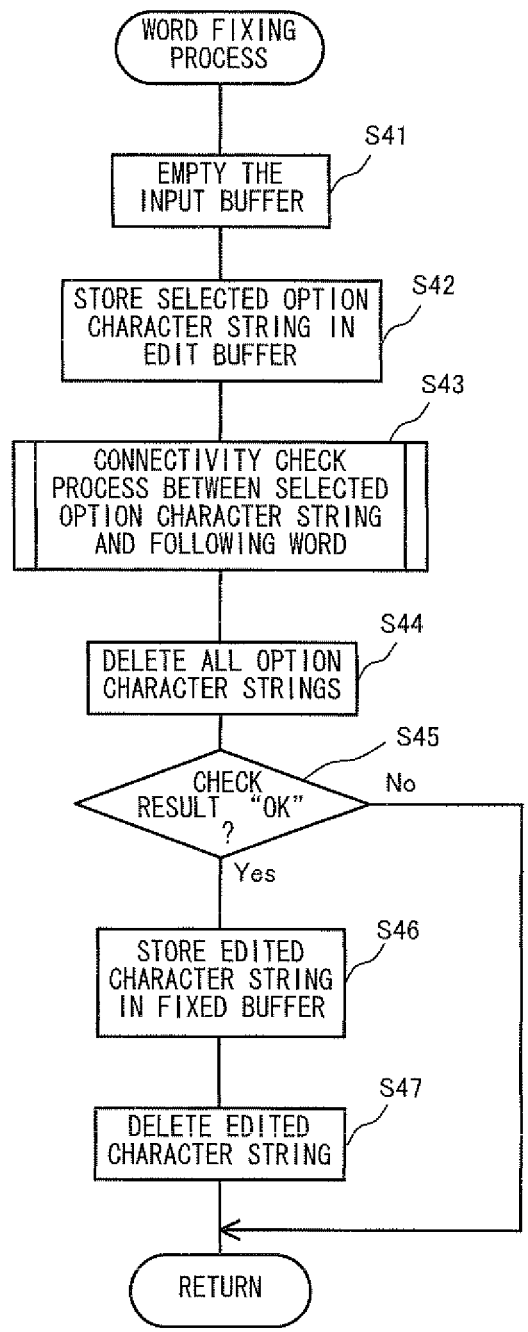
FIG. 27 is a flowchart showing an example of a word fixing process performed at step S6 of FIG. 24.

Hereinafter, the word fixing process performed at step S6 of FIG. 24 will be described with reference to FIGS. 21 to 23 and 27. FIG. 27 is a flowchart showing an example of the word fixing process performed at step S6 of FIG. 24. First, the CPU 31 deletes the input character a1 from the input buffer 321 (S41), and stores the option character string a2 selected by the user in the edit buffer 323 as an edited character string a5 (S42). The process at step S42 is described below in detail with reference to FIGS. 21 to 23. The "transcription", "pronunciation", "character string length", "part of speech", and the "conjugated form" of the selected option character string a2 are read from the option character string data D2, and the "sequence number" and "start position" of the input character a1 are read from the input character data D1. Then, these are integrally stored in the edit buffer 323. That is, the information "sequence number", "start position", and "end position" about the selected option character string a2 is supplementarily obtained from the input character data D1 and stored in the edit buffer 323. The "end position" stored here is calculated by adding the "character string length" of the option character string data D2 to the "start position" of the input character data D1 and subtracting 1 therefrom.

Thereafter, the CPU 31 performs the connectivity check process in order to perform the connectivity check between the edited character string a5 stored in the edit buffer 323 and an immediately following word (S43). Although the connectivity check process is described in detail below with reference to FIG. 28, the CPU 31 obtains an edited character string a5 that is to be located farthest from the top of the sentence among edited character strings a5 stored in the edit buffer 323, and performs the connectivity check between a "front word" and a "rear word", by setting the obtained edited character string a5 as the "front word" and setting a fixed character string a4 immediately following the "front word" as the "rear word". For example, when "ika" and "nai" are both edited character strings a5 and "nai" is the farthest edited character string a5 from the top of the sentence, the connectivity check is performed between "nai" and a fixed character string a4 "mitaidesu" immediately following "nai". Note that, in the present embodiment, the "sequence number" of each set of characters and each character string stored in the input buffer 321, the edit buffer 323, and the fixed buffer 324 is determined by referring to the information "sequence number" in the data D1, D3, and D4. Then, the CPU 31 deletes all the option character strings a2 stored in the option buffer 322, that is, deletes the option character string data D2 therein (see FIG. 23) (S44).

The CPU 31 determines whether or not a result of the connectivity check at step S43 is "connectable (OK)" (S45). When the result of the connectivity check at step S43 is not "connectable (OK)" (NO at S45), the CPU 31 ends the processing of this subroutine and returns the processing to the main routine shown in FIGS. 24 and 25 (i.e., performs the option search process at step S4). On the other hand, when the result of the connectivity check at step S43 is "connectable (OK)" (YES at S45), the CPU 31 stores the edited character string a5 as a fixed character string a4 in the fixed buffer 324 (S46). Thereafter, the CPU 31 deletes, from the edit buffer 323, the edited character string a5 that has been stored in the fixed buffer 324 at step S46 (S47). Then, the CPU 31 ends the processing of this subroutine and returns the processing to the main routine shown in FIGS. 24 and 25 (i.e., performs the option search process at step S4).

Figure 28:
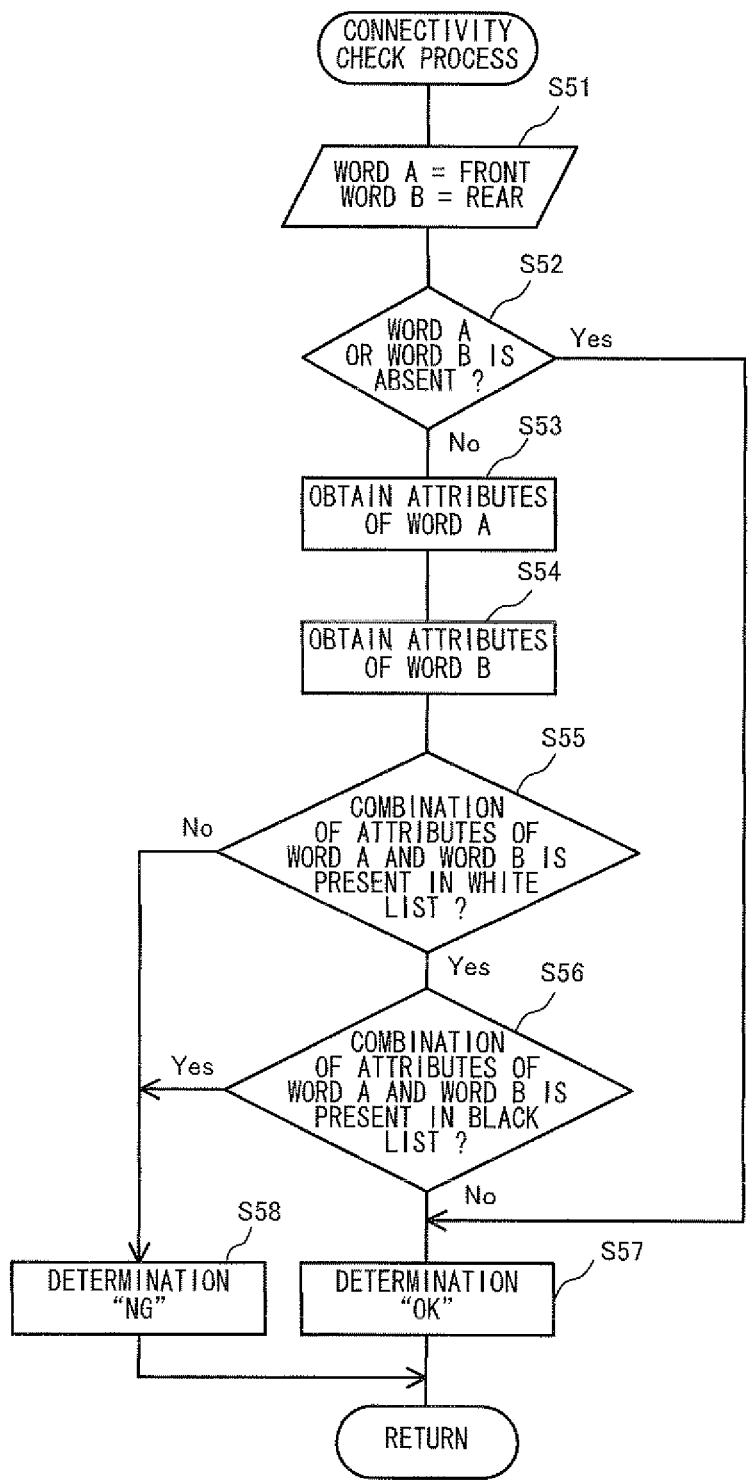
FIG. 28 is a flowchart showing an example of a connectivity check process performed at step S26 of FIG. 26 and step S43 of FIG. 27.

Described next with reference to FIGS. 18, 19, and 28 is the connectivity check process (performed at steps S26 and S43) that is performed in the option search process shown in FIG. 26 and in the word fixing process shown in FIG. 27. FIG. 28 is a flowchart showing an example of the connectivity check process performed at step S26 of FIG. 26 and step S43 of FIG. 27.

First, the CPU 31 sets a "front word" and a "rear word" (S51). Note that, in the description of the connectivity check process, the "front word" is referred to as a "word A" and the "rear word" is referred to as a "word B". Here, as described above, in the option search process shown in FIG. 26, the word immediately preceding the input character a1 is set as the "word A", and the selected option character string a2 is set as the "word B". In the word fixing process shown in FIG. 27, one of the edited character strings a5 stored in the edit buffer 323 is set as the "word A", and the word (the fixed character string a4) immediately following said one of the edited character strings a5 is set as the "word B".

Thereafter, the CPU 31 determines whether or not the word A or the word B is absent (S52). In the present embodiment, this determination is performed based on whether or not the word A or the word B is "empty", that is, based on whether or not setting of the word A or the word B is absent.

When determining that the word A and the word B are present (NO at S52), the CPU 31 obtains attributes of the word A (S53) as well as attributes of the word B (S54). The attributes obtained here are "part of speech", "conjugated form", and "transcription". Note that if the word whose attributes are obtained is an option character string a2, then the attributes are obtained by referring to the "part of speech", "conjugated form", and "transcription" in the option character string data D2. Also, when the word whose attributes are obtained is an edited character string a5, the attributes are obtained by referring to the "part of speech", "conjugated form", and "transcription" in the edited character string data D3. Further, when the word whose attributes are obtained is a fixed character string a4, the attributes are obtained by referring to the "part of speech", "conjugated form", and "transcription" in the fixed character string data D4.

Thereafter, the CPU 31 determines whether or not a combination of the attributes of the word A and the word B is present in the white list table D7 (S55). When determining that the combination is present (YES at S55), the CPU 31 determines next whether or not the combination of the attributes of the word A and the word B is present in the black list table D8 (S56). If the determination at step S56 is NO (NO at S56), this means that the combination of the attributes of the word A and the word B is present in the white list table D7 but absent in the black list table D8. In this case, the CPU 31 determines that the word A and the word B are "connectable (OK)", and stores the determination result in the main memory 32 (S57).

Whereas, when it is determined that the combination of the attributes of the word A and the word B is not present in the white list table D7 (NO at S55), or when the combination of the attributes of the word A and the word B is present in the black list table D8 (YES at S56), the CPU 31 determines that the word A and the word B are "not connectable (NG)", and stores the determination result in the main memory 32 (S58). Thereafter, the CPU 31 ends this subroutine and returns the processing to the main routine shown in FIGS. 24 and 25 (i.e., performs the option search process at step S4).

As described above, the word A and the word B become connectable to each other only when the combination of the attributes of the word A and the word B is present in the white list table D7. Accordingly, when the combination of the attributes of these words is not present in the white list table D7, these words are never displayed successively. This effectively prevents an inappropriate expression from being fixedly inputted. Moreover, the word A and the word B become connectable to each other only when the combination of the attributes of the word A and the word B is not present in the black list table D8. Consequently, even in the case where the white list table D7 is not sufficient to prevent an inappropriate expression from being fixedly inputted, the use of the black list table D8 assists in preventing the inappropriate expression from being fixedly inputted.

For example, the white list table D7 defines a combination of the part of speech "noun" of the word A and the part of speech "noun" of the word B. According to the white list table D7, when the word A is "uma" (a noun in a kanji character) and the word B is "shika" (a noun in a kanji character), the word A and the word B are determined to be connectable to each other. However, the black list table D8 defines a combination of the word A whose transcription is "uma" (in a kanji character) and the word B whose transcription is "shika" (in a kanji character). Accordingly, owing to the black list table D8, the above word A "uma" and the word B "shika" are not connectable to each other. Thus, the combination of "uma" and "shika" in kanji characters, which is an inappropriate expression, can be effectively prevented from being fixedly inputted.

When determining that the word A or the word B is not present (YES at S52), the CPU 31 determines that the word A and the word B are "connectable (OK)" without performing steps S53 to S56, and stores the determination result in the main memory 32 (S57). Accordingly, when the word A or the word B is not present, any option character string a2 subjected to the connectivity check is displayed without being deleted from the option buffer 322, or any edited character string a5 subjected to the connectivity check is changed into a fixed character string a4. Thereafter, the CPU 31 ends this subroutine and returns the processing to the main routine shown in FIGS. 24 and 25 (i.e., performs the option search process at step S4).

Figure 29:
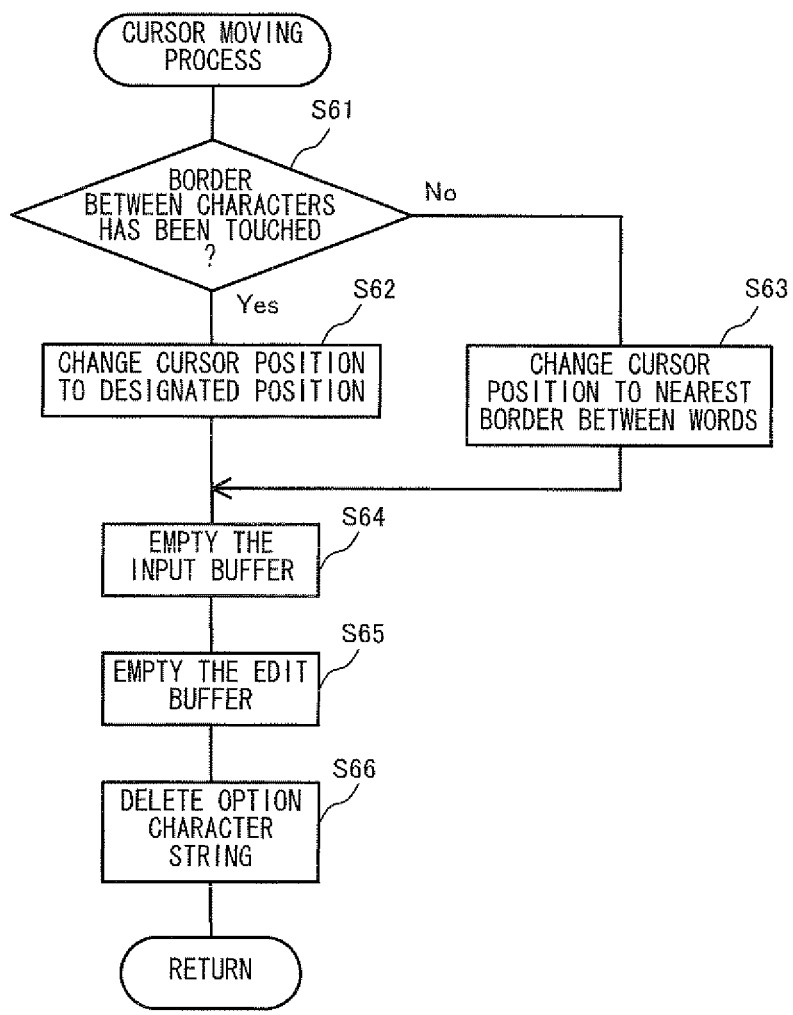
FIG. 29 is a flowchart showing an example of a cursor moving process performed at step S10 of FIG. 24.

Hereinafter, the cursor moving process performed at step S10 of FIG. 24 will be described with reference to FIGS. 17 and 29. FIG. 29 is a flowchart showing an example of the cursor moving process performed at step S10 of FIG. 24. First, the CPU 31 determines whether or not the touch panel 13 has been touched on a border position between words (S61). Here, a "border position" refers to a position between two successive words displayed on the touch panel 13 (i.e., a space in which no character is displayed), the position coinciding with the start or end position of a fixed character string a4, of an edited character string a5, or of an input character a1. To be specific, when detecting the coordinates of a position touched on the touch panel 13, the CPU 31 determines whether or not the coordinates represent a border position. Characters forming an input character a1, a fixed character string a4, and an edited character string a5 are displayed in sequence from the left end of the chat window W3 at positions predetermined by sequence numbers. Accordingly, coordinates of border positions are fixedly determined. These coordinates are prepared in advance as border position coordinates (e.g., stored in the memory card I/F 36 or the like), and read therefrom to be stored in the main memory 32. It is determined whether or not the coordinates of a touched position coincide with any set of coordinates among the stored border position coordinates. When the coordinates of the touched position coincide with any set of border position coordinates, the touched position is determined to be located between words. Then, it is further determined whether or not the touched position coincides with the "start position" or "end position" indicated by the input character data D1, the edited character string data D3, or the fixed character string data D4. If it is determined that the touched position coincides with any of the above, then it is determined that a border position between words has been touched. Whereas, if it is determined that the touched position does not coincide with any of the above, then it is determined that a different position on the touch panel 13 (i.e., a different position within the chat window W3) has been touched.

When it is determined that a border position between words has been touched (YES at S61), the CPU 31 changes the position of the cursor a3 so as to correspond to the touched position (S62). To be specific, the CPU 31 updates the cursor position data D10. The cursor position data D10 indicates a cursor position by indicating a sequence number, in a sequence of characters displayed from the left end of the chat window W3, of a character that immediately precedes a display position of the cursor a3. For example, in the case where the cursor a3 is displayed at the rear end of the incomplete sentence "kyou ha atsu" (in five characters) shown in FIG. 4, the cursor position data D10 indicates 5. Since the coordinates of border positions are fixedly determined as described above, sequence numbers corresponding to the coordinates of the border positions are prepared in advance (e.g., stored in the memory card I/F 36 or the like). These sequence numbers are read to be stored in the main memory 32. The CPU 31 updates the cursor position data D10 so as to indicate one of the sequence numbers, which corresponds to the coordinates of the touched border position.

On the other hand, when it is determined that a border position between words has not been touched (NO at S61), the CPU 31 sets the position of the cursor a3 to a border position that is the nearest border position to the touched position (S63). To be specific, the CPU 31 obtains the coordinates of a border position that is the nearest border position to the touched position, and updates the cursor position data D10 so as to indicate a sequence number corresponding to the obtained coordinates.

Thereafter, the CPU 31 deletes input characters a1 stored in the input buffer 321 (S64), deletes edited character strings a5 stored in the edit buffer 323 (S65), and deletes option character strings a2 stored in the option buffer 322 (S66). Then, the CPU 31 ends this subroutine processing and returns the processing to the main routine shown in FIGS. 24 and 25 (i.e., performs the process at step S13).

Figure 30:
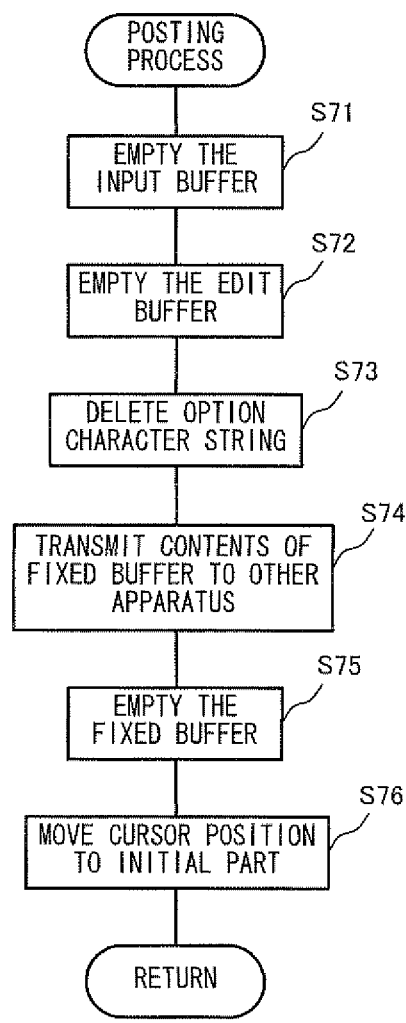
FIG. 30 is a flowchart showing an example of a posting process performed at step S12 of FIG. 24.

Hereinafter, the posting process performed at step S12 of FIG. 24 will be described with reference to FIGS. 17 and 30. FIG. 30 is a flowchart showing an example of the posting process performed at step S12 of FIG. 24. First, the CPU 31 deletes the input character data D1 stored in the input buffer 321 (S71), deletes the edited character string data D3 stored in the edit buffer 323 (S72), and deletes the option character string data D2 stored in the option buffer 322 (S73). Thereafter, the CPU 31 generates text data that only includes fixed character strings a4, and transmits the text data to the other game apparatus 1 that is a recipient (S74). When the transmission is successful, the CPU 31 stores the transmitted text data in the transmission data storage area 325 as transmission character string data D5. Thereafter, the CPU 31 deletes all the fixed character strings a4 stored in the fixed buffer 324 (S75), and moves the position of the cursor a3 to the front end (the left end) of a sentence display area in the chat window W3 (S76). That is, the CPU 31 updates the cursor position data D10 so as to indicate "0". Then, the CPU 31 ends this subroutine processing and returns the processing to the main routine shown in FIGS. 24 and 25 (i.e., performs the process at step S13).

Figure 31:
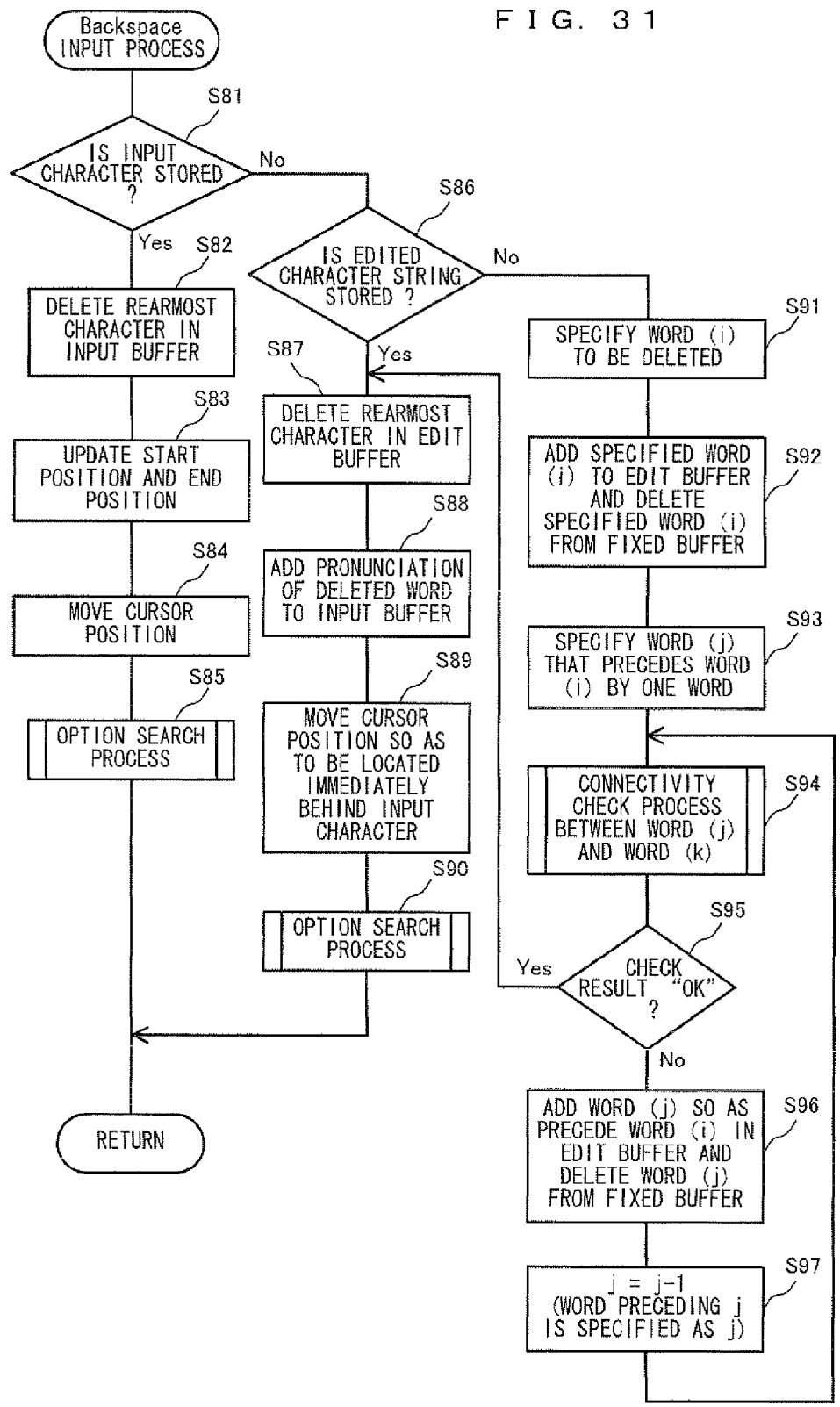
FIG. 31 is a flowchart showing an example of a Backspace input process performed at step S8 of FIG. 24.

Hereinafter, the Backspace input process performed at step S8 of FIG. 24 will be described with reference to FIGS. 17, 20 to 23, and 31. FIG. 31 is a flowchart showing an example of the Backspace input process performed at step S8 of FIG. 24. First, the CPU 31 determines whether or not an input character a1 (input character data D1) is stored in the input buffer 321 (S81). When input character data D1 is stored in the input buffer 321 (YES at 881), the CPU 31 deletes a rearmost character among input characters a1 stored in the input buffer 321 (S82). For example, when input characters a1 "samukat" are stored in the input buffer 321, the rearmost character "t" is deleted. Accordingly, the input characters a1 become "samuka". Details of the process at step S82 are as follows: the CPU 31 deletes a rearmost character from the "transcription" and "pronunciation" of the input character data D1, and updates the input character data D1 so as to subtract 1 from each of the number indicating the "character string length" and the number indicating the "end position". When the input character a1 stored in the input buffer 321 is a single character, the input character data D1 is entirely deleted from the input buffer 321.

Thereafter, if edited character string data D3 and/or fixed character string data D4 is stored in the edit buffer 323 and/or the fixed buffer 324, indicating that an edited character string a5 and/or a fixed character string a4 is present following the input characters a1, then the CPU 31 updates the "start position" and "end position" of the data D3 and/or the data D4 (S83) That is, the CPU 31 subtracts 1 from each of the numbers indicating the "start position" and "end position" of the edited character string a5 and/or the fixed character string a4, which follows the input characters a1, thereby updating the edited character string data D3 and/or the fixed character string data D4. In the case where the input character data D1 is entirely deleted at step S82, the CPU 31 also changes the data D3 and/or D4 so as to subtract 1 from the "sequence number" of the edited character string a5 and/or the fixed character string a4 that follows the deleted input character a1. Thereafter, the CPU 31 updates the cursor position data D10 such that the position of the cursor a3 is located immediately behind the remaining input character (s) a1 (S84). Note that, if an input character a1 no longer exists due to the above deletion at step S82, the position of the cursor a3 is changed so as to be located immediately behind a word that immediately precedes the deleted input character a1.

Next, the CPU 31 performs the option search process (085). The option search process performed here is the same as that described above with reference to FIG. 26. Through this process, option character strings a2 corresponding to the new input characters a1 updated at step S82 are obtained and stored in the option buffer 322. Note that, if the input character data D1 is entirely deleted at step S82, then option character strings a2 corresponding to a fixed character string a4 immediately preceding the cursor a3 are obtained and stored in the option buffer 322 (i.e., S30 of FIG. 26 is performed). Thereafter, the CPU 31 ends this subroutine processing and returns the processing to the main routine shown in FIGS. 24 and 25 (i.e., performs the process at step S13).

Described next is a process that is performed when input character data D1 is not stored in the input buffer 321 (NO at S81). In this case, the CPU 31 determines whether or not edited character string data D3 is stored in the edit buffer 323 (S86). When it is determined that edited character string data D3 is stored therein (YES at S86), the CPU 31 deletes the rearmost edited character string a5 (having the largest sequence number) among edited character strings a5 stored in the edit buffer 323 (S87). Then, the CPU 31 stores the deleted edited character string a5 in the input buffer 321 as input characters a1 (S88). To be specific, the CPU 31 adds the "pronunciation" of the deleted edited character string a5 to the "transcription" and "pronunciation" of the input character data D1. Further, the CPU 31 sets the "character string length" of the input character data D1 to the number of characters of the "pronunciation" of the deleted edited character string a5. In addition, the CPU 31 sets the "start position" of the input character data D1 so as to coincide with the start position of the deleted edited character string a5, and sets the "end position" of the input character data D1 to a number obtained from the following: "the end position of the deleted edited character string a5"+"the number of characters of the pronunciation of the deleted edited character string a5"−"the number of characters of the transcription of the deleted edited character string a5".

As described above, as a result of the edited character string a5 being changed at step S88 into input characters a1 of which the transcription is the same as the pronunciation (i.e., of which the transcription is in hiragana characters), the "end position" of the input character data D1 is changed. Due to this change, it is necessary to change the "start position" and "end position" of a fixed character string a4 that follows the input characters a1. Accordingly, when a fixed character string a4 that follows the input characters a1 is stored in the fixed buffer 324, the CPU 31 updates the "start position" and the "end position" of the fixed character string data D4. To be specific, the CPU 31 adds, to each of the "start position" and the "end position", a value that is calculated in the following manner: "the number of characters of the pronunciation of the deleted edited character string a5"−"the number of characters of the transcription of the deleted edited character string a5".

Thereafter, the CPU 31 updates the cursor position data D10 such that the position of the cursor a3 is located immediately behind the input characters a1 (S89). Then, the CPU 31 performs the option search process (S90). The option search process performed here is the same as that described above with reference to FIG. 26. Through this process, option character strings a2 corresponding to the input character a1 generated at step S88 are obtained and stored in the option buffer 322. Then, the CPU 31 ends this subroutine processing and returns the processing to the main routine shown in FIGS. 24 and 25 (i.e., performs the process at step S13).

Described next is a process that is performed when edited character string data D3 is not stored in the edit buffer 323 (NO at S86). In this case, the CPU 31 specifies a fixed character string a4 to be deleted (S91). Here, a fixed character string a4 that immediately precedes the cursor a3 is specified as a deletion target. The cursor position data D10 indicates the sequence number of a character immediately preceding the cursor a3 (i.e., the number indicating the position of the character in a sequence of characters displayed from the left end of the chat window W3), and a fixed character string a4 that includes the character of the sequence number as the rearmost character thereof is to be deleted. In other words, when the "end position" of fixed character string data D4 is the same as the sequence number indicated by the cursor position data D10, the fixed character string data D4 is to be deleted. Note that, in the description of the Backspace input process, the fixed character string a4 to be deleted is referred to as a word (i). Next, the CPU 31 writes the word (i) into the edit buffer 323, and deletes the word (i) from the fixed buffer 324 (S92). Specifically, the CPU 31 deletes information about the word (i) from the fixed character string data D4, and adds the deleted information to the edited character string data D3.

Subsequently, the CPU 31 specifies a word immediately preceding the word (i) (hereinafter, a word immediately preceding the word (i) is referred to as a "word (j)") (S93). The word (j) is specified by referring to the "sequence number" indicated by the edited character string data D3 of the word (i) and the "sequence number" indicated by the fixed character string data D4. To be specific, the fixed character string data D4 whose "sequence number" is smaller by 1 than the "sequence number" of the edited character string data D3 of the word (i), is set as the word (j). Next, the CPU 31 performs the connectivity check process described above with reference to FIG. 28 (394). Specifically, the CPU 31 performs the connectivity check by setting the word (j) as a "front word (word A)" and setting a word immediately following the word (i) as a "rear word (word B)" (hereinafter, a word immediately following the word (i) is referred to as a "word (k)"). Here, the word (k) is specified, similarly to the manner of specifying the word (j), by referring to the edited character string data D3 and the fixed character string data D4. Thereafter, the CPU 31 determines in the connectivity check whether or not the word (k) and the word (j) are connectable (OK) (S95). When determining that the word (k) and the word (j) are not connectable (NG) (NO at 595), the CPU 31 deletes the word (j) from the fixed buffer 324, and stores the word (j) as an edited character string a5 in the edit buffer 323 (S96). Here, a position in which the word (j) indicated by the edited character string data D3 is located immediately precedes the position of the word (i).

Thereafter, the CPU 31 newly sets a fixed character string a4 immediately preceding the word (j) as the word (j) (S97), and performs the above-described process at step S94 (the connectivity check process) by setting the new word (j) as the "front word (word A)" and the word (k) as the "rear word (word B)". The CPU 31 repeats the processes at steps S94, S96, and S97 until the word (j) and the word (k) are determined to be connectable to each other in the connectivity check (YES at S95). Consequently, all the words between the word (k) and the word (j) connectable to the word (k) are changed into edited character strings a5. Then, these words are deleted by the user. In this manner, an inappropriate expression can be effectively prevented from being fixedly inputted.

On the other hand, when it is determined in the connectivity check that the word (j) and the word (k) are connectable to each other (YES at S95), the CPU 31 performs the above-described processes at step S87 to S90. Specifically, the rearmost word stored in the edit buffer 323, i.e., the word (i), is deleted from the edit buffer 323 (S87) and changed into input characters a1 (S88). Thereafter, the position of the cursor a3 is also changed so as to be located immediately behind the input characters a1 (S89), and option character strings a2 corresponding to the word (i) that has become input characters a1 are obtained and stored in the option buffer 322 (S90). Then, the CPU 31 ends this subroutine processing and returns the processing to the main routine shown in FIGS. 24 and 25 (i.e., performs the process at step S13).

Hereinafter, the character input process described above with reference to FIGS. 24 to 28 will be further described using FIGS. 6, 7, 17, 24, 25, 26, 27, 28, and 32 by taking a specific example. In this example, a case where the user fixedly inputs "kyou ha" into the game apparatus 1 is described. FIG. 32 shows an example of the character input process when the user fixedly inputs "kyou ha". Note that, in the description below, the processing for moving the cursor position and the changing of the "character string length", "start position", and "end position" of the data D1, D3, and D4 will not be described. In "DISPLAY CONTENTS AND BUFFER CONTENTS" of FIG. 32, boldface represents input characters a1, boldface with an underline represents edited character strings a5, and normally displayed characters represent fixed character strings a4. An inverted triangle represents the cursor a3. A position where "/" is inserted represents a border between character strings or a border between a character and a character string. The same is true for "DISPLAY CONTENTS AND BUFFER CONTENTS" of FIGS. 33 and 34 which are described below.

Described first is a process indicated as (1) in FIG. 32, that is, a process performed when "ki" is inputted into the game apparatus 1. When the user inputs "ki" (a single Japanese character) into the game apparatus 1, an operation type is determined to be an input of an input character a1 (S1), and it is determined that an input character a1 has been inputted (YES at 32), and then the input character a1 "ki" is stored in the input buffer 321 (S3).

Subsequently, option character strings a2 corresponding to the input character a1 "ki" are obtained (S4). To be specific, referring to FIG. 26, it is determined that the input character a1 is stored (YES at S21), and option character strings a2 corresponding to the input character a1 "ki" are obtained (S22). Here, "kimochi", "kita", and "kyou" are selected as option character strings a2 and stored in the option buffer 322. Since the connectivity check has not been performed for any of these option character strings a2 at this point, it is determined that the connectivity check for the option character strings a2 has not been completed (NO at S24). Then, one of these option character strings a2, for example "kimochi", is selected (S25).

Next, the connectivity check is performed for the selected "kimochi" (S26). Specifically, referring to FIG. 28, "empty" is set for the word A and "kimochi" is set as the word B (S51). The reason for "empty" to be set for the word A is that there is no word displayed previous to the input character a1. Since "empty" is set for the word A, it is determined that the word A is not present (YES at S52), and the word A and the word B are determined to be connectable to each other (S57). Thereafter, referring to FIG. 26, the result of the connectivity check is determined to be connectable (YES at S27). Consequently, "kimochi" is not deleted from the option buffer 322.

Subsequently, it is determined again whether or not the connectivity check has been completed for all the obtained words ("kimochi", "kita", "kyou") (S24). The connectivity check as described above (S25 to S28) is repeatedly performed until the connectivity check for "kita" and "kyou" is completed. Here, since the word A is "empty", all the obtained words ("kimochi", "kita", "kyou") are determined to be connectable to the word A (YES at 527). When the connectivity check has been completed for all the words ("kimochi", "kita", "kyou") (YES at S24), the display process from step S13 to step S18 is performed (see FIG. 25). Accordingly, the input character a1 "ki" and the option character strings a2 "kimochi", "kita", "kyou" are displayed. Specifically, the chat screen as shown in FIG. 6 is displayed.

Described next is a process indicated as (2) in FIG. 32, that is, a process performed when "yo" (in a smaller case hiragana character) is inputted into the game apparatus 1 so as to follow "ki". First, the user inputs "yo" into the game apparatus 1. The process indicated as (2) is similar to the process indicated as (1) which is performed when "ki" is inputted. However, in this process, input characters a1 become "kyo" (in two hiragana characters), and option character strings a2 ("kyou", "kyoku", and "kyouka") corresponding to the input character a1 "kyo" are obtained (S4, S21, and S22). Then, the connectivity check is performed for "kyou", "kyoku", and "kyouka" (S24 to S28, S51 to S57). Thereafter, the display process from steps S13 to S18 is performed (see FIG. 25), and the input characters a1 "kyo" and the option character strings a2 "kyou", "kyoku", and "kyouka" are displayed. Specifically, the chat screen as shown in FIG. 7 is displayed.

Described next is a process indicated as (3) in FIG. 32, that is, a process performed when a selection of the option character string a2 "kyou" is inputted. Here, the chat screen as shown in FIG. 7 is displayed. That is, the option character strings a2 "kyou", "kyoku", and "kyouka" are displayed in the option character string window W2. Among these option character strings a2, the user touches an option character string a2 which the user wishes to select. For example, the user touches "kyou" (i.e., the position of "kyou" on the touch panel 13). This touch operation is an operation of selecting the option character string a2 "kyou".

First, the type of the operation is determined as a selection of an option character string a2 (S1), and the type of the operation is determined not to be an input of a character (NO at S2) but to be a selection of an option character string a2 (YES at S5). Then, the word fixing process is performed in order to change the option character string a2 "kyou" into a fixed character string a4 (S6). To be specific, referring to FIG. 27, input characters a1 "kyo" are deleted from the input buffer 321 (S41), and the selected option character string a2 "kyou" is stored in the edit buffer 323 (S42). Then, the connectivity check process for checking the connectivity between the selected option character string a2 "kyou" and a word immediately following the deleted input characters a1 is performed (S43).

To be specific, referring to FIG. 28, "kyou" is set as the word A and "empty" is set for the word B (S51). The reason for "empty" to be set for the word B is that there is no word displayed after the input characters a1. Since the word B is "empty", it is determined that the word B is not present (YES at S52). Accordingly, the word A and the word B are determined to be connectable to each other (S57). Returning to FIG. 27, all the option character strings a2 ("kyou", "kyoku", and "kyouka") stored in the option buffer 322 are deleted (S44). Then, the result of the connectivity check is determined to be "connectable" (YES at S45). Thereafter, the word "kyou" is stored in the fixed buffer 324 as a fixed character string a4 (346) and deleted from the edit buffer 323 (S47).

Subsequently, returning to FIG. 24, the option search process is performed (S4). Specifically, option character strings a2 ("mo", "no", "to", and "wo") corresponding to the newly stored fixed character string a4 "kyou" are obtained (330). Then, the connectivity check process from step S24 to step S28 is performed for the obtained option character strings a2. It is assumed here that the results of the connectivity check for all the option character strings a2 are "connectable". Thereafter, the display process from step S13 to step S18 is performed (see FIG. 25), and the fixed character string a4 "kyou" and the option character strings a2 "mo", "no", "to", and "we" are displayed, accordingly. Specifically, the chat screen as shown in FIG. 8 is displayed.

Described next is a process indicated as (4) in FIG. 32, that is, a process performed in the case where the user inputs an input character a1 "ha" (a single Japanese character) as shown in FIG. 12 when the chat screen shown in FIG. 8 is displayed. Here, referring to FIG. 24, the operation type is determined to be an input of an input character a1 (S1); it is determined that an input character a1 has been inputted (YES at S2); and the input character a1 "ha" is stored in the input buffer 321 (S3).

Thereafter, the option search process is performed in order to obtain option character strings a2 corresponding to "ha" (S4). To be specific, referring to FIG. 26, it is determined that the input character a1 is stored (YES S21), and option character strings a2 corresponding to the input character a1 "ha"

are obtained from the option character string database DB (S22). Here, option character strings a2 "ha", "hawai", "hai", and "hanmei" are obtained. Subsequently, it is determined whether or not the connectivity check process has been completed for all the option character strings a2 (S24). Here, it is determined that the connectivity check process for all the option character strings a2 has not been completed (NO at S24). Then, one of the option character strings a2 "ha", "hawai", "hai", and "hanmei" (here, "ha") is selected (S25).

Then, the connectivity check is performed for the selected "ha" (S26). Specifically, referring to FIG. 28, "kyou" is set as the word A and "ha" is set as the word B (S51). The reason for "kyou" to be set as the word A is that "kyou" is located so as to immediately precede the input character a1. Here, it is determined that the word A and the word B are both present (NO at S52). Then, attributes (part of speech, conjugated form, and transcription) of the word A "kyou" are obtained (S53), and attributes (part of speech, conjugated form, and transcription) of the word B "ha" are obtained (S54). The part of speech of "kyou" is "noun", and the part of speech of "ha" is "particle".

Thereafter, it is determined whether or not a combination of the attributes of the word A ("kyou") and the word B ("ha") is registered in the white list table D7 (S55). Since a combination of the part of speech "noun" of the word A and the part of speech "particle" of the word B is registered in the white list table D7, it is determined that a combination of the attributes of the word A ("kyou") and the word B ("ha") is registered in the white list table D7 (YES at S55). Next, it is determined whether or not a combination of the attributes of the word A ("kyou") and the word B ("ha") is registered in the black list table D8 (S56). Since a combination of the part of speech "noun" of the word A and the part of speech "particle" of the word B is not registered in the black list table D8, it is determined that a combination of the attributes of the word A ("kyou") and the word B ("ha") is not registered in the black list table D8 (NO at S56). Consequently, the result of the connectivity check between "kyou" and "ha" using the white list table D7 and the black list table D8 is determined to be "connectable" (S57).

Returning to FIG. 26, it is determined that the result of the connectivity check between "kyou" and "ha" is "connectable" (YES at S27). Then, while the option character string a2 "kyou" is remaining in the option buffer 322, it is determined again whether or not the connectivity check process has been completed for all the option character strings a2 (S24). Since there remain option character strings a2 that have not been subjected to the connectivity check, it is determined that the connectivity check process has not been completed (NO at S24). Then, one of the remaining option character strings a2 "hawai", "hai", and "hanmei" (here, "hai") is selected (S25).

Then, the connectivity check is performed for the selected "hai" (S26). Specifically, referring to FIG. 28, "kyou" that immediately precedes the input character a1 is set as the word A, and "hai" is set as the word B (S51). Here, it is determined that the word A and the word B are both present (NO at S52), and attributes (part of speech, conjugated form, and transcription) of the word A "kyou" are obtained (S53), and attributes (part of speech, conjugated form, and transcription) of the word B "hai" are obtained (S54). The part of speech of "kyou" is "noun", and the part of speech of "hai" is "interjection".

Thereafter, it is determined whether or not a combination of the attributes of the word A ("kyou") and the word B ("hai") is registered in the white list table D7 (S55). Since a combination of the part of speech "noun" of the word A and the part of speech "interjection" of the word B is not registered in the white list table D7, it is determined that a combination of the attributes of the word A ("kyou") and the word B ("hai") is not registered in the white list table D7 (NO at S55). Accordingly, the result of the connectivity check using the white list table D7, which has been performed between "kyou" and "hai", is determined to be "not connectable" (S58).

Returning to FIG. 26, the result of the connectivity check between "kyou" and "hai" is determined to be "not connectable" (NO at S27). Accordingly, the option character string a2 "hai" is deleted from the option buffer 322 (S28). Then, it is determined again whether or not the connectivity check process has been completed for all the option character strings a2 (S24). Since there remain option character strings a2 that have not been subjected to the connectivity check, it is determined that the connectivity check process has not been completed (NO at S24). Then, the connectivity check process is performed for the remaining option character strings a2 "hawai" and "hanmei" (S24 to S28). When the connectivity check for "hawai" and "hanmei" has been completed, it is determined that the connectivity check process has been completed for all the option character strings a2 (YES at S24). Then, the display process from step S13 to step S18 is performed (see FIG. 25). Accordingly, the fixed character string a4 "kyou", the input character a1 "ha", and the option character strings a2 "ha", "hawai", and "hanmei" are displayed. To be specific, the chat screen as shown in FIG. 12 is displayed. Note that, for both the option character strings a2 "hawai" and "hanmei", the result of the connectivity check is determined to be "connectable" (YES at S27 of FIG. 26).

Hereinafter, the character input process described above with reference to FIGS. 24 to 28 and 31 will be further described by taking another specific example with reference to FIGS. 4, 13, 15, 17, 20, 21, 26, and 33. Described in this example is the character input process that is performed by the game apparatus 1 when, after "kyou ha ika nai mitaidesu" has been fixedly inputted by the user, an instruction to delete "ika" is inputted. FIG. 33 shows an example of the character input process that is performed when the instruction to delete "ika" is inputted by the user. Note that, in the description below, the processing for moving the cursor position and the changing of the "character string length", "start position", and "end position" of the data D1, D3, and D4 will not be described.

Described first is a process indicated as (1) in FIG. 33, that is, a process performed in the case where an instruction to delete "nai" is inputted into the game apparatus 1 when "kyou", "ha", "ika", "nai", and "mitaidesu" are displayed as fixed character strings a4.

When the user inputs an instruction to delete a character into the game apparatus 1 by touching the Backspace key in the key window W1 (see FIG. 4) (i.e., by touching the touch panel 13 on the position of the Backspace key), the operation type is determined to be a deletion of a character (S1). Then, it is determined that an instruction to delete a character has been inputted (YES at S7), and the Backspace input process is performed, accordingly (S8). Specifically, referring to FIG. 31, it is determined that no input character a1 is stored (NO at S81), and that no edited character string a5 is stored (NO at S86). Then, "nai" is specified as the word (i) to be deleted (S91). Thereafter, the fixed character string a4 "nai" is deleted from the fixed buffer 324 and stored in the edit buffer 323 (S92). Subsequently, "ika" immediately preceding "nai" is specified as the word (j) (393).

Then, the connectivity check process is performed for the word (j) and the word (k) immediately following "nai" (S94). Here, the word immediately following "nai" is "mitaidesu". Accordingly, the connectivity check process is performed for "ika" and "mitaidesu". Although the details of the connectivity check process for "ika" and "mitaidesu" are not described here, the result of the connectivity check is determined to be "not connectable" (NO at S95). Accordingly, the word (j) "ika" is deleted from the fixed buffer 324 and stored in the edit buffer 323 (S96). Here, the arrangement sequence of "ika" and "nai" is not changed before and after "ika" and "nai" have been changed from fixed character strings a4 into edited character strings a5 (because the "sequence number" of the fixed character string data D4 is used as the "sequence number" of the edited character string data D3 without being changed). Therefore, the arrangement sequence is such that "ika" immediately precedes "nai".

At this point, words stored in the fixed buffer 324 are "kyou", "ha", and "mitaidesu", and words stored in the edit buffer 323 are "ika" and "nai". Thereafter, a word immediately preceding the word (j) "ika" is newly specified as the word (j) (S97). Here, the word "ha" is newly specified as the word (j). Then, the connectivity check process is performed for the new word (j) "ha" and the word (k) "mitaidesu" (S94). Thus, the connectivity check process for the word (K) and the word (j) is repeated in such a manner that a word specified as the word (j) is switched to a further preceding word until the word (j) becomes connectable to the word (k) that immediately follows the word (i) to be deleted. Although the details of the connectivity check process for "ha" and "mitaidesu" are not described here, the result of the connectivity check is determined to be "connectable" (YES at S95).

Thereafter, among the edited character strings a5 stored in the edit buffer 323, a final word in the arrangement sequence is deleted (387), and the "pronunciation" of this word is stored in the input buffer 321 (388). Here, "nai" is deleted from the edit buffer 323, and the pronunciation "nai" is stored in the input buffer 321 as input characters a1. Then, the option search process is performed in order to obtain option character strings a2 for the input characters a1 "nai" (S90). Subsequently, the display process from step S13 to step S18 is performed (see FIG. 25). As a result, "kyo", "ha", and "mitaidesu" are displayed as fixed character strings a4; "ika" is displayed as an edited character string a5; "nai" is displayed as input characters a1; and option character strings a2 corresponding to "nai" are displayed. To be specific, the chat screen as shown in FIG. 13 is displayed.

Described next is a process indicated as (2) in FIG. 33, that is, a process performed in the case where an instruction to delete a character is inputted when the chat screen as shown in FIG. 13 is displayed.

First, the operation type is determined to be a deletion of a character (S1); it is determined that an instruction to delete a character has been inputted (YES at S7); and the Backspace input process is performed (S8). Specifically, referring to FIG. 31, it is determined that input characters a1 are stored (YES at S81), and the rearmost character among the input characters a1 is deleted (S82). Here, since "nai" are the input characters a1, the rearmost character "i" is deleted. Note that, in the description below of this example, it is assumed that an instruction to delete a character has been inputted again and "na" (a single Japanese character) has been deleted, accordingly. Subsequently, the option search process is performed (S85). To be specific, referring to FIG. 26, it is determined that no input character a1 is stored in the input buffer 321 (S21), and option character strings a2 corresponding to the word "ika" immediately preceding the cursor a3 are obtained (S30). Thereafter, the connectivity check process is performed for the option character strings a2 and "ika" (S24 to S28).

Then, the display process from step S13 to step S18 is performed (see FIG. 25). As a result, "kyou", "ha", and "mitaidesu" are displayed as fixed character strings a4; "ika" is displayed as an edited character string a5; and option character strings a2 corresponding to "ika" are displayed. Here, "nai" is not displayed since "nai" has been deleted from the input buffer 321. Specifically, the chat screen as shown in FIG. 14 is displayed.

Described next is a process indicated as (3) in FIG. 33, that is, a process performed in the case where an instruction to delete a character is inputted when the chat screen as shown in FIG. 14 is displayed. In this process, the operation type is determined to be a deletion of a character (S1); it is determined that an instruction to delete a character has been inputted (YES at S7); and the Backspace input process is performed (S8). Specifically, referring to FIG. 31, it is determined that no input character a1 is stored (NO at S81), and that an edited character string a5 is stored (YES at S86) since "ika" is stored as an edited character string a5 at this point.

Thereafter, among the edited character strings a5 stored in the edit buffer 323, a final word in the arrangement sequence is deleted (S87), and the "pronunciation" of this word is stored in the input buffer 321. Here, "ika" is deleted from the edit buffer 323, and the pronunciation "ika" is stored in the input buffer 321 as input characters a1 (S88). Then, the option search process is performed in order to obtain option character strings a2 corresponding to the input characters a1 "ika" (S90). Subsequently, the display process from step S13 to step S18 is performed (see FIG. 25). As a result, "kyou", "ha", and "mitaidesu" are displayed as fixed character strings a4; "ika" is displayed as input characters a1; and the option character strings a2 corresponding to "ika" are displayed. Specifically, the chat screen as shown in FIG. 15 is displayed.

Processes indicated as (4) and (5) in FIG. 33 are character input processes that are performed for deleting the input characters a1 "ika" one by one when the chat screen as shown in FIG. 15 is displayed. The input characters a1 "ika" are deleted one by one from the rearmost character each time the user inputs an instruction to delete a character. Since the processes performed here for the deletion are the same as the above-described process indicated as (2) in FIG. 33, the description thereof is omitted. Note that, however, in the process indicated as (5) in FIG. 33, after a character "i" that is to be deleted at the end among the characters constituting "ika" is deleted, option character strings a2 that correspond to "ha" immediately preceding "i" are obtained. In this respect, the process indicated as (5) in FIG. 33 is different from the process indicated as (2) in FIG. 33.

Described next with reference to FIGS. 4, 17, 24, 26, 27, and 34 is the character input process of the game apparatus 1, which is performed when the user inputs an instruction to add "nemura" and "nai" in a state where the process (5) in FIG. 33 has been performed (i.e., in a state where the user has fixedly inputted "kyou ha mitaidesu"). Described here is a case where "nemura" and "nai" are fixedly inputted between "kyou ha" and "mitaidesu". FIG. 34 shows an example of the character input process that is performed when the user inputs "nemura" and "nai". Note that, in the description below, the processing for moving the cursor position and the changing of the "character string length", "start position", and "end position" of the data D1, D3, and D4 will not be described.

First, a process indicated as (1) in FIG. 34 is described. The process indicated as (1) in FIG. 34 is the character input process that is performed in the case where, when "kyou", "ha", and "mitaidesu" are displayed as fixed character strings a4, an input character a1 "ne" (a single Japanese character) is inputted so as to be located between "ha" and "mitaidesu". Here, the operation type is determined to be an input of an input character a1 (S1); it is determined that an input character a1 has been inputted (YES at S2); and the input character a1 "ne" is stored in the input buffer 321 (S3).

Then, the option search process is performed in order to obtain option character strings a2 corresponding to the input character a1 "ne" (S4). The option search process is not described here since the option search process has previously been described in the description of the process (1) in FIG. 32. It is assumed here that "neko", "ne", and "nemura" are stored in the option buffer 322 after the option search process has been performed. Thereafter, the display process from step S13 to step S18 is performed (see FIG. 25). As a result, "kyou", "ha", and "mitaidesu" are displayed as fixed character strings a4; "ne" is displayed as an input character a1 between "ha" and "mitaidesu"; and the option character strings a2 corresponding to "ne" are displayed.

Next, a process indicated as (2) in FIG. 34 is described. The process indicated as (2) in FIG. 34 is the character input process that is performed in the case where the user inputs a selection of "nemura" when "neko", "ne", and "nemura" are displayed as option character strings a2. First, the operation type is determined to be a selection of an option character string a2 (S1). Then, the operation type is determined not to be an input of a character (NO at S2) but to be a selection of an option character string a2 (YES at S5). Subsequently, the word fixing process is performed in order to change the option character string a2 "nemura" into a fixed character string a4 (S6). In the word fixing process, the connectivity check process is performed by setting "nemura" as the word A and "mitaidesu" as the word B. The result of the connectivity check process here is "not connectable" (S58), and "nemura" becomes not a fixed character string a4 but an edited character string a5 (i.e., steps S46 and S47 are not performed). Note that the word fixing process is not described here in detail since the word fixing process has previously been described in the description of the process (3) in FIG. 32.

As described above, the option character strings a2 are already deleted from the option buffer 322 when the word fixing process has been performed (S44). Thereafter, returning to FIG. 24, the option search process is performed in order to newly obtain option character strings a2 (S4). The option search process performed here is described in detail with reference to FIG. 26. As described above, the input character a1 is already deleted from the input buffer 321 when the word fixing process has been performed (S41). Accordingly, option character strings a2 corresponding to the word "nemura" that immediately precedes the cursor position are obtained (S30). Then, the connectivity check process is performed by setting each of the option character strings a2 as the word B and "nemura" as the word A (S24 to S28).

It is assumed here that when the option search process has been performed, only an option character string a2 "nai" is stored in the option buffer 322. Thereafter, the display process from step S13 to step S18 is performed (see FIG. 25). As a result, "kyou", "ha", and "mitaidesu" are displayed as fixed character strings a4; "nemura" is displayed as an edited character string a5 between "ha" and "mitaidesu"; and the option character string a2 "nai" corresponding to "nemura" is displayed.

Next, a process indicated as (3) in FIG. 34 is described. The process indicated as (3) in FIG. 34 is the character input process that is performed in the case where the user inputs a selection of "nai" when "nai" is being displayed as an option character string a2.

First, the operation type is determined to be a selection of an option character string a2 (S1). Then, the operation type is determined not to be an input of a character (NO at S2) but to be a selection of an option character string a2 (YES at S5). Subsequently, the word fixing process is performed in order to change the edited character string a5 "nemura" and the option character string a2 "nai" into fixed character strings a4 (S6). Referring to FIG. 27, in the word fixing process, the connectivity check process is performed by setting "nai" as the word A and "mitaidesu" as the word B (S43). The result of the connectivity check process here is "connectable" (S57 in FIG. 28). Then, it is determined YES at step S45, and "nemura" and "nai" stored as edited character strings a5 become fixed character strings a4 (i.e., S46 and S47 are performed).

At this point, "kyou", "ha", "nemura", "nai", "mitai", and "desu" are stored in the fixed buffer 324, and no word or character is stored in the input buffer 321, the option buffer 322, and the edit buffer 323. Further, the position of the cursor a3 is moved so as to be located behind "nai".

Thereafter, returning to FIG. 24, the option search process is performed (S4). Note that, although option character strings a2 corresponding to "nai" are obtained in the option search process, the option search process is not described here since the option search process has previously been described in the description of the process (1) in FIG. 32. Subsequently, the display process from step S13 to step S18 is performed (see FIG. 25). As a result, "kyou", "ha", "nemura", "nai", and "mitaidesu" are displayed as fixed character strings a4, and also, the option character strings a2 corresponding to "nai" are displayed.

As described above, the game apparatus 1 according to the present embodiment has the first feature in which only an option character string a2 selected by the user becomes a fixed character string a4. Accordingly, by selecting character strings to be displayed as option character strings a2, such that the selected character strings do not include an inappropriate expression, an input of an inappropriate word as a fixed character string a4 and a transmission of such an inappropriate word to the other game apparatus 1 can be effectively prevented.

Further, the game apparatus 1 has the second feature in which only words each satisfying the predetermined conditions are displayed as option character strings a2. Therefore, an inappropriate expression can be more effectively prevented from being fixedly inputted, as compared to the conventional technique in which a list of inappropriate words is stored in the apparatus in advance and only the words listed in the list are blacked out when displayed. To be specific, in the technique in which a list of inappropriate words is prepared in advance, if there is an inappropriate word that is not in the list, the inappropriate word can be inputted. Whereas, according to the second feature of the present embodiment, only words satisfying the predetermined conditions become option character strings a2 to be displayed. Therefore, as compared to the conventional technique, an inappropriate expression can be more effectively prevented from being fixedly inputted.

Here, the predetermined conditions are conditions for an option character string a2 to be connectable to a word immediately preceding an input character a1. Thus, the user cannot input an inappropriate expression by separately selecting, from option character strings a2, two words that are to be displayed successively. In this manner, an inappropriate expression can be more effectively prevented from being inputted.

The third feature of the present embodiment is that only when a word immediately following an input character a1 is connectable to an option character string a2 selected by the user, the selected option character string a2 becomes a fixed character string a4. Thus, the following situation can be prevented: the user fixedly inputs an inappropriate expression by separately selecting, from option character strings a2, two words that are to be displayed successively. Consequently, an inappropriate expression can be more effectively prevented from being fixedly inputted.

The fourth feature of the present embodiment is that when a fixed character string a4 has been displayed, option character strings a2 corresponding to the fixed character string a4 are obtained from the option character string database and displayed. In this manner, option character strings a2 can be displayed without requiring the user to input an input character a1.

Further, the game apparatus 1 has the fifth feature of the present embodiment as follows: it is determined whether or not the word (j), which immediately precedes the word (i) to be deleted, and the word (k), which immediately follows the word (i) to be deleted, are connectable to each other; if the word (j) immediately preceding the word (i) and the word (k) immediately following the word (i) are not connectable to each other, then a word immediately preceding the word (j) is newly set as the word (j) and the connectivity check is performed between the new word (j) and the word (k); the word (j) subjected to the connectivity check is switched to a further preceding word until the word (j) and the word (k) are determined to be connectable to each other; and when the word (j) and the word (k) are determined to be connectable to each other, a word present between these words (j) and (k) connectable each other enters an unfixed state (i.e., the word becomes an edited character string a5 or input characters a1). According to the fifth feature of the present embodiment, since the word present between the word (j) and the word (k) that are connectable to each other is changed into an unfixed state, the following situation can be effectively prevented: two words that are not connectable to each other are fixedly inputted when these two words are successively arranged due to a deletion of the word (i).

Hereinafter, variations of the present embodiment will be described.

(1) In the present embodiment, in the connectivity check process (step S26 in FIG. 26) of the option search process, the connectivity check is performed by setting the word immediately preceding the input character a1 as the front word (the word A) and setting an option character string a2 as the rear word (the word B). However, in place of or in addition to this connectivity check, the connectivity check may be performed by setting the option character string a2 as the word A and setting the word immediately following the input character a1 as the word B.

(2) Further, in the present embodiment, in the connectivity check process (step S43 in FIG. 27) of the word fixing process, the connectivity check is performed by setting the selected option character string a2 as the front word (the word A) and setting the word immediately following the input character a1 as the rear word (the word B). However, in place of or in addition to this connectivity check, the connectivity check may be performed by setting the word immediately preceding the input character a1 as the word A and setting the selected option character string a2 as the word B.

(3) Still further, in the present embodiment, the connectivity check process is performed in both the word fixing process and the option search process. However, the connectivity check process may be performed in only one of these processes.

(4) Still further, in the present embodiment, the connectivity check is performed in the connectivity check process shown in FIG. 28 by using the white list table D7 and the black list table D8. However, the connectivity check may be performed by only using the white list table D7 without using the black list table D8.

(5) Still further, in the present embodiment, when the user has inputted an instruction to delete a character, the game apparatus 1 sets, as a deletion target, a character or a word immediately preceding the cursor a3 (see FIG. 4). However, award or a character immediately following the cursor a3 may be deleted or set as a deletion target.

(6) Still further, in the present embodiment, the game apparatus 1 is configured to, when an instruction to move the position of the cursor a3 (see FIG. 4) is inputted, delete words in an unfixed state from the main memory 32 (input characters a1, option character strings a2, and edited character strings a5 as shown in FIG. 4) (steps S64 to S66 in FIG. 29). However, in place of this configuration, the game apparatus 1 may be configured not to, if words in an unfixed state are stored in the main memory 32, move the position of the cursor a3 even when an instruction to move the cursor a3 is inputted.

(7) Still further, in the present embodiment, the game apparatus 1 is configured to, when a message transmission instruction is inputted, delete words in an unfixed state from the main memory 32 (input characters a1, option character strings a2, and edited character strings a5 as shown in FIG. 4) (steps S71 to S73 in FIG. 30). However, in place of this configuration, the game apparatus 1 may be configured not to, if words in an unfixed state are stored in the main memory 32, transmit a message to the other game apparatus 1 even when a message transmission instruction is inputted.

(8) Still further, in the present embodiment, the game apparatus 1 has a chat function with which to transmit/receive text data to/from the other game apparatus 1, thereby allowing the user of the game apparatus 1 to perform chatting with the user of the other game apparatus 1. However, as long as the game apparatus 1 has a function to transmit text data to the other game apparatus 1, it is not essential for the game apparatus 1 to have the above chat function.

(9) Still further, it is not essential for the game apparatus 1 to have a communication function. Alternatively, the game apparatus 1 may be configured to be able to store, in response to an instruction by the user, only fixedly inputted words in a nonvolatile memory (e.g., in the saved data memory 34 shown in FIG. 2). Such a function may be incorporated into application functions of a word processor, for example.

(10) Still further, in the present embodiment, the game apparatus 1 outputs input characters a1, option character strings a2, fixed character strings a4, and edited character strings a5 by displaying them on the lower LCD 12. However, input characters a1, option character strings a2, fixed character strings a4, and edited character strings a5 may be outputted from the loudspeakers via the amplifier 42, or may be outputted using a printer that is not shown.

(11) Still further, in the present embodiment, the information processing apparatus is applied as the game apparatus 1. However, exemplary embodiments of the present invention are applicable not only to a game apparatus but also to, for example, a mobile phone, a personal handyphone system (PHS), a personal digital assistant (PDA), a stationary game apparatus, a personal computer, and the like.

While the invention has been described in detail, the foregoing description is in all aspects illustrative and not restrictive. It is understood that numerous other modifications and variations can be devised without departing from the scope of the invention.

What is claimed is:

1. A non-transitory computer readable storage medium having an input program stored therein, the input program causing a computer of an information processing apparatus that includes a storage area for storing an option word database that defines a combination of at least one character and at least one option word corresponding to the at least one character, to at least:
   receive an input of one or more characters by a user;
   output, as one or more unfixed characters, the one or more characters received;
   obtain, from the option word database, at least one option word that corresponds to the one or more unfixed characters, as a respective at least one first option word;
   identify a word preceding and/or following the one or more unfixed characters;
   determine, among the at least one first option word, a fixed word that is connectable to the word preceding and/or following the one or more unfixed characters;
   output the fixed word;
   receive an operation which the user performs for selecting a first option word;
   when the operation of selecting a first option word from the at least one first option word obtained is received, it is determined whether or not the selected first option word is connectable to the word preceding and/or following the one or more unfixed characters; and
   only when the selected first option word is connectable to the word preceding and/or following the one or more unfixed characters, set the selected first option word as a fixed word to be output.

2. The non-transitory computer readable storage medium according to claim 1, wherein the input program further causes the computer to at least:
   receive an operation which the user performs for selecting a second option word, and
   obtain, from the at least one first option word obtained, at least one first option word, as a respective at least one second option word, and,
   when the operation of selecting a second option word from the at least one obtained second option word has been received, set the second option word as a fixed word to be output.

3. The non-transitory computer readable storage medium according to claim 2, wherein the input program further causes the computer to at least output the at least one second option word obtained.

4. The non-transitory computer readable storage medium according to claim 2, wherein a fixed word determination process is performed for determining the fixed word, only when the operation for selecting a second option word has been received.

5. The non-transitory computer readable storage medium according to claim 1, wherein when one of the at least one first option words is set as the fixed word, at least one option word is obtained from the option word database as a respective at least one third option word that corresponds to the fixed word.

6. The non-transitory computer readable storage medium according to claim 5, wherein among the at least one third option word, a third option word is set as a fixed word, the third option word being connectable to at least one word, which has been identified.

7. The non-transitory computer readable storage medium according to claim 1, wherein the input program further causes the computer to at least:
   receive an instruction to transmit the one or more characters input by the user to another information processing apparatus; and
   when the instruction has been received, transmit to said another information processing apparatus transmission data that contains text that only includes the fixed word.

8. The non-transitory computer readable storage medium according to claim 7, wherein
   the storage area stores the received one or more characters as one or more unfixed characters,
   the one or more unfixed characters stored in the storage area is/are output, and
   the input program further causes the computer to at least delete the one or more unfixed characters from the storage area prior to transmitting the transmission data, when the instruction has been received.

9. The non-transitory computer readable storage medium according to claim 1, wherein
   a marker is displayable in a predetermined display area of a display of the information processing apparatus, and, at a time of outputting the one or more unfixed characters, the one or more unfixed characters is displayable at a position relative to a display position of the marker in the predetermined display area,
   an input of an instruction to change the display position of the marker is receivable, and
   the input program further causes the computer to at least delete the one or more unfixed characters from the predetermined display area, when input of the instruction to change the display position of the marker has been received.

10. The non-transitory computer readable storage medium according to claim 1, wherein words include one or more characters.

11. The non-transitory computer readable storage medium according to claim 1, wherein the fixed word is output based on a context in which the fixed word is to appear, including the fixed word being connectable to an immediately preceding word, if one exists.

12. A non-transitory computer readable storage medium having an input program stored therein, the input program causing a computer of an information processing apparatus that includes a storage area for storing an option word database that defines a combination of at least one character and at least one option word corresponding to the at least one character, to at least;
   receiving an input of one or more characters by a user;
   output, as one or more unfixed characters, the one or more characters received;
   obtain, from the option word database, at least one option word that corresponds to the one or more unfixed characters, as a respective at least one first option word;
   identify a word preceding and/or following the one or more unfixed characters;
   determine, among the at least one first option word, a fixed word that is connectable to the word preceding and/or following the one or more unfixed characters; and
   output the fixed word;
   receive an indication of an operation which the user performs for selecting a second option word;
   obtain, from the at least one first option word obtained, at least one first option word, as a respective at least one second option word;
   when the operation of selecting a second option word the at least one obtained second option word has been received, set the second option word as a fixed word to be output; and when the operation of selecting a second option word from the at least one obtained second option word is received, it is determined whether or not the selected second option word is connectable to the word preceding and/or following the one or more unfixed characters, and only when the selected second option word is connectable to the word preceding and/or following the one or more unfixed characters, the selected second option word is set as a fixed word to be output.

13. The non-transitory computer readable storage medium according to claim 12, wherein
both the word preceding the one or more unfixed characters and the word following the one or more unfixed characters are identified, and
the input program further causes the computer to:
obtain, from the at least one first option word obtained, the at least one first option word satisfying a first condition of being connectable to the word that precedes the one or more unfixed characters and that has been identified, as the respective at least one second option word, the fixed word being connectable to the word that precedes the one or more unfixed characters and that has been identified, and
determine whether or not the selected second option word satisfies a second condition of being connectable to the word that follows the one or more unfixed characters and that has been identified, and
only when the selected second option word is connectable to the word that precedes the one or more unfixed characters, set the selected second option word as a fixed word.

14. A non-transitory computer readable storage medium having an input program stored therein, the input program causing a computer of an information processing apparatus that includes a storage area for storing an option word database that defines a combination of at least one character and at least one option word corresponding to the at least one character, to at least;
receive an input of one or more characters by a user;
output, as one or more unfixed characters, the one or more characters received;
obtain, from the option word database, at least one option word that corresponds to the one or more unfixed characters, as a respective at least one first option word;
identify a word preceding and/or following the one or more unfixed characters;
determine, among the at least one first option word, a fixed word that is connectable to the word preceding and/or following the one or more unfixed characters; and
output the fixed word;
receive, from the user, an instruction to delete the fixed word;
identify a word preceding the fixed word to be deleted and a word following the fixed word to be deleted;
determine whether or not the word preceding the fixed word to be deleted and the word following the fixed word to be deleted, both of which have been identified, are connectable to each other; and
when it is determined that the words preceding and following the fixed word to be deleted are connectable to each other, changing the fixed word to be deleted into one or more unfixed characters.

15. The non-transitory computer readable storage medium according to claim 14, wherein at least one first option word corresponding to the one or more unfixed characters that has been changed is obtained from the option word database.

16. The non-transitory computer readable storage medium according to claim 14, wherein
when determining that the word preceding the fixed word to be deleted and the word following the fixed word to be deleted are not connectable to each other, a word located at a rearmost position among words that precede the fixed word to be deleted and that are connectable to the word following the fixed word to be deleted is set as a connectable word, and
all words present between the connectable word and the word following the fixed word to be deleted are changed into one or more unfixed characters.

17. A system comprising:
a storage area for storing an option word database that defines a combination of at least one character and at least one option word corresponding to the at least one character; and
at least one processor and a memory configured to cooperate to:
receive an input of one or more characters by a user;
output, as one or more unfixed characters, the one or more characters received;
obtain from the option word database, at least one option word that corresponds to the one or more unfixed characters, as a respective at least one first option word;
identify a word preceding and/or following the one or more unfixed characters;
determine, among the at least one first option word, a fixed word that is connectable to the word preceding and/or following the one or more unfixed characters;
output the fixed word;
receive an indication of an operation which the user performs for selecting a first option word;
when the operation of selecting a first option word from at least one first option word obtained is received, it is determined whether or not the selected first option word is connectable to the word preceding and/or following the one or more unfixed characters; and
only when the selected first option word is connectable to the word preceding and/or following the one or more unfixed characters, set the selected first option word as a fixed word to be output.

18. An input method comprising:
storing an option word database that defines a combination of at least one character and at least one option word corresponding to the at least one character;
receiving an input of one or more characters by a user;
outputting, as one or more unfixed characters, the one or more characters received;
obtaining, from the option word database, at least one option word that corresponds to the one or more unfixed characters, as a respective at least one first option word;
identifying a word preceding and/or following the one or more unfixed characters;
determining, among the at least one first option word, a first option word that is connectable to the word preceding and/or following the one or more unfixed character;
outputting the fixed word;
receiving an indication of an operation which the user performs for selecting a first option word;
when the operation of selecting a first option word from the at least one first option word obtained is received, determining whether or not the selected first option word is connectable to the word preceding and/or following the one or more unfixed characters; and only when the selected first option word is connectable to the word preceding and/or following the one or more unfixed characters, setting the selected first option word as a fixed word to be output.

* * * * *